(12) United States Patent
Hasegawa

(10) Patent No.: US 8,581,948 B2
(45) Date of Patent: Nov. 12, 2013

(54) INFORMATION PROCESSING APPARATUS, LASER RADIATION DEVICE, RENDER INFORMATION GENERATING METHOD, CONTROL SYSTEM, RECORDING MEDIUM, AND RENDER INFORMATION STORAGE DEVICE

(75) Inventor: Fumihiro Hasegawa, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 99 days.

(21) Appl. No.: 13/265,145

(22) PCT Filed: May 6, 2010

(86) PCT No.: PCT/JP2010/058072
§ 371 (c)(1),
(2), (4) Date: Oct. 19, 2011

(87) PCT Pub. No.: WO2010/131689
PCT Pub. Date: Nov. 18, 2010

(65) Prior Publication Data
US 2012/0038735 A1 Feb. 16, 2012

(30) Foreign Application Priority Data
May 15, 2009 (JP) ................. 2009-118907

(51) Int. Cl.
*B41J 2/315* (2006.01)
*B41J 2/435* (2006.01)
*B41J 17/28* (2006.01)

(52) U.S. Cl.
USPC ............................ 347/217; 347/171; 347/224

(58) Field of Classification Search
USPC ......... 347/171, 183, 188, 215, 217, 131, 224, 347/234, 248
See application file for complete search history.

(56) References Cited

U.S. PATENT DOCUMENTS 4,460,909 A * 7/1984 Bassetti et al. ................. 347/131
5,208,901 A 5/1993 Sasaki et al.
(Continued)

FOREIGN PATENT DOCUMENTS

JP 61 060177 3/1986
JP 61 103193 5/1986
(Continued)

OTHER PUBLICATIONS

Office Action issued Jun. 12, 2012 in Japanese Patent Application No. 2009-118907.

(Continued)

*Primary Examiner* — Kristal Feggins
(74) *Attorney, Agent, or Firm* — Oblon, Spivak, McClelland, Maier & Neustadt, L.L.P.

(57) ABSTRACT

An information processing apparatus for generating render information of an image includes a storage for storing shape information of strokes forming the image; an information acquiring unit for acquiring the shape information of strokes from the storage; a thickness acquiring unit for acquiring thickness information of the image; a stroke generator for generating a number of parallel strokes that are each parallel to an original stroke, and to specify intervals between the parallel strokes, wherein the number and the intervals correspond to the thickness information; a length adjusting unit for adjusting a length of a first parallel stroke parallel to a first original stroke and/or a length of a second parallel stroke parallel to a second original stroke that is connected to the first original stroke; and a render information generator for registering, in the render information, the shape information of the parallel stroke whose length has been adjusted.

16 Claims, 39 Drawing Sheets

(56) References Cited

U.S. PATENT DOCUMENTS

| | | |
|---|---|---|
| 5,852,680 A | 12/1998 | Yoshida |
| 7,463,395 B2 | 12/2008 | Utagawa et al. |
| 8,106,934 B2 * | 1/2012 | Ishimi et al. .................. 347/224 |
| 8,284,226 B2 * | 10/2012 | Hasegawa et al. ............ 347/224 |
| 8,358,325 B2 * | 1/2013 | Asai et al. ..................... 347/234 |
| 2006/0082612 A1 | 4/2006 | Morikawa et al. |
| 2008/0064596 A1 | 3/2008 | Iino et al. |
| 2010/0039916 A1 | 2/2010 | Hasegawa et al. |
| 2010/0289866 A1 | 11/2010 | Hasegawa |

FOREIGN PATENT DOCUMENTS

| | | |
|---|---|---|
| JP | 64-53861 | 3/1989 |
| JP | 6 168339 | 6/1994 |
| JP | 7-234945 | 9/1995 |
| JP | 8 160931 | 6/1996 |
| JP | 8 279038 | 10/1996 |
| JP | 9 270018 | 10/1997 |
| JP | 9 305779 | 11/1997 |
| JP | 11-288261 | 10/1999 |
| JP | 2000-99750 | 4/2000 |
| JP | 2004 090026 | 3/2004 |
| JP | 2004-255751 | 9/2004 |
| JP | 2004 341373 | 12/2004 |
| JP | 2004-345273 | 12/2004 |
| JP | 2006-306063 | 11/2006 |
| JP | 2011 025647 | 2/2011 |

OTHER PUBLICATIONS

International Search Report Issued Jun. 15, 2010 in PCT/JP10/058072 filed May 6, 2010.

* cited by examiner

FIG.9
| | | |
|---|---|---|
| m | 24 | 24 |
| d | 88 | 24 |
| m | 56 | 24 |
| d | 56 | 224 |
| d | 24 | 176 |
(a)
DOUBLE SCALE TO RENDER CHARACTER 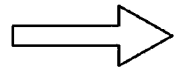
| [0] | 48 | 48 | 176 | 48 |
|---|---|---|---|---|
| [1] | 112 | 48 | 112 | 448 |
| [2] | 112 | 448 | 48 | 352 |
(b)
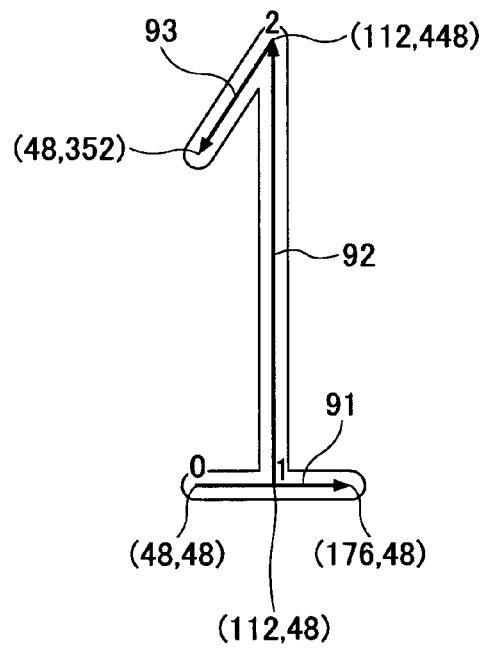
(c)

FIG. 16
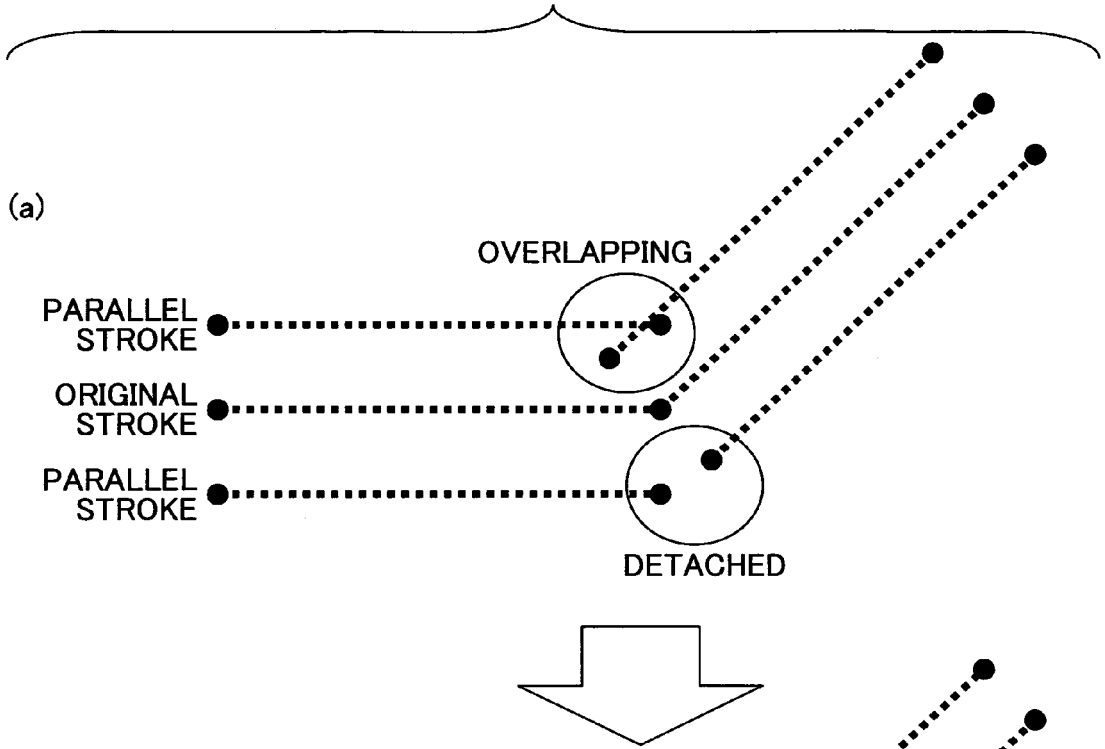
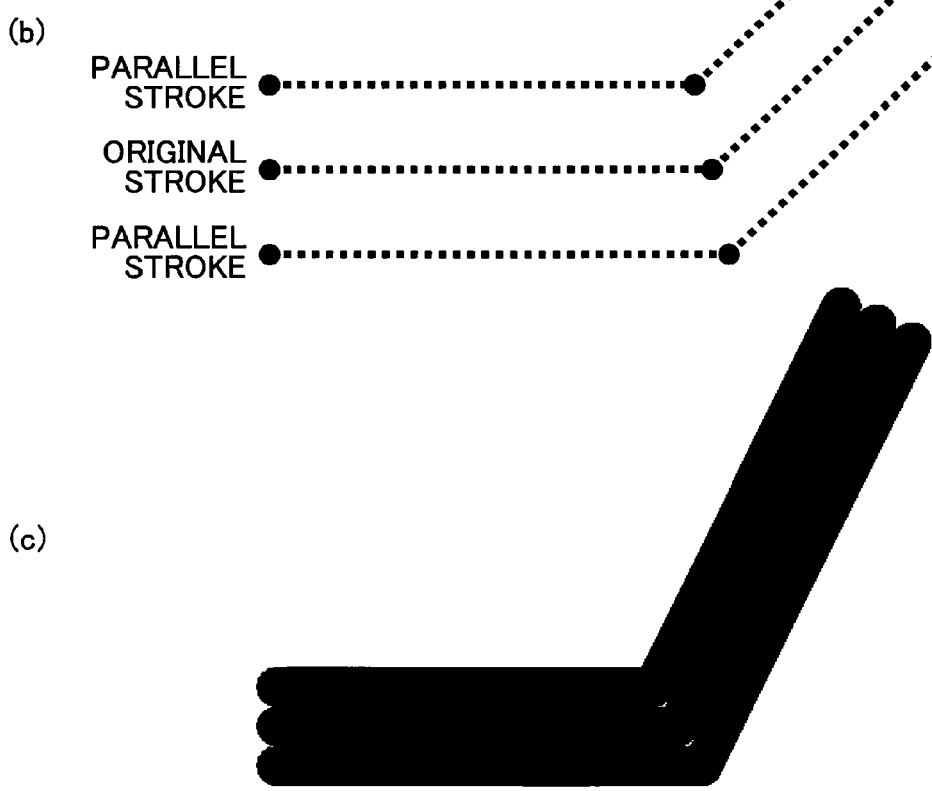

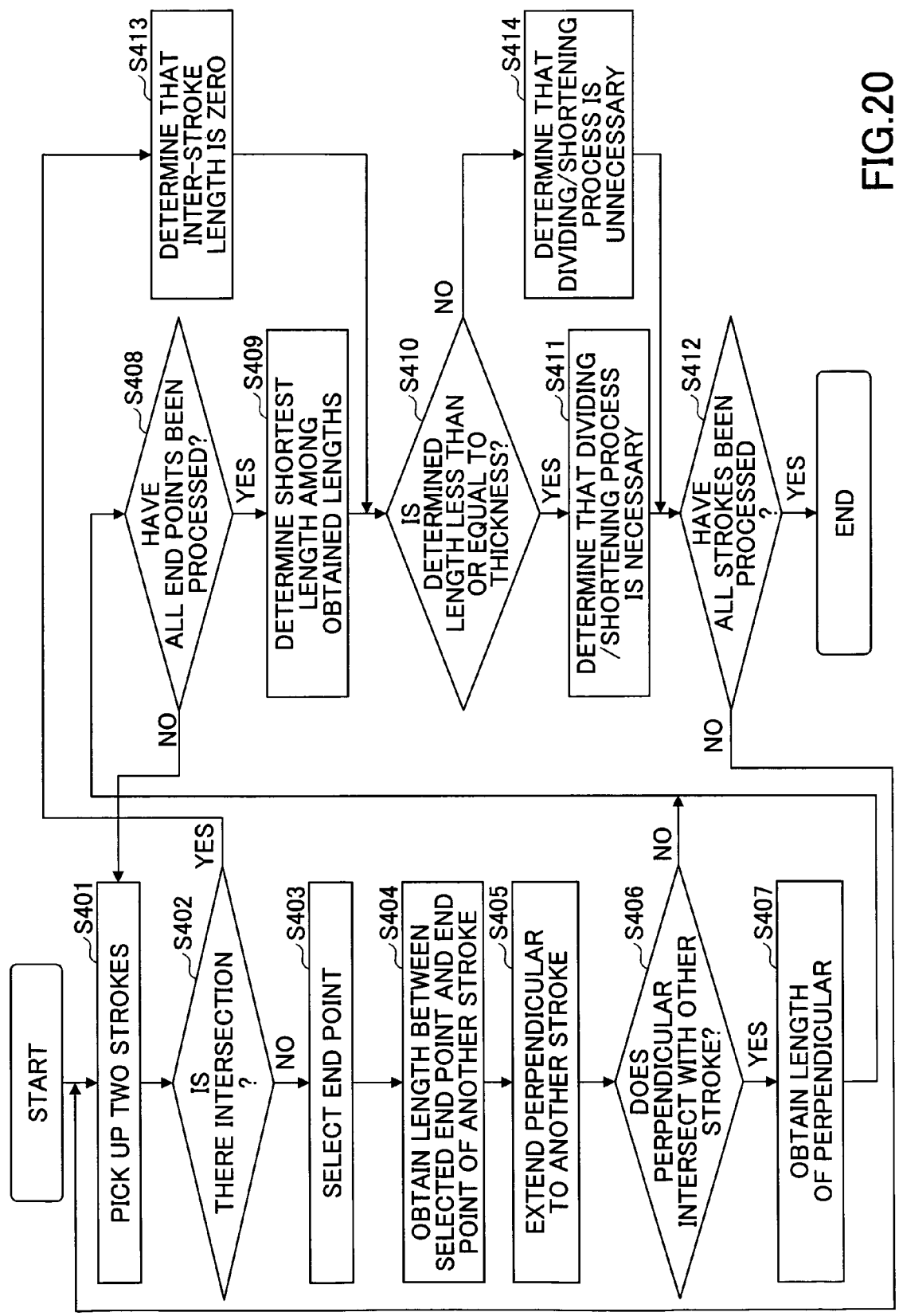

| | | | | |
|---|---|---|---|---|
| [1] | A | B | $x_1$ | $y_1$ |
| [2] | $x_1$ | $y_1$ | $x_2$ | $y_2$ |
| [3] | $x_2$ | $y_2$ | $x_3$ | $y_3$ |
| [4] | $x_3$ | $y_3$ | $x_4$ | $y_4$ |
| [5] | $x_4$ | $y_4$ | $x_5$ | $y_5$ |
| [6] | $x_5$ | $y_5$ | C | D |

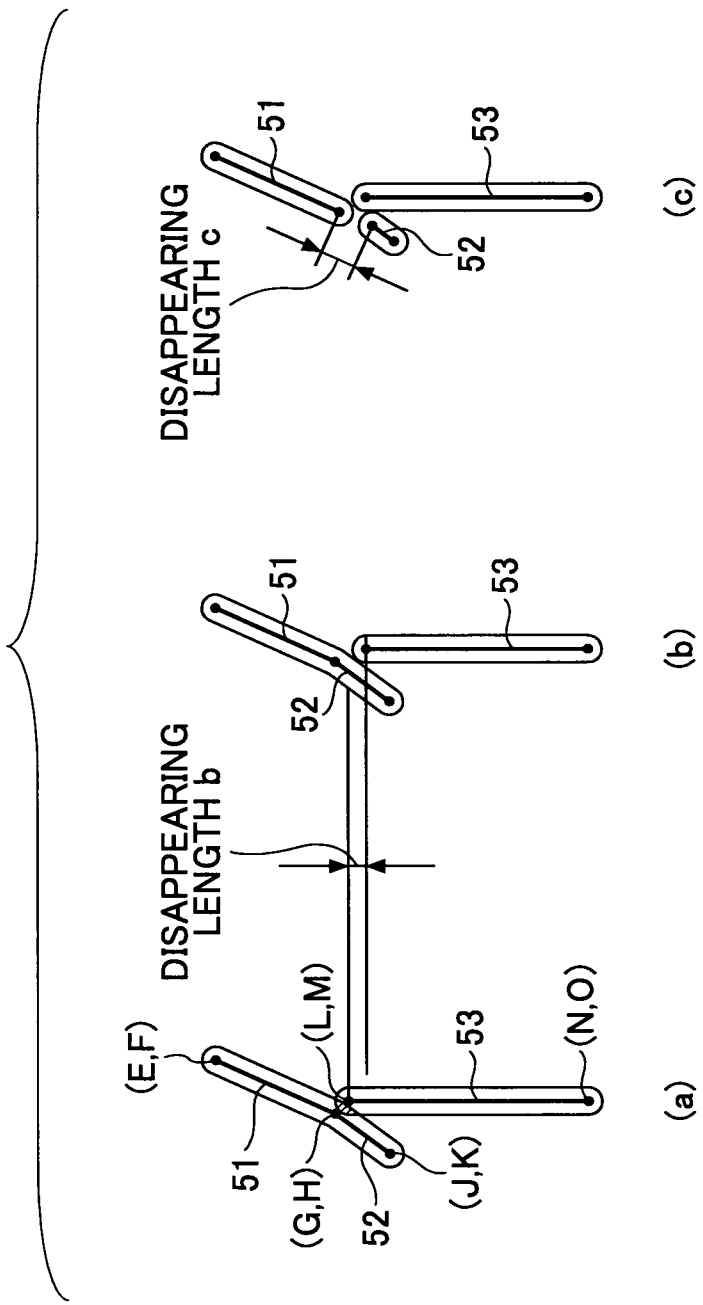

FIG.26
(a)
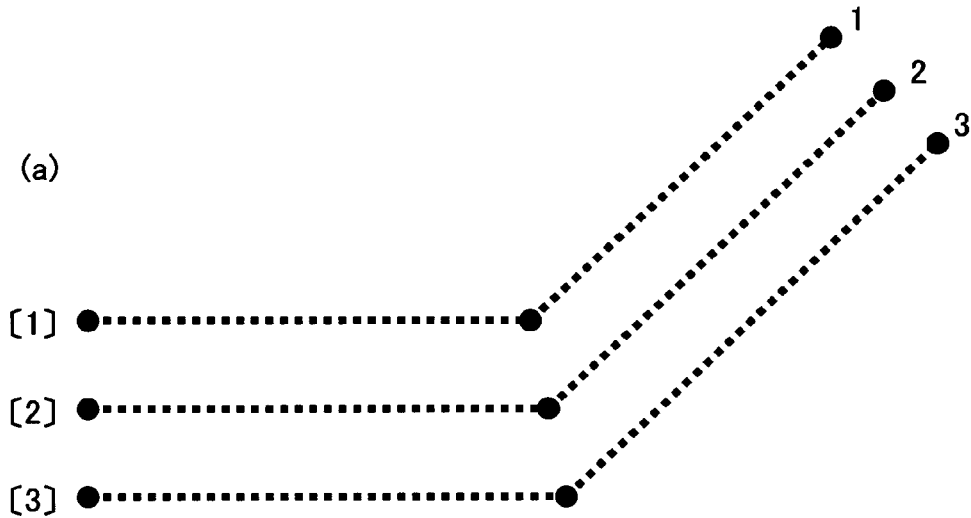
OR
(b)
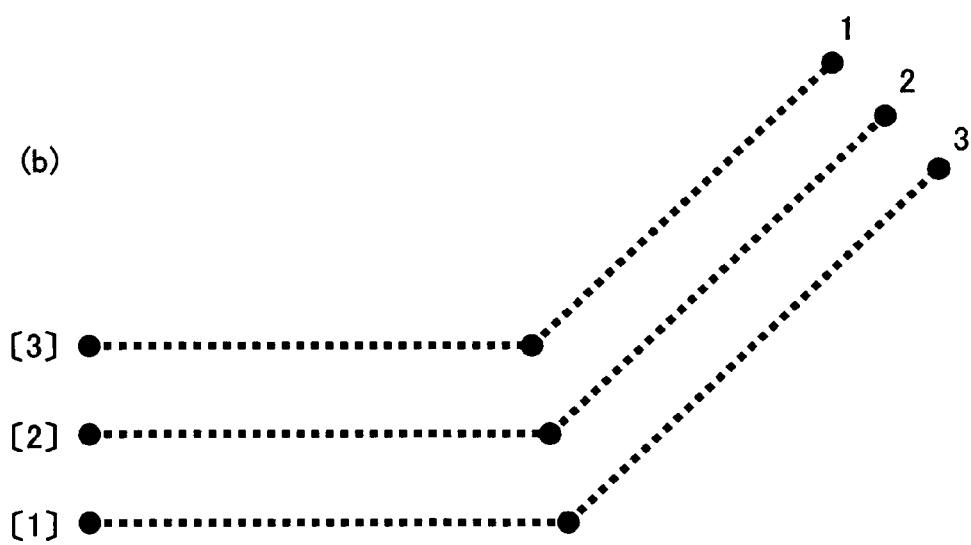

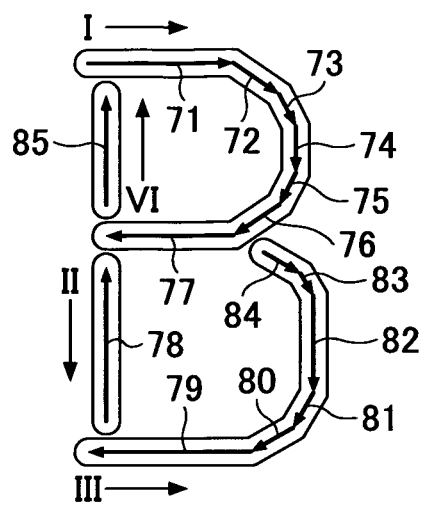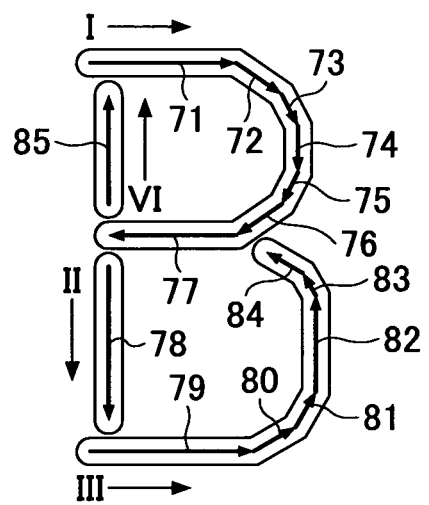

| [0] | 160 | 32 | 272 | 480 |
| [1] | 16 | 352 | 240 | 352 |
| [2] | 304 | 352 | 448 | 352 |

| [+0] | 160 | 32 | 272 | 480 |
| [+1] | 16 | 352 | 240 | 352 |
| [+2] | 304 | 352 | 448 | 352 |

| [+1] | 160 | 352 | 240 | 352 |
| [+2] | 304 | 352 | 448 | 352 |
| [+0] | 160 | 32 | 272 | 480 |

| [+1] | 16 | 352 | 240 | 352 |
| [+2] | 304 | 352 | 448 | 352 |
| [−0] | 272 | 480 | 160 | 32 |

INFORMATION PROCESSING APPARATUS, LASER RADIATION DEVICE, RENDER INFORMATION GENERATING METHOD, CONTROL SYSTEM, RECORDING MEDIUM, AND RENDER INFORMATION STORAGE DEVICE

TECHNICAL FIELD

The present invention relates to an information processing apparatus, a laser radiation device, a render information generating method, a control system, a program, a recording medium, and a render information storage device for generating render information used when characters and line images are rendered in a non-contact/contact manner.

BACKGROUND ART

Thermal paper is used as labels for printing names and addresses of articles. For example, thermal labels may be adhered to plastic containers used in factories. Labels made of thermal paper are configured to develop color in response to heat. Therefore, characters and symbols can be written onto such labels with the use of a thermal head.

Recently, rewritable type thermal paper on which characters can be repeatedly written/erased, has been available in the market. When labels are used in logistics, it is convenient to be able to write/erase characters while the labels are attached to containers. Accordingly, there has been proposed a method of rendering characters by radiating laser beams onto the labels in a non-contact manner and generating heat (see, for example, patent document 1: Japanese Laid-Open Patent Application No. 2004-90026). Patent document 1 describes a relay lens system including plural lenses formed by flexible joints. An image formed by a laser light beam, which enters one end of the lens system, is transferred to (relayed to) the other end of the lens system.

The technology of forming images with the use of laser beams is conventionally known (see, for example, patent document 2: Japanese Laid-Open Patent Application No. 2004-341373). Patent document 2 describes an image forming method in which a single set of original image data is divided into plural lines, and a laser beam is radiated onto the photoconductive drum for each of the lines.

A typical laser beam has a diameter of at least approximately 0.3 mm, which is fairly large. Therefore, the stroke font is often used for rendering characters by laser beams. With the stroke font, there is no need to specify an outline and to fill in the area surrounded by the outline as in the case of the outline font, which is typically used for rendering characters. In the case of the stroke font, characters can be rendered as if they are written with a pencil, by scanning a laser beam according to coordinates defined by core data (data expressing the core) of a character. Furthermore, each line may be formed by a plurality of continuous lines. In this case, the connected lines are continuously rendered in such a manner as to trace the bent lines.

Meanwhile, there are cases of rendering thick lines on thermal paper with the use of a laser beam and the stroke font. Here, a thick line means a line that is thicker than a line width determined by the diameter of the laser beam. Thick lines are useful for highlighting characters and rendering barcodes. There are mainly three methods for rendering thick characters, as described below.

(1) Use outline font data or stroke font data to acquire outline data. Then, render the outline, and fill in the area inside the outline by raster scanning (see, for example, patent document 3: Japanese Laid-Open Patent Application No. S61-060177).

(2) Generate normal line vectors that are orthogonal to the strokes in the stroke data, without leaving any gaps between the normal lines. Then, render the normal line vector data to render thick lines (see, for example, patent document 4: Japanese Laid-Open Patent Application No. H08-279038, patent document 5: Japanese Laid-Open Patent Application No. H09-270018, and patent document 6: Japanese Laid-Open Patent Application No. H09-305779).

(3) Generate additional strokes parallel to an original stroke, without leaving any gaps between the strokes. Accordingly, the original stroke and the additional strokes appear to be a single line, and a thick line is generated (see, for example, patent document 7: Japanese Laid-Open Patent Application No. 2008-062506).

However, the problem with the method (1) is that when the light beam has a large diameter, thick lines cannot be rendered unless the character is large. For example, when a light beam having a diameter of 0.3 mm is used to render a character of 5 mm$^2$, the character may become blurred.

The same applies to the method (2). The generated strokes may have rough edges. FIG. 1 illustrates an example of one stroke rendered by the method (2). The laser beam has a substantially circular shape. Therefore, an uneven (bumpy) outline is formed by the end points of the plural normal lines, which are orthogonal to the stroke.

The method (3) does not have the same disadvantages as those of the methods (1) and (2). However, this method cannot be applied to characters with bent lines merely by generating additional strokes parallel to the original strokes without leaving any gaps between the strokes as described in patent document 7.

FIGS. 2A and 2B illustrate the problem of the method described in patent document 7. FIG. 2A illustrates an example of strokes included in a thick line, and FIG. 2B illustrates an example where the strokes have been rendered with a laser beam. In FIG. 2A, the thickness of the line corresponds to three strokes including two additional strokes parallel to the original stroke. The additional strokes are formed above and under the original stroke. The strokes form a line having a bent portion.

If the two additional strokes were generated by merely forming the same strokes as the original stroke at positions parallel to the original stroke, the strokes on the inner side of the bent portion would be too long, and the strokes on the outer side of the bent portion would be too short. Therefore, the strokes on the inner side have an overlapping part, and the strokes on the outer side have a detached part. The rendered character illustrated in FIG. 2B shows that excessive heat load is applied to the inner side of the bent portion where the laser beams overlap. Furthermore, on the outer side of the bent portion, part of the character is missing, which degrades the image quality.

In various characters, there may be strokes that intersect each other, or there may be strokes that bend at acute angles. In such cases, excessive heat load may be applied to an intersecting part because the radiated laser beams overlap each other. Furthermore, at a part where a stroke bends at an acute angle, the marking speed temporarily decreases, in consideration of the inertia of the device. As a result, the laser beam is radiated for a long time, and therefore excessive heat is applied.

FIG. 3 illustrates a Japanese katakana character "nu" (ヌ), which is rendered with two strokes. In this character, excessive heat load is applied to a part that bends at an acute angle 220, and also to an intersecting part 210.

Furthermore, when rendering characters with laser beams, the diameter of the laser beam needs to be taken into consideration.

FIGS. 4A and 4B illustrate examples of a Japanese katakana character "i" (イ), which is rendered with two strokes. In FIG. 4A, the diameter of the laser beam is sufficiently small, and therefore the two rendered strokes do not overlap. However, when the laser beam has a larger diameter, an overlapping part 230 is formed where the two strokes are close to each other, and therefore excessive heat load is applied to the overlapping part 230.

Accordingly, there is a need for an information processing apparatus, a laser radiation device, a render information generating method, a control system, a program, a recording medium, and a render information storage device capable of rendering thick lines with high image quality and without damaging the medium, even when the diameter of the laser beam is large with respect to the size of the diagram or character to be rendered.

DISCLOSURE OF INVENTION

Aspects of the present invention provide an information processing apparatus, a laser radiation device, a render information generating method, a control system, a program, a recording medium, and a render information storage device that solve or reduce one or more problems caused by the limitations and disadvantages of the related art.

An aspect of the present invention provides an information processing apparatus for generating render information of a line image that is rendered onto a medium that develops color in response to receiving energy, the line image being rendered by intermittently transferring the energy to the medium while moving an energy transfer position, the information processing apparatus including a shape information storage unit configured to store shape information of one or more strokes forming the line image, wherein the shape information is included in the render information; a shape information acquiring unit configured to acquire, from the shape information storage unit, the shape information of the one or more strokes forming the line image that is a rendering target; a thickness information acquiring unit configured to acquire thickness information of the line image; a stroke generating unit configured to generate a predetermined number of parallel strokes that are each substantially parallel to an original stroke among the one or more strokes forming the line image, and to specify intervals between the parallel strokes, wherein the predetermined number corresponds to the thickness information and the intervals are specified based on the thickness information; a stroke length adjusting unit configured to adjust at least one of a length of a first parallel stroke that is parallel to a first original stroke and a length of a second parallel stroke that is parallel to a second original stroke that is connected to the first original stroke; and a render information generating unit configured to register, in the render information of the line image that is the rendering target, the shape information of the parallel stroke whose length has been adjusted.

An aspect of the present invention provides a render information generating method for generating render information of a line image that is rendered onto a medium that develops color in response to receiving energy, the line image being rendered by intermittently transferring the energy to the medium while moving an energy transfer position, the render information generating method including acquiring shape information of the line image that is a rendering target, from a shape information storage unit storing the shape information of one or more strokes forming the line image, wherein the shape information is included in the render information; acquiring thickness information of the line image; generating a predetermined number of parallel strokes that are each substantially parallel to an original stroke among the one or more strokes forming the line image, and specifying intervals between the parallel strokes, wherein the predetermined number corresponds to the thickness information and the intervals are specified based on the thickness information; adjusting at least one of a length of a first parallel stroke that is parallel to a first original stroke and a length of a second parallel stroke that is parallel to a second original stroke that is connected to the first original stroke; and registering, in the render information of the line image that is the rendering target, the shape information of the parallel stroke whose length has been adjusted.

An aspect of the present invention provides a control system including an energy transfer device configured to cause a medium to develop color to render a line image, by intermittently transferring energy onto the medium while moving an energy transfer position; and an information processing apparatus configured to generate render information of the line image that is a rendering target, the information processing apparatus including a shape information acquiring unit configured to acquire shape information of the line image that is the rendering target, from a shape information storage unit storing the shape information of one or more strokes forming the line image, wherein the shape information is included in the render information; a thickness information acquiring unit configured to acquire thickness information of the line image; a stroke generating unit configured to generate a predetermined number of parallel strokes that are each substantially parallel to an original stroke among the one or more strokes forming the line image, and to specify intervals between the parallel strokes, wherein the predetermined number corresponds to the thickness information and the intervals are specified based on the thickness information; a stroke length adjusting unit configured to adjust at least one of a length of a first parallel stroke that is parallel to a first original stroke and a length of a second parallel stroke that is parallel to a second original stroke that is connected to the first original stroke; a render information generating unit configured to register, in the render information of the line image that is the rendering target, the shape information of the parallel stroke whose length has been adjusted; and a render command generating unit configured to generate, based on the render information, a render command that is interpreted by the energy transfer device, wherein the energy transfer device intermittently transfers the energy onto the medium while moving the energy transfer position based on the render command to cause the medium to develop color.

An aspect of the present invention provides a program for generating render information of a line image that is rendered onto a medium that develops color in response to receiving energy, the line image being rendered by intermittently transferring the energy to the medium while moving an energy transfer position, the program causing a computer to function as a shape information acquiring unit configured to acquire shape information of the line image that is a rendering target, from a shape information storage unit storing the shape information of one or more strokes forming the line image, wherein the shape information is included in the render information; a thickness information acquiring unit configured to acquire thickness information of the line image; a stroke generating unit configured to generate a predetermined number of parallel strokes that are each substantially parallel to an original stroke among the one or more strokes forming the line image, and to specify intervals between the parallel strokes, wherein the predetermined number corresponds to the thickness information and the intervals are specified based on the thickness information; a stroke length adjusting unit configured to adjust at least one of a length of a first parallel stroke that is parallel to a first original stroke and a length of a second parallel stroke that is parallel to a second original stroke that is connected to the first original stroke; and a render information generating unit configured to register, in the render information of the line image that is the rendering target, the shape information of the parallel stroke whose length has been adjusted.

BRIEF DESCRIPTION OF DRAWINGS

FIG. 9 illustrates an example of font data and a render command;

FIG. 16 illustrates a problem that arises at a bent portion of a line;

FIG. 20 is a flowchart for describing in detail the process of calculating overlapping strokes of step S90 in FIG. 11;

FIG. 22 schematically illustrates a process of dividing/shortening a stroke;

FIG. 26 is for describing the rendering order of stroke set groups;

FIGS. 27A and 27B illustrate examples of strokes and rendering results of a character B, in which strokes have been grouped together;

FIG. 30 schematically illustrates a process of generating a render command for a thick character;

BEST MODE FOR CARRYING OUT THE INVENTION

Figure 1:
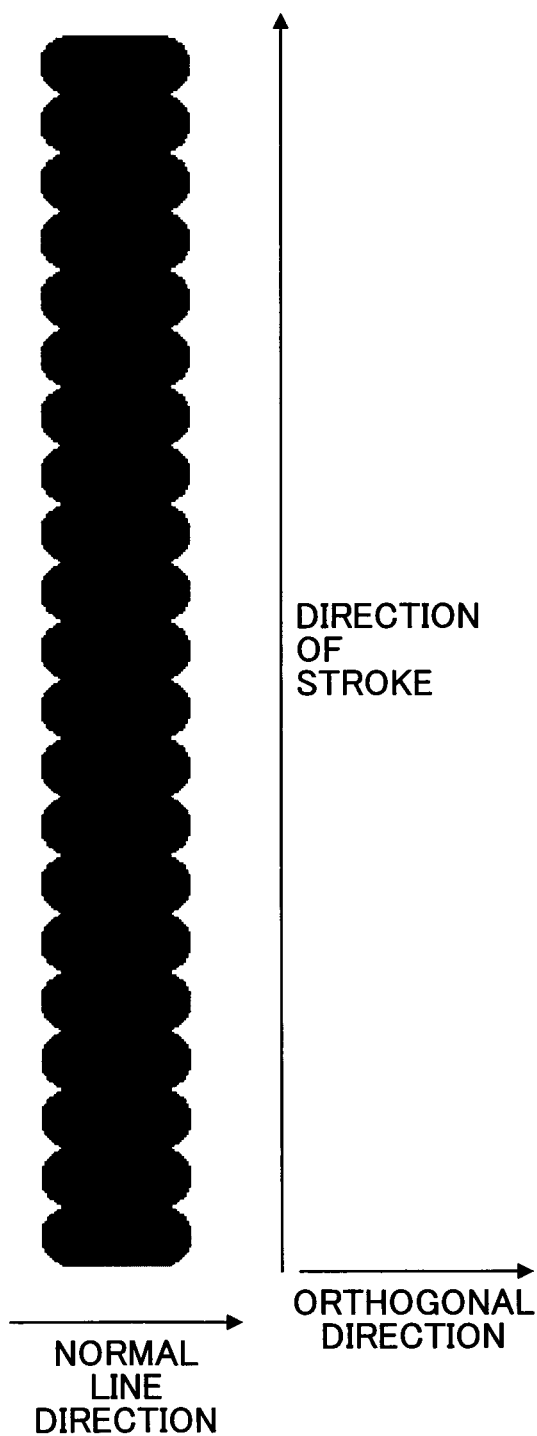
FIG. 1 illustrates an example of one stroke rendered by a conventional method.

Embodiments of the present invention are described below with reference to the accompanying drawings.

An outline of the rendering process performed by a laser radiation device according to an embodiment of the present invention is given below.

(A) The laser radiation device uses font data of the stroke font.
  By using the stroke font, even small characters can be rendered with laser beams.

(B) To render thick characters, the laser radiation device generates additional strokes parallel to the original strokes.
  Accordingly, when rendering a thick character, an uneven (bumpy) outline is prevented.

(C) When original strokes (before thickening the character) include a bent portion (of the line), the lengths of additionally generated strokes are adjusted so that the additional strokes are connected.
  Accordingly, overlapping parts of strokes are eliminated, so that the thermal rewritable medium (or rewritable medium) is prevented from being overheated, and characters with good appearance can be rendered.

(D) When a stroke is bent at an acute angle, the stroke is divided at the bent portion, or the radiation power is reduced at the bent portion.
  Accordingly, the thermal rewritable medium is prevented from being overheated at the bent portion.

(E) When plural strokes are intersecting each other, the stroke is divided at the intersecting part, or the radiation power is reduced at the intersecting part.

Accordingly, the thermal rewritable medium is prevented from being overheated at the intersecting part.

In the following, a left-hand side of a Chinese character, a right-hand side of a Chinese character, and portions of the left-hand side or the right-hand side are referred to as a character (without being distinguished from a whole character). Each character is constituted by one or more strokes. Each stroke is expressed by font data of the stroke font. The characters may include numbers or symbols (e.g., !, $, %, &, ?), pictorial symbols, face marks, etc.

In an embodiment according to the present invention, it is assumed that a stroke is a straight line or a curved line having a render-starting point and a render-ending point. The render-ending point may or may not correspond to a render-starting point of another stroke. The strokes may be subjected to processing. For example, a stroke may be divided so that it can be appropriately rendered by a laser beam. In another example, a curved line may be replaced by straight lines. Accordingly, a single stroke may be divided into plural strokes. Each of the plural strokes has a render-starting point and a render-ending point.

The font data of the stroke font may be optimized in advance for the rendering process of characters performed by a laser radiation device 200. Font data of the stroke font specified by a public institution (for example, Japanese Standards Association or ISO) may be used.

In the following, parts where characters or strokes are overlapping are collectively referred to as overlapping parts, when there is no need to distinguish whether the corresponding part is an intersecting part, an overlapping part, or a turn-back part.

First Embodiment

Figure 5:
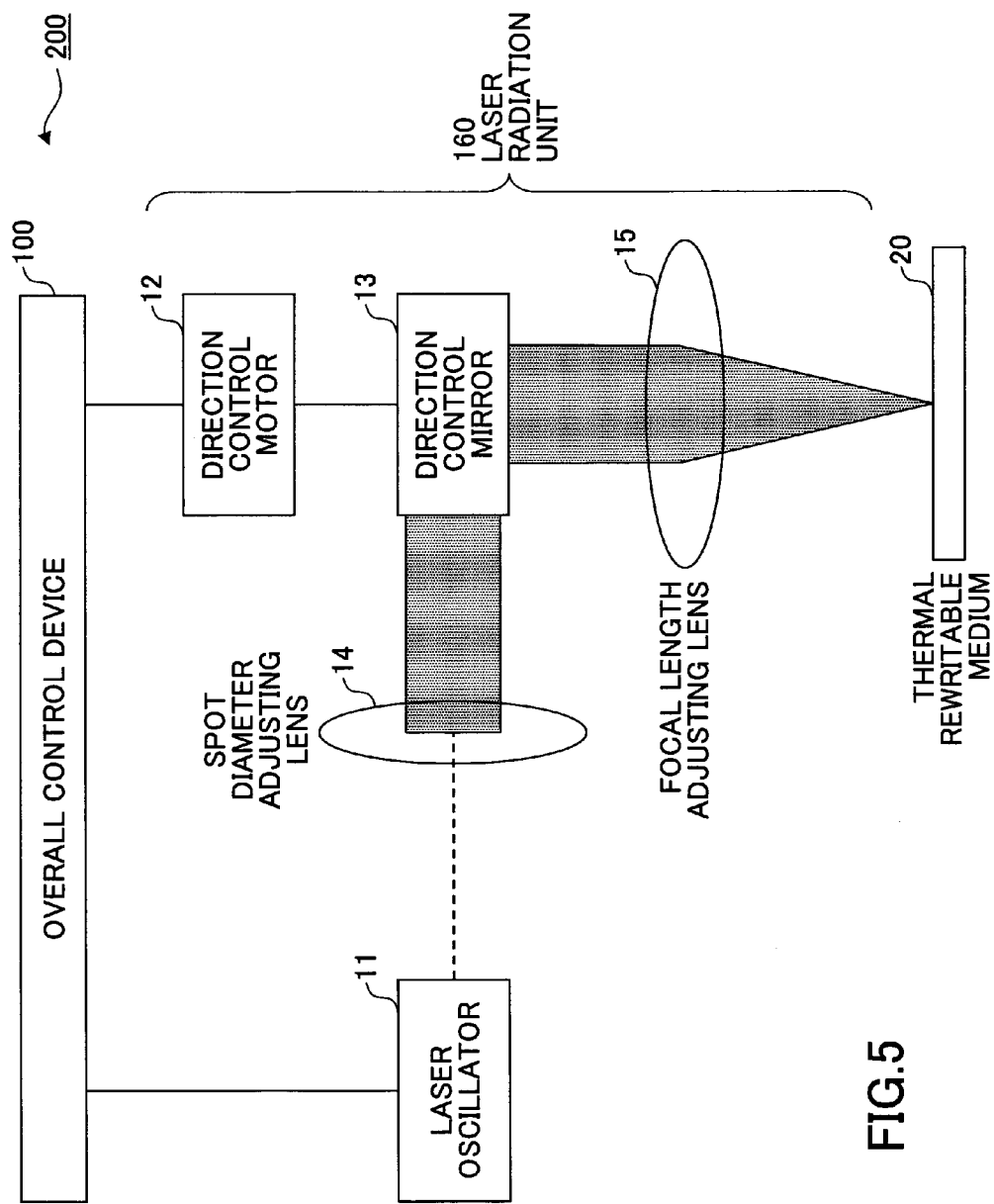
FIG. 5 illustrates a hardware configuration of a laser radiation device.

FIG. 5 illustrates a hardware configuration of the laser radiation device 200 according to a first embodiment of the present invention. The laser radiation device 200 includes an overall control device 100 for controlling the overall device and a laser radiation unit 160 configured to radiate laser beams. The laser radiation unit 160 includes a laser oscillator 11 for radiating laser beams, a direction control mirror 13 for changing the direction of the radiated laser beams, a direction control motor 12 for driving the direction control mirror 13, a spot diameter adjusting lens 14, and a focal length adjusting lens 15.

The laser oscillator 11 is a semiconductor laser (laser diode (LD)). The laser oscillator 11 may be a gas laser diode, a solid-state laser, or a liquid laser. The direction control motor 12 may be a servomotor for controlling the direction of the reflection surface of the direction control mirror 13 in a biaxial manner. The direction control motor 12 and the direction control mirror 13 constitute a galvano mirror. The spot diameter adjusting lens 14 is for increasing the spot diameter of a laser beam. The focal length adjusting lens 15 is for converging the laser beam and adjusting the focal length.

A thermal rewritable medium 20 is, for example, a sheet of rewritable thermal paper. Specifically, the thermal rewritable medium 20 is made of a film in which leuco dye and a color developer are separated. When heat of a predetermined temperature Ta is applied to the film, the leuco dye and the color developer are combined, and a color appears. When heat of a predetermined temperature Tb, which is lower than the predetermined temperature Ta, is applied to the film, the leuco dye and the color developer are separated once again, and the color disappears. According to the present embodiment, the thermal rewritable medium 20 is prevented from being degraded. The present embodiment is also applicable to a medium that is not rewritable, such as thermal paper.

The spot diameter of the laser beam generated by the laser oscillator 11 is increased as the laser beam passes through the spot diameter adjusting lens 14. The direction of the laser beam is adjusted by the galvano mirror in accordance with the shape of the character. Then, the laser beam is converged to a predetermined focal length by the focal length adjusting lens 15, and radiated onto the thermal rewritable medium 20. When the thermal rewritable medium 20 is irradiated by the laser beam, the thermal rewritable medium 20 is heated. The heat causes the thermal rewritable medium 20 to develop color, so that a character is rendered. At this stage, the erasing power is not exerted.

The radiation position is adjusted as the overall control device 100 drives the direction control motor 12 to move the direction control mirror 13. The laser beam and the power are turned on and off as the overall control device 100 controls the laser oscillator 11 (i.e., the laser beam is intermittently turned on and off). The width of the rendered stroke may be adjusted by controlling the power and the position of the focal length adjusting lens 15.

Figure 6:
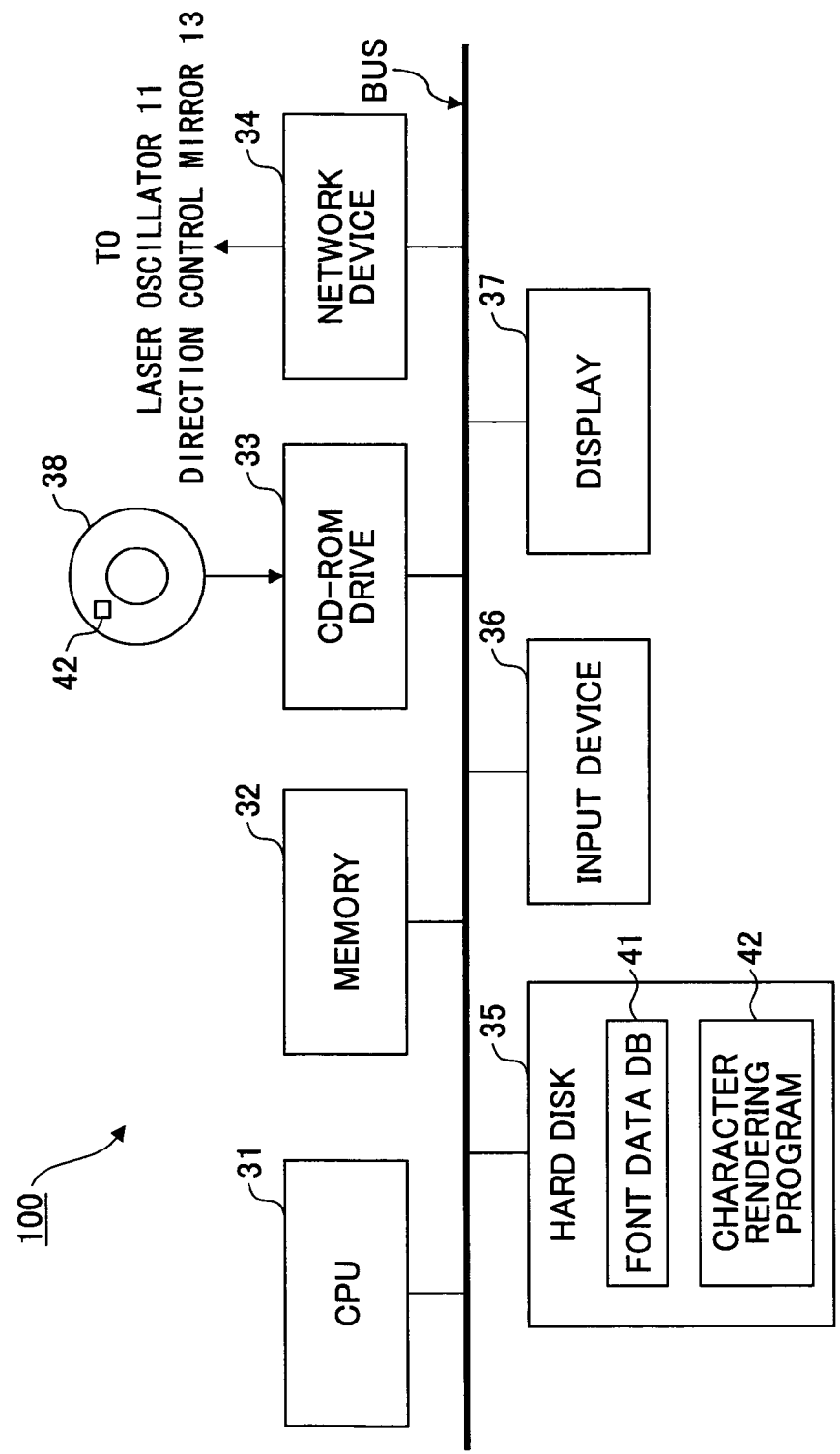
FIG. 6 illustrates a hardware configuration of an overall control device.

FIG. 6 illustrates a hardware configuration of the overall control device 100. In FIG. 6, the overall control device 100 is implemented by software, and the entity of the overall control device 100 is a computer. When the entity of the overall control device 100 is not a computer, the overall control device 100 may be implemented by an IC (such as ASIC (Application Specific Integrated Circuit)) generated for particular functions.

The overall control device 100 includes a CPU 31, a memory 32, a hard disk 35, an input device 36, a CD-ROM drive 33, a display 37, and a network device 34. The hard disk 35 includes a font data DB 41 and a character rendering program 42. The font data DB 41 stores font data of a series of characters of the stroke font. The character rendering program 42 is for generating a render command excluding overlapping parts from the font data, and controlling the laser radiation unit 160.

The CPU 31 reads the character rendering program 42 from the hard disk 35, executes the character rendering program 42, and generates a render command according to the process described below. The memory 32 is a volatile memory such as a DRAM, which is used as a work area when the CPU 31 executes the character rendering program 42. The input device 36 includes a mouse and a keyboard, which are used by the user to input instructions for controlling the laser radiation unit 160. The display 37 is a user interface that displays a GUI (Graphical User Interface) screen page based on a predetermined resolution and a predetermined number of colors according to screen page information instructed by the character rendering program 42. For example, an input field of characters to be rendered onto the thermal rewritable medium 20 may be displayed on the display 37.

The CD-ROM drive 33 is used for removably inserting a CD-ROM 38, reading data from the CD-ROM 38, and writing data into a recording medium. The character rendering program 42 and the font data DB 41 may be distributed to the laser radiation device 200 in the CD-ROM 38, and read out from the CD-ROM 38 to be installed into the hard disk 35. The CD-ROM 38 may be replaced by a nonvolatile memory such as a DVD, a blue-ray disk, an SD card, a memory stick (registered trademark), a multimedia card, and an xD card.

The network device 34 is an interface (for example, an Ethernet (registered trademark) card) for connecting the laser radiation device 200 to a network such as LAN or the Internet. The network device 34 executes a process according to a protocol defined in the physical layer or the data link layer of an OSI basic reference model to transmit, to the laser radiation unit 160, a render command according to character codes. The character rendering program 42 and the font data DB 41 may be downloaded from a predetermined server connected via a network. The overall control device 100 and the laser radiation unit 160 may be directly connected to a predetermined server via a USB (Universal Serial Bus), IEEE 1394, a wireless USB, or Bluetooth, instead of via a network.

The characters that are to be rendered onto the thermal rewritable medium 20 are stored in the hard disk 35 in the form of a list, or input from the input device 36. The characters are specified by character codes of UNICODE or JIS codes. The overall control device 100 reads, from the font data DB 41, font data of characters corresponding to character codes, and converts the font data into render commands, to control the laser radiation unit 160.

Conventional Rendering Process

Figure 7:
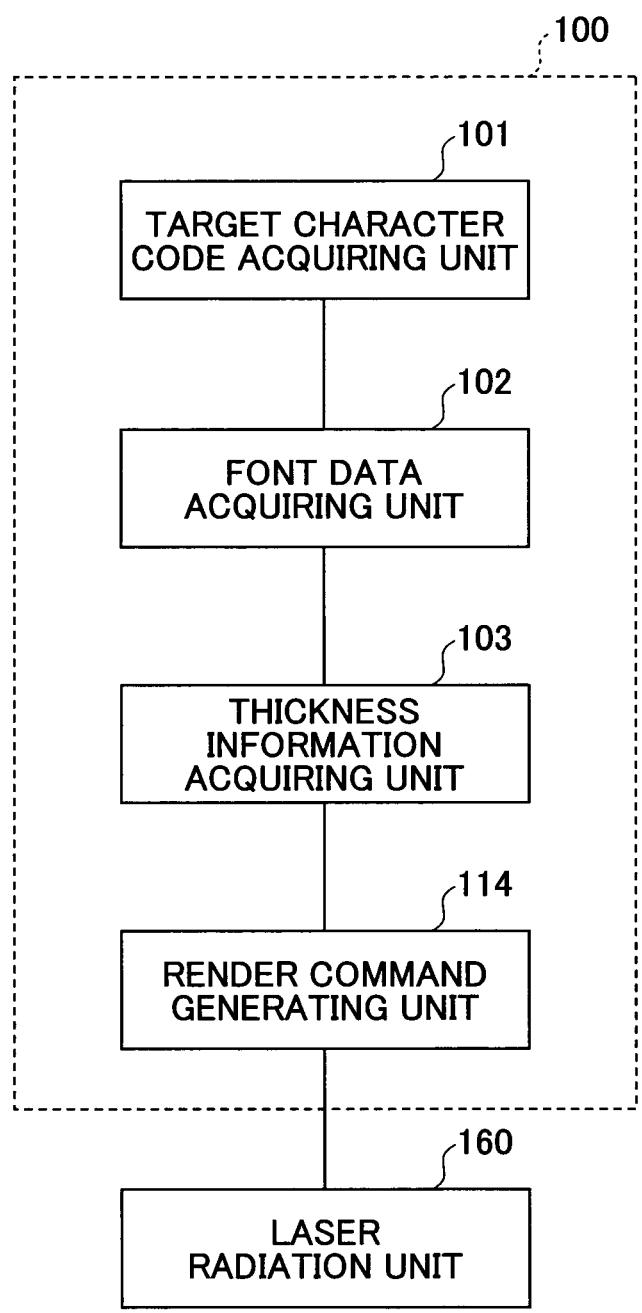
FIG. 7 is a functional block diagram of a conventional laser radiation device.
Figure 8:
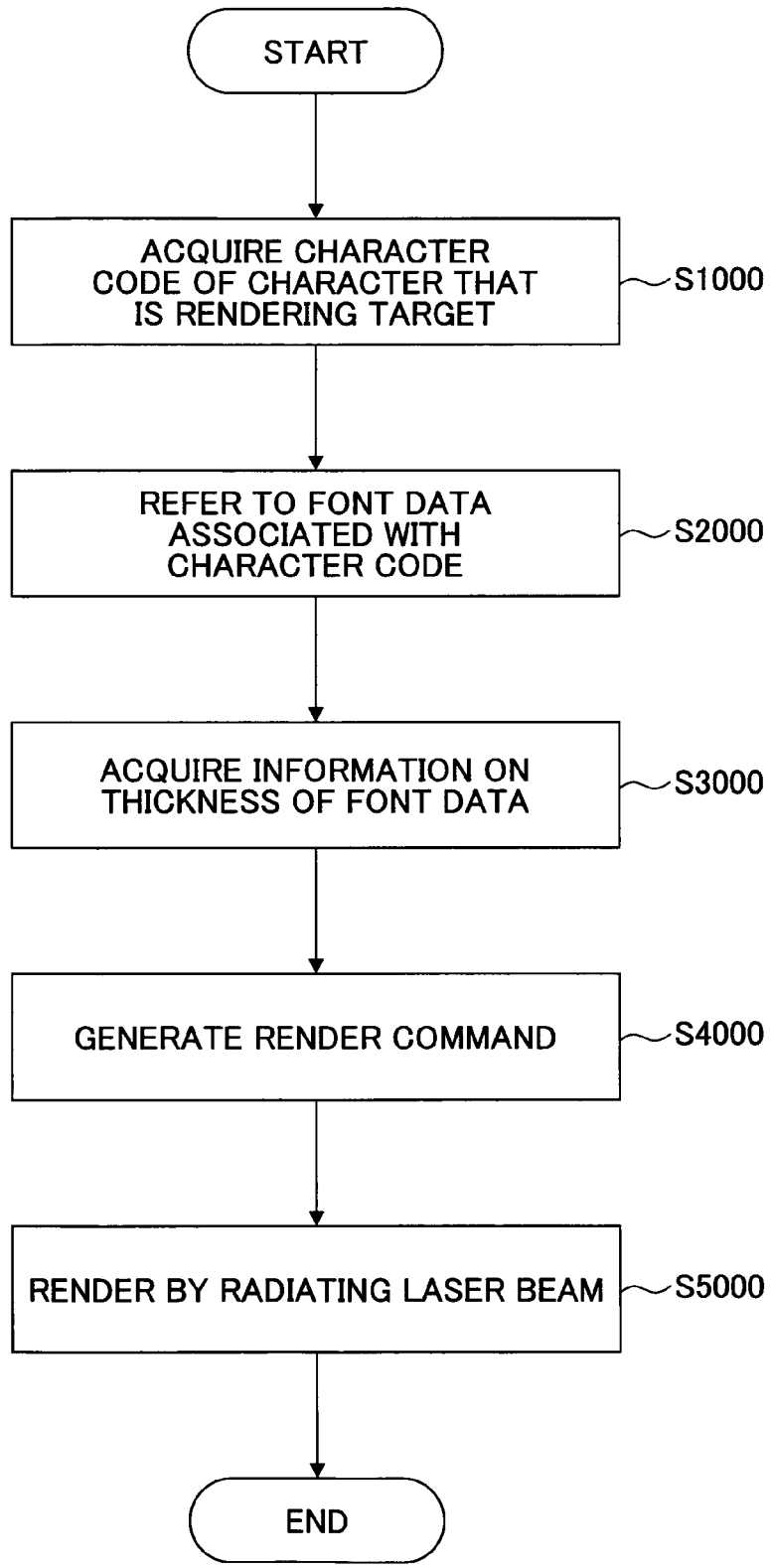
FIG. 8 is a flowchart of a process of rendering the stroke font performed by the conventional laser radiation device.

First, a description is given of a conventional process of rendering the stroke font with the use of laser beams. FIG. 7 is a functional block diagram of a conventional laser radiation device. FIG. 8 is a flowchart of a process of, rendering the stroke font performed by the conventional laser radiation device.

First, a target character code acquiring unit 101 acquires a character code of a character that is a rendering target (step S1000). The character code of a character that is a rendering target may be input from the input device 36 or stored in the hard disk 35 in advance (including cases where the character code is input via a network). When the character code is input from the input device 36, the target character code acquiring unit 101 receives a character code corresponding to a key code that is input as the user presses a key of the keyboard, or a character code generated as a result of a conversion process performed on a key code by the IME (Input Method Editor) when the IME is activated. When the character is stored in the hard disk 35 in advance, character strings such as destinations are stored in the form of a list, and therefore character codes specifying characters of the stored character strings are read out and input to the target character code acquiring unit 101.

Next, a font data acquiring unit 102 refers to the font data DB 41 based on the character code, and reads out font data associated with the character code (step S2000).

FIG. 9-(*a*) illustrates an example of font data. The font data corresponds to a character (numeral) "1", and defines the strokes (straight lines or curved lines). The font data includes coordinates of end points and the rendering order. The coordinates are defined based on an origin corresponding to a predetermined pixel in a bitmap format, when the characters are arranged in a bitmap format.

When a laser beam is used to render the stroke font, it is necessary to determine whether the laser radiation unit 160 moves while radiating a laser beam or the laser radiation unit 160 moves without radiating a laser beam. However, this determination cannot be made based on only coordinates. Thus, the font data of the stroke font includes a render-starting point that indicates where to start the radiation of a laser beam (where a human being would put his pen down on a sheet of paper to start writing) and a move command, and a render-ending point that indicates where to end the radiation of the laser beam (where a human being would lift his pen up from the sheet of paper) and a move command. In the font data in FIG. 9-(*a*), "m" indicates a move command to move from the render start position to the next coordinate while radiating a laser beam, and "d" indicates a move command to move from the render end position to the next coordinate without radiating a laser beam. That is to say, "m" means to move while writing on the paper with a pen, and "d" means to move while the pen is lifting up from the paper. As described above, the font data defines the shape of the character by coordinates, the rendering order, the rendering direction (denoted by arrows in FIG. 9-(*c*)), and whether to radiate a laser beam by indications of "m" or "d".

Therefore, in the font data shown in FIG. 9-(*a*), a stroke is rendered from coordinates (24, 24) to coordinates (88, 24). The laser radiation unit 160 moves without rendering a stroke from coordinates (88, 24) to coordinates (56, 24). A stroke is rendered from coordinates (56, 24) to coordinates (56, 224). A stroke is rendered from coordinates (56, 224) to coordinates (24, 176).

The stroke font is a type of scalable font, like the outline font. For example, the size of a character rendered on the thermal rewritable medium 20 can be specified. There are several known methods of adjusting sizes of characters of the stroke font. In this example, as a matter of description, the coordinates of the font data are simply multiplied by two. In another example, the coordinates of the strokes may be adjusted according to the length from the center of the character.

FIG. 9-(*b*) illustrates an example of coordinates of strokes that are multiplied by two. As described below, in the present embodiment, the laser radiation device 200 determines whether there are any overlapping parts based on the coordinates of the rendered strokes and the thickness of the character. For example, the numeral "1" is rendered with three straight lines. Therefore, in this case, there are three sets of coordinates of strokes. The numbers in brackets [ ] indicate the order in which the strokes are rendered. There are four numbers adjacent to each number indicating the order. Among these four numbers, the first two indicate the render-starting point of the stroke and the last two indicate the render-ending point of the stroke. The order in which the strokes are rendered is optimized later. The rendering order in FIG. 9-(*b*) corresponds to the order registered in the font data. However, the rendering order can be optimized later.

FIG. 9-(*c*) illustrates an example of a character rendered based on font data for laser beams. Lines 91 through 93 correspond to trajectories along which the center part of the laser beam has passed, and the direction of the arrows indicate the direction in which the rendering has been performed. The areas surrounding the arrows are parts that have been rendered by the laser beam (i.e., where a color has appeared in response to the laser beam). The width of the area surrounding the arrow corresponds to the thickness of the character. The numbers (91 through 93) of the lines represent the order in which the lines 91 through 93 have been rendered. The rendered numeral "1" has a thickness that corresponds to the power of the laser beam and the focal position of the focal length adjusting lens 15.

Referring back to FIG. 8, a thickness information acquiring unit 103 acquires information on the thickness of the font data (thickness information) (step S3000). The thickness information is either registered in the font data DB 41 or input by the user with the input device 36. The thickness of the character depends on the diameter of the laser beam radiated onto the thermal rewritable medium 20. Thus, based on the thickness information, the laser radiation device 200 controls output of the laser oscillator 11 and controls the focal length adjusting lens 15.

Rendering Process According to Present Embodiment

Next, a description is given of a process of rendering characters according to the present embodiment.

Figure 10:
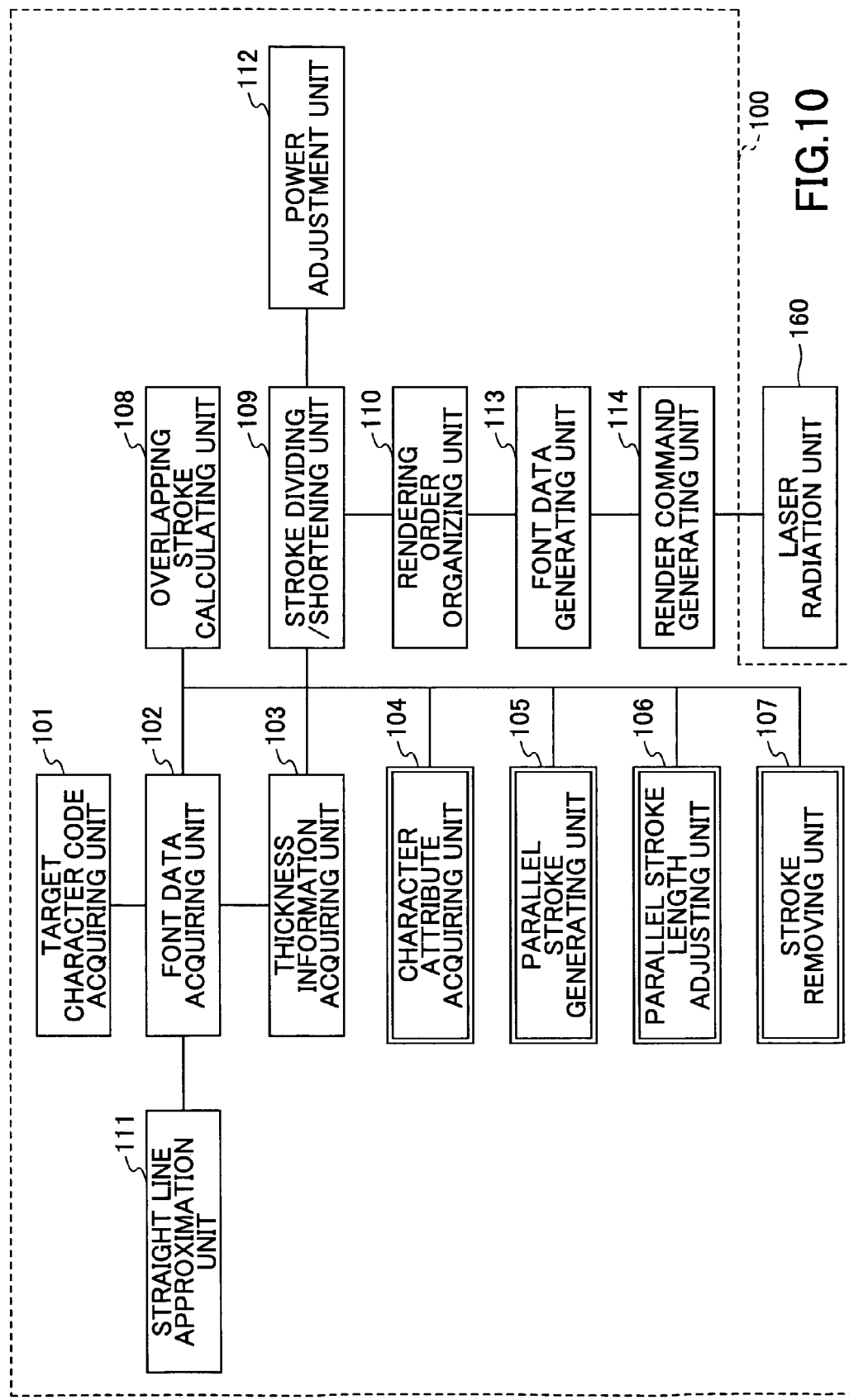
FIG. 10 is a functional block diagram of a laser radiation device according to a first embodiment of the present invention.

FIG. 10 is a functional block diagram of the laser radiation device according to the present embodiment. When the blocks are implemented by software, the blocks are implemented as the CPU 31 executes the character rendering program 42. Descriptions of elements in FIG. 10 are given below, together with the description of a process performed by the overall control device 100.

Figure 11:
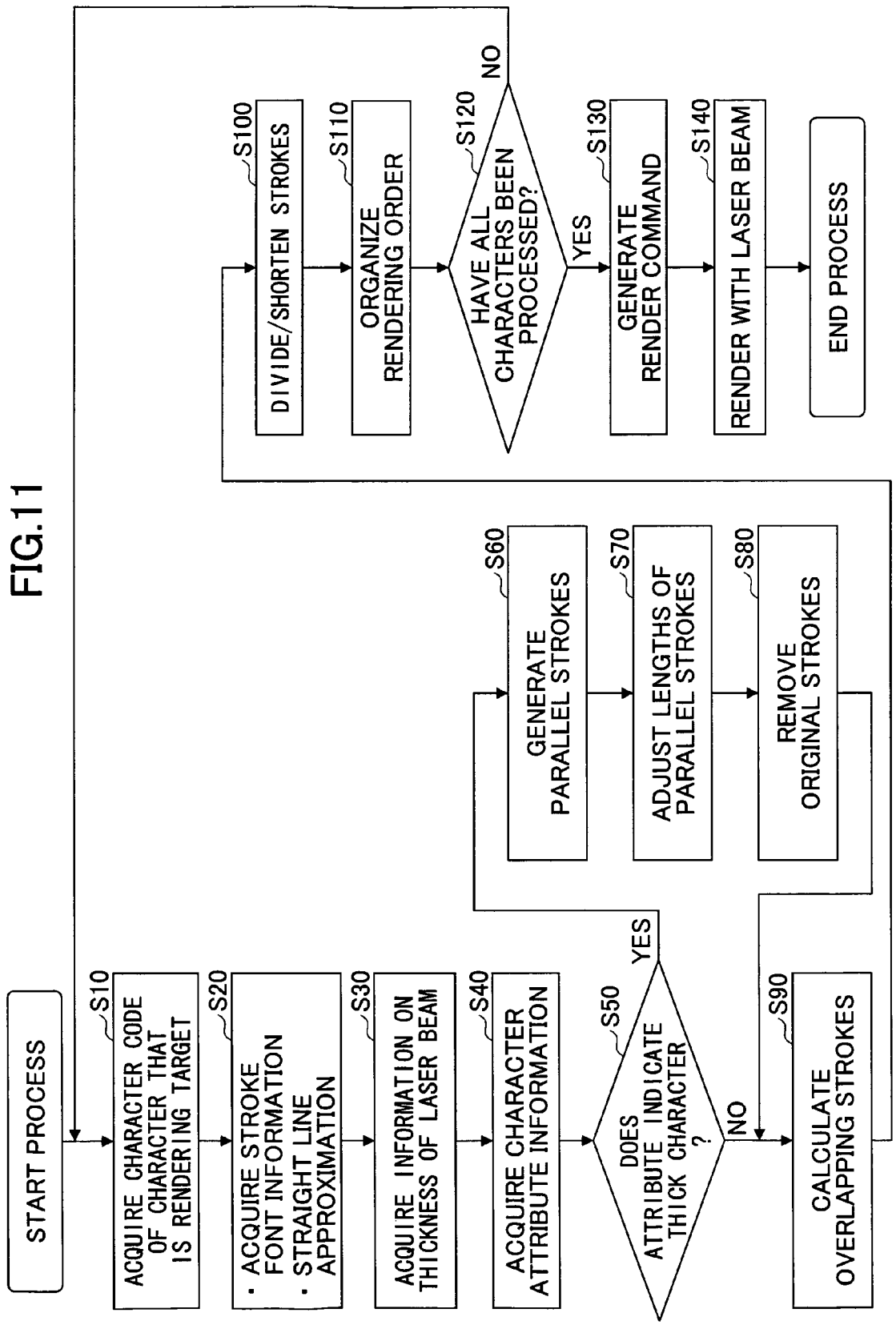
FIG. 11 is a flowchart of a process of rendering a character of a stroke font performed by the laser radiation device.

FIG. 11 is a flowchart of a process of generating optimal font data for rendering stroke fonts with a laser beam, performed by the overall control device 100 according to the present embodiment. The process is sequentially described below with reference to FIG. 11.

<Steps S10-S30>

Steps S10 through S30 have been described with reference to FIGS. 7 through 9, and thus not further described.

<Step S40: Acquire Character Attribute Information>

A character attribute acquiring unit 104 acquires character attribute information of a character that is the rendering target. In this example, the character attributes indicate whether the character is a character having a regular thickness (hereinafter, regular character) or whether the character is a thick character. As described below, outline characters (void characters) and italicized characters may also be included among the character attributes. The character attribute can be specified for each character. The character attribute can be specified according to information input to the input device 36 by a user. When the character attribute is a thick character, the user may input information specifying the thickness of the character to the input device 36, or the thickness of the character (thick character thickness specification information) may be specified in advance.

The thickness of the character in step S30 defines the diameter of the laser beam. When the character attribute indicates that the character is a regular character, the rendering target character is rendered with a thickness specified in step S30.

<Yes in Step S50>

When the character attribute indicates a thick character, steps S60 through S80 are executed.

<Step S60>

Figure 2A:
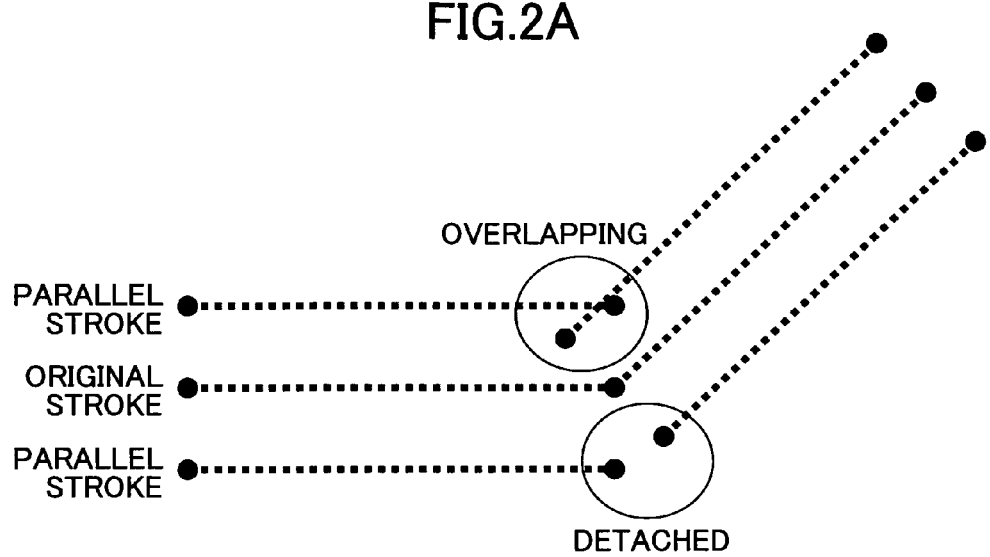
FIGS. 2A and 2B illustrate the problem of the conventional method.
Figure 2B:
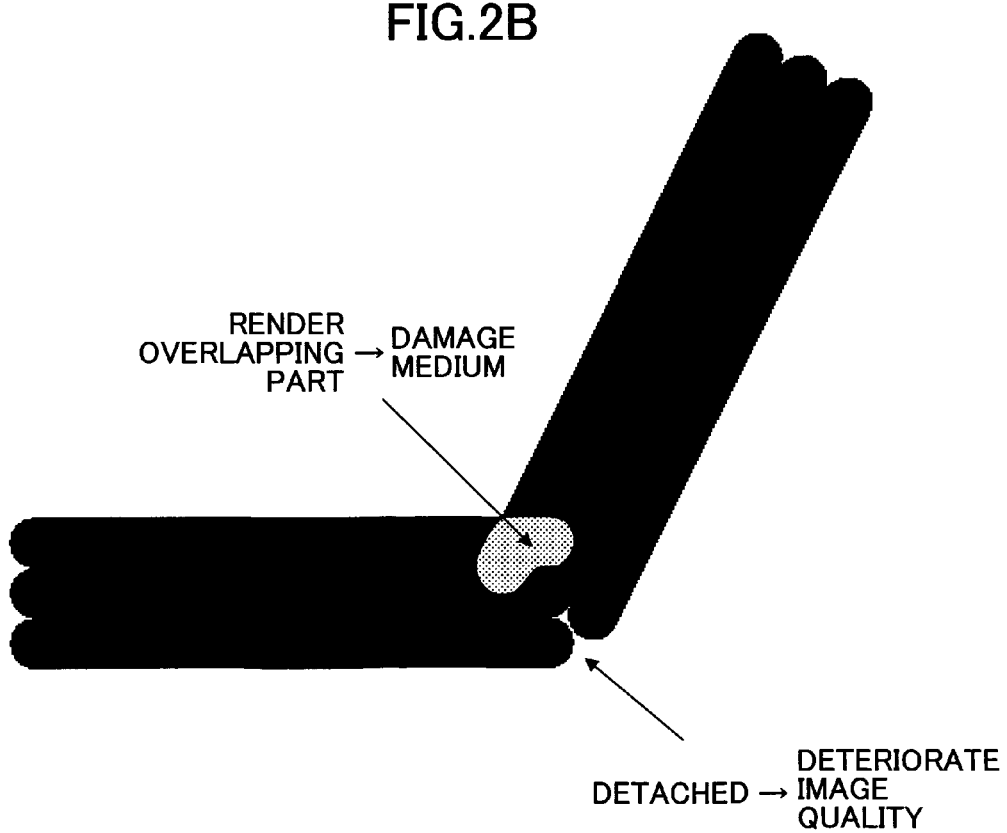
Figure 3:
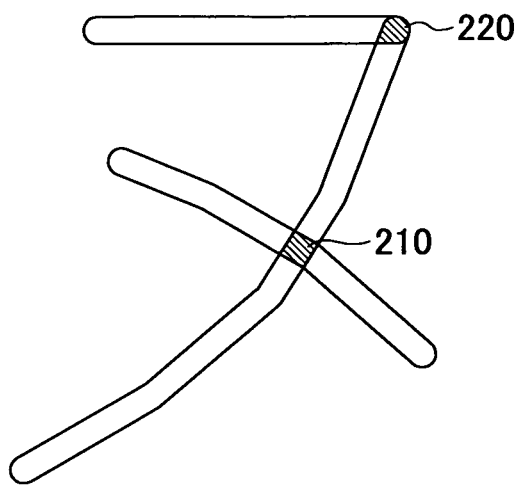
FIG. 3 is for describing a problem that arises when rendering a character with two strokes.
Figure 4A:
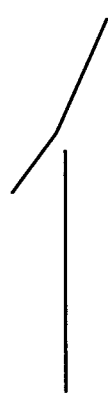
FIGS. 4A and 4B are for describing another problem that arises when rendering a character with two strokes.
Figure 4B:
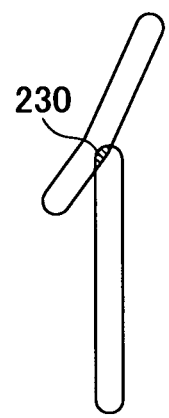

A parallel stroke generating unit 105 generates strokes parallel to the original stroke, as described with reference to FIG. 2B. Specifically, parallel strokes are obtained as follows.

The parallel stroke generating unit 105 determines the number of strokes to be rendered according to the thickness specified in the thick character thickness specification information. In this example, the thick character thickness specification information includes the number of strokes to be rendered. The parallel stroke generating unit 105 generates a number of parallel strokes corresponding to the number specified in the thick character thickness specification information (the original stroke may be removed later). Specifically, the same stroke as the original stroke is generated as a parallel stroke. When the same stroke as the original stroke is generated, the coordinates are the same. Therefore, the position of the parallel stroke is adjusted as described below.

Figure 12:
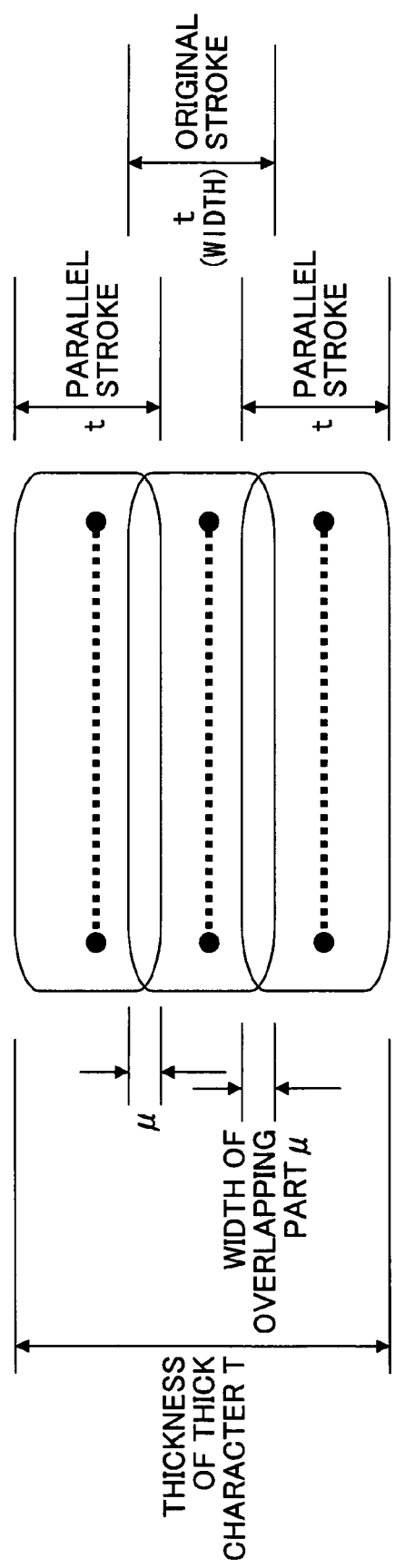
FIG. 12 illustrates an example of a method of determining the number of strokes.

In another example, the thick character thickness specification information may indicate the thickness of the thick character to be rendered. In this case, the number of strokes to be generated is determined as follows. FIG. 12 illustrates an example of a method of determining the number of strokes. When rendering a thick character, it is assumed that the width of each part where adjacent strokes overlap is "$\mu$", the thickness of each stroke (diameter of laser beam) is "t", the thickness of the thick character to be obtained is "T", and the number of parallel strokes to be rendered is "n".

Based on FIG. 12, the following equations are satisfied.

$$n(t-\mu)+\mu=T$$

$$n=(T-\mu)/(t-\mu)$$

The number of parallel strokes "n" is to be an integer, and therefore the closest integer to the calculated "n" is selected.

Next, the parallel stroke generating unit 105 determines the position where the new stroke is to be located. In order to maintain the shape of the original stroke font as much as possible, it is preferable that the same number of parallel strokes is added to either side of the original stroke. The process differs depending on whether the total number of strokes to be rendered is an odd number or an even number.

Odd Number of Strokes are Added

Figure 13:
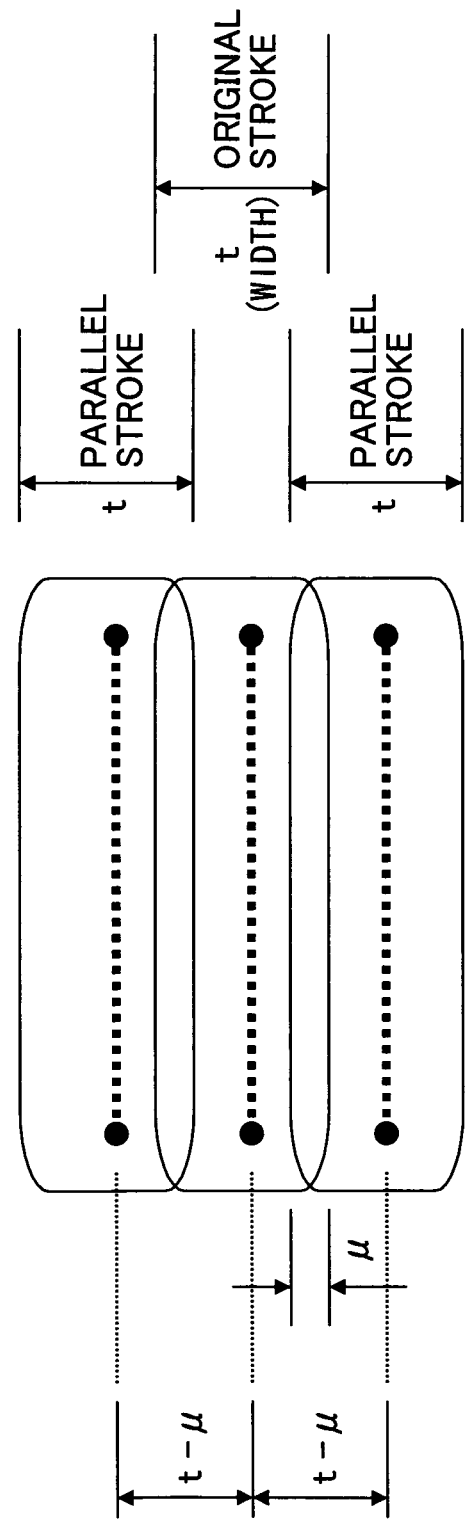
FIG. 13 illustrates an example of a method of determining the positions of parallel strokes when an odd number of parallel strokes are to be rendered.

FIG. 13 describes an example of a method of determining the positions of the parallel strokes when an odd number of parallel strokes are generated. As shown in FIG. 13, the edges of adjacent parallel strokes are overlapping each other such that the heat load is not excessive. By having such overlapping parts, gaps can be prevented from being formed between the strokes. The width of the overlapping part "$\mu$" may be appropriately set according to the thermal rewritable medium and the environmental temperature.

In consideration of the width of the overlapping part "$\mu$", the parallel stroke generating unit 105 determines that the new generated stroke is to be positioned at "$k(t-\mu)$" with respect to the original stroke, where "k" is an integer of greater than or equal to zero. The value of "k" is determined based on the number of strokes to be rendered. For example, "k=0, 1" when three parallel strokes are to be rendered, and "k=0, 1, 2" when five parallel strokes are to be rendered. When "k=0", "$k(t-\mu)$" corresponds to the position of the original stroke. Thus, a parallel stroke may be located at the position of the original stroke. One of the parallel strokes is located at the position of the original stroke, and the rest of the parallel strokes are located away from the original stroke by "$t-\mu$", "$2(t-\mu)$", and so forth. The parallel stroke generating unit 105 arranges the parallel strokes so as to be line-symmetric with respect to the original stroke.

Even Number of Strokes are Added

Figure 14:
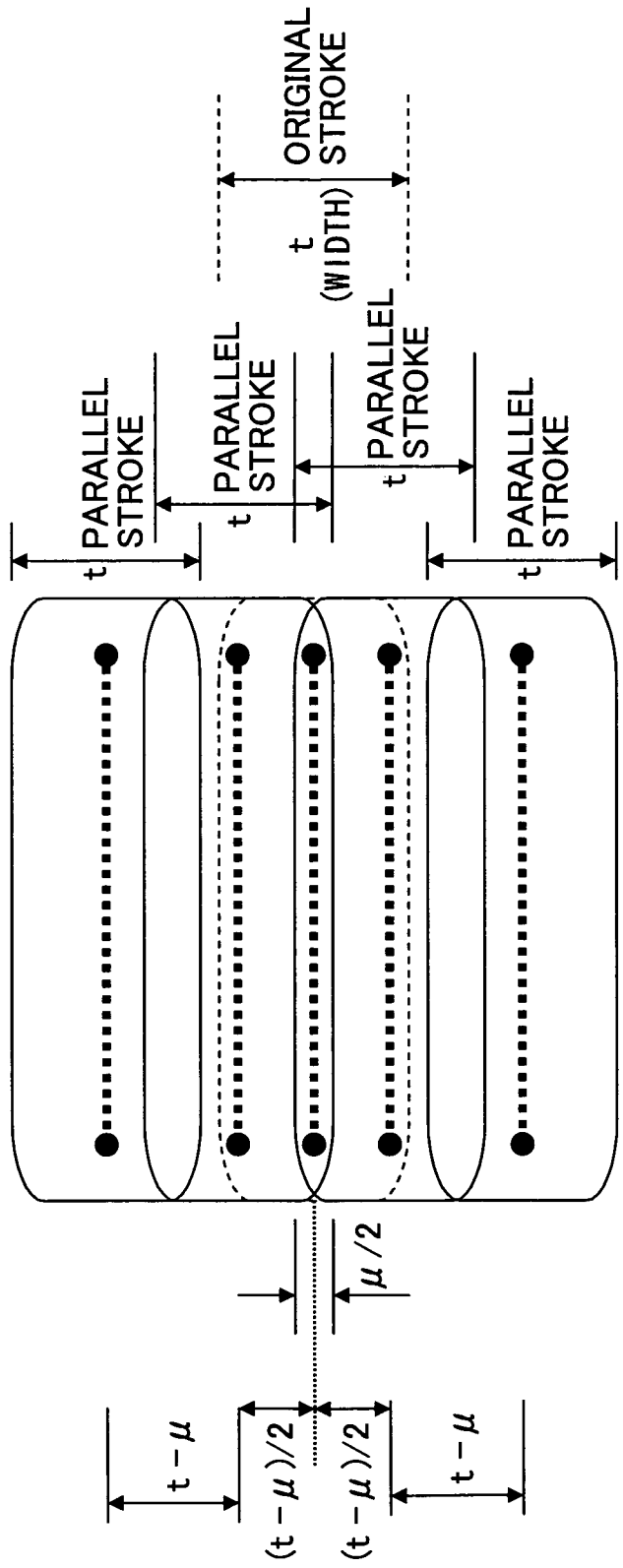
FIG. 14 illustrates an example of a method of determining the positions of parallel strokes when an even number of parallel strokes are to be rendered.

FIG. 14 describes an example of a method of determining the positions of the parallel strokes when an even number of parallel strokes are generated. Similar to the case of odd numbers, the edges of adjacent parallel strokes are overlapping each other such that the heat load is not excessive. In the case of even numbers, the new generated strokes are arranged so as to be symmetric above and under the original stroke. Thus, each of the new additional parallel strokes is located away from the original stroke by a length expressed by the following formula.

$$k(t-\mu)+(t-\mu)/2$$

In the above formula, "k" is an integer of greater than or equal to zero. The value of "k" is determined based on the number of strokes to be generated. For example, "k=0" when two parallel strokes are to be rendered, "k=0, 1" when four parallel strokes are to be rendered, and "k=0, 1, 2" when six parallel strokes are to be rendered. The parallel strokes are located away from the original stroke by "$(t-\mu)/2$", "$(t-\mu)+(t-\mu)/2$", "$2(t-\mu)+(t-\mu)/2$", and so forth. In the case of even numbers, there are no parallel strokes located at the same position as the original stroke. The parallel stroke generating unit 105 arranges the parallel strokes so as to be line-symmetric with respect to the original stroke.

When the positions of the parallel strokes have been determined in the above manner, the parallel stroke generating unit 105 determines the coordinates of the strokes for the thick character.

Figure 15:
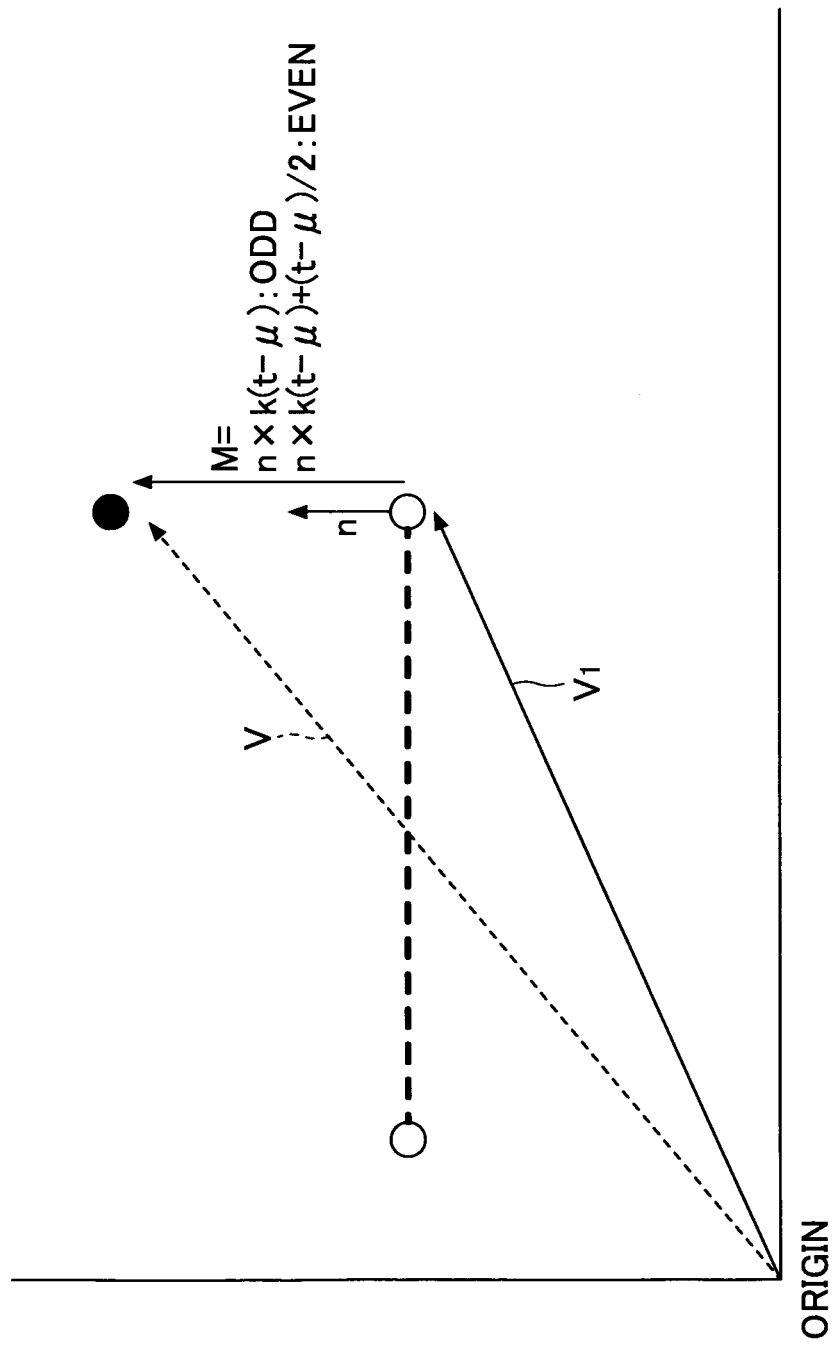
FIG. 15 schematically illustrates a method of determining the coordinates of a parallel stroke.

FIG. 15 schematically illustrates a method of determining the coordinates of a parallel stroke. The length by which each stroke is shifted from the original stroke is determined, and therefore the parallel stroke generating unit 105 shifts a parallel stroke having the same length as the original stroke by the determined length along the normal line of the original stroke, and determines provisional coordinates.

In FIG. 15, n is a normal line unit vector, V1 is the original vector pointing to a coordinate of the original stroke, M is a movement vector, and v is a vector pointing to a coordinate of the parallel stroke after being shifted. Thus, $M=n \times k(t-\mu)$ is satisfied when there are an odd number of parallel strokes, and $M=k(t-\mu)+(t-\mu)/2$ is satisfied when there are an even number of parallel strokes. The vector v pointing to the coordinate of the parallel stroke after being shifted is determined by the following formula.

$$v = v1 + M$$

Another vector v pointing to a coordinate of a parallel stroke on the other side of the original stroke can be obtained by using a normal line unit vector −n, instead of n.

<Step S70>

Referring back to FIG. 11, when the coordinates of all of the new generated parallel strokes are determined, a parallel stroke length adjusting unit 106 adjusts the lengths of the generated parallel strokes. The parallel strokes obtained at step S60 have the same length as the original stroke. Thus, when the original stroke is connected to another stroke to form a bent line, the following problem occurs. That is, on the inside of the bent portion, the parallel strokes adjacent to each other in the rendering direction may overlap each other, and on the outside of the bent portion, the parallel strokes adjacent to each other in the rendering direction may become detached from each other.

FIG. 16-(a) illustrates a problem that arises at a bent portion of a line. The new generated strokes have merely been shifted in parallel with respect to the original stroke. Therefore, the strokes are overlapping each other on the inside of the bent portion, and the strokes are detached on the outside of the bent portion.

Accordingly, the parallel stroke length adjusting unit 106 adjusts the lengths of the parallel strokes. Specifically, the parallel stroke length adjusting unit 106 shortens the lengths of the parallel strokes on the inside of the bent portion, and increases the lengths of the parallel strokes on the outside of the bent portion. Therefore, the parallel strokes appear to be connected to each other at the bent portion. Specifically, the parallel stroke length adjusting unit 106 changes the coordinates of a render-starting point of the parallel stroke corresponding to one part of the bent line and a render-ending point of the parallel stroke corresponding to the other part of the bent line, so that the parallel strokes are continuously connected in the rendering direction. The coordinates that have been changed correspond to an intersection of two parallel strokes.

On the inside of the bent portion, the parallel strokes are overlapping each other. Therefore, each intersection of two parallel strokes adjacent to each other in the rendering direction is obtained, and the obtained intersection is determined to be the new coordinate for the two strokes on the inside of the bent portion. On the outside of the bent portion, the intersections are unknown because the strokes are detached. Therefore, the two parallel strokes are extended, so that an intersection of the two parallel strokes that are continuously connected in the rendering direction is obtained. The obtained intersection is determined to be the new coordinate for the two strokes on the outside of the bent portion.

FIG. 16-(b) illustrates an example of the bent portion after the coordinates of the parallel strokes have been changed. The diagram shows that there are no longer any overlapping or detached strokes. Instead of using the intersections of two parallel strokes as new coordinates, the following method may be performed. That is, the coordinate of only one of the parallel strokes, which are overlapping each other on the inside of the bent portion, may be changed to be located at a nearest neighbor part of the other stroke. The coordinate of only one of the parallel strokes, which are detached from each other on the outside of the bent portion, may be changed to be located at a nearest neighbor part of the other stroke. In these cases, the end points of the two parallel strokes do not match each other, but do not overlap each other either. Therefore, the thermal rewritable medium 20 is prevented from being overheated. Furthermore, when the color is generated, the strokes will not appear to be detached.

The parallel stroke length adjusting unit 106 detects all of the bent portions in a character, and performs step S70 for each of the bent portions. In font data as shown in FIG. 9-(b), at the detected bent portion, the coordinate of a render-ending point of a certain stroke matches the coordinate of a render-starting point of the next stroke.

<Step S80: Remove Original Stroke>

Next, a stroke removing unit 107 removes the original stroke from the rendering target. The process of removing the original stroke is to erase the coordinate information of the original stroke from the font data as shown in FIG. 9-(b). When the number of parallel strokes is an odd number, the original stroke and the parallel stroke corresponding to k=0 overlap each other. Therefore, by deleting the original stroke, the laser radiation device 200 is prevented from rendering overlapping strokes. In another example, when there is an odd number of strokes, there is an option of not generating a parallel stroke at the position of the original stroke (i.e., not generating a parallel stroke at the position "k=0"). Accordingly, the font data can be used for rendering the character without removing the original stroke.

When there is an even number of parallel strokes, the original stroke may be unnecessary, and therefore the original stroke may be deleted by the stroke removing unit 107.

<Step S90: Calculate Overlapping Strokes>

Determination of Overlapping Part

Figure 17:
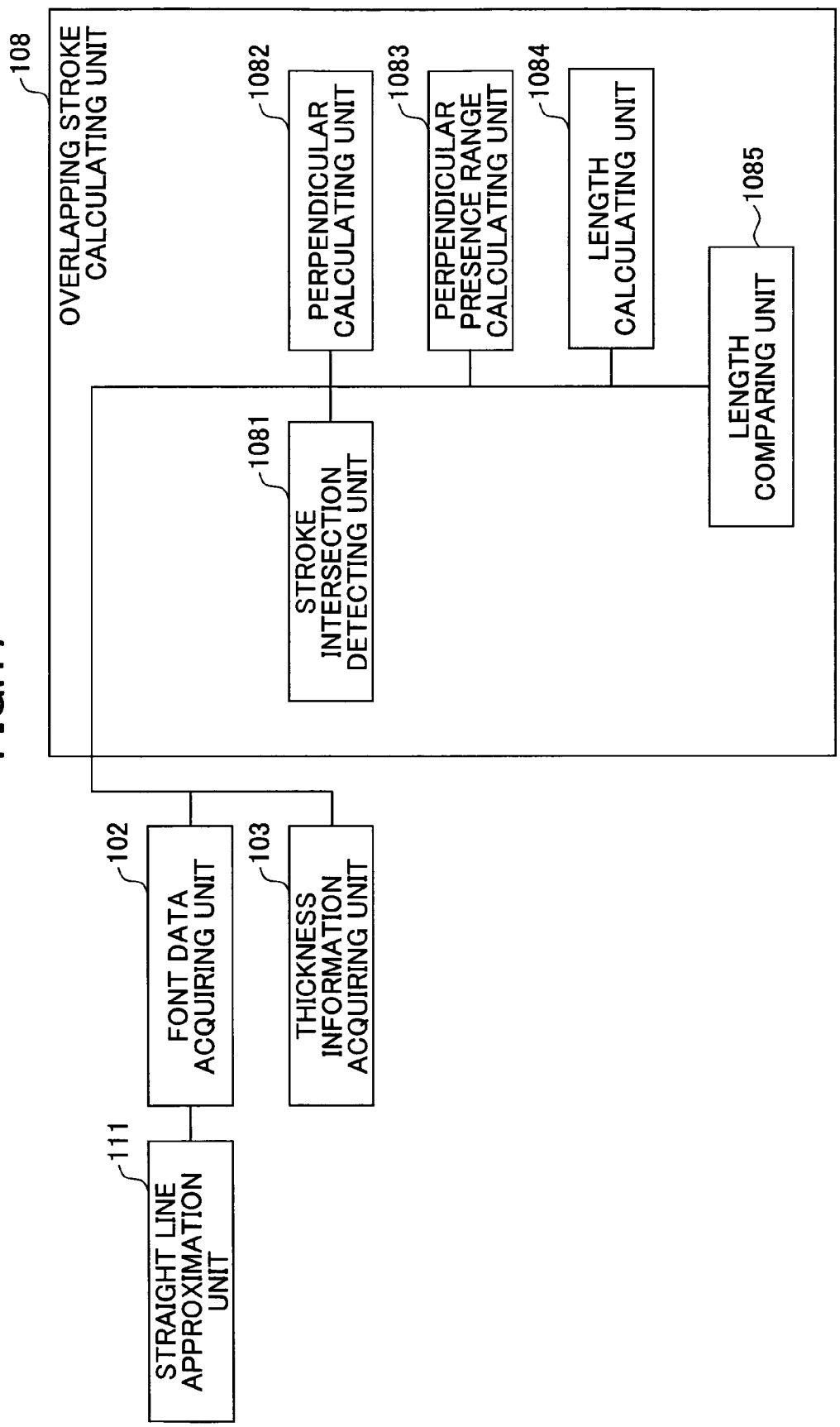
FIG. 17 illustrates detailed functions of an overlapping stroke calculating unit.

First, a description is given of the process of determining overlapping parts. FIG. 17 illustrates detailed functions of an overlapping stroke calculating unit 108. The font data acquiring unit 102 reads coordinates of a stroke based on font data as shown in FIG. 9-(b). The overlapping stroke calculating unit 108 determines whether the character includes overlapping parts based on the coordinates of the stroke.

First, a length calculating unit 1084 obtains the shortest length between strokes. The shortest length is obtained by the following process.

In step S90, the overlapping stroke calculating unit 108 may determine whether there are overlapping parts in a regular character or in a thick character. In the case of the thick character, parallel strokes are not to overlap with other parallel strokes in the rendering direction, similar to the case of regular characters. Therefore, the overlapping stroke calculating unit 108 determines whether there are overlapping parts with regard to all of the parallel strokes.

When there is an intersection between two strokes, the length is zero.

When there is no intersection, either one of the following lengths is obtained.
  a) the length between end points of a pair of strokes
  b) the length of a perpendicular extending from an end point of one stroke to another stroke (if a perpendicular can be specified).

That is to say, when there is no intersection, the length is obtained either by the method a) or b), and it is determined whether there is an overlapping part based on the shorter length.

Figure 18A:
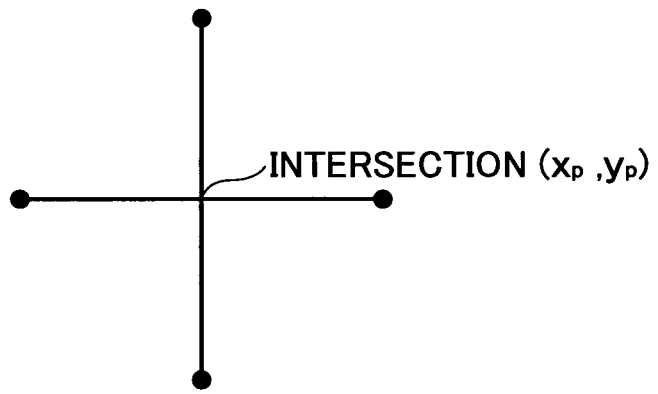
FIGS. 18A through 18C schematically illustrate methods of detecting the shortest length between two strokes.
Figure 18B:
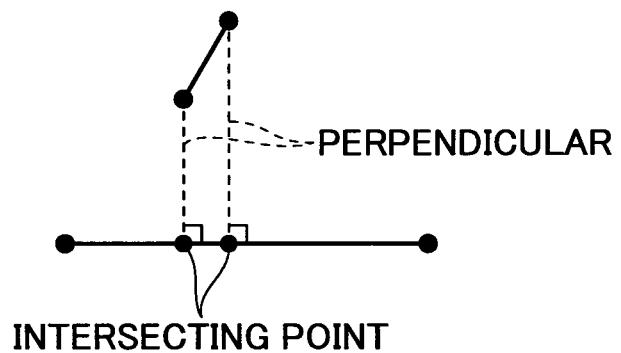
Figure 18C:
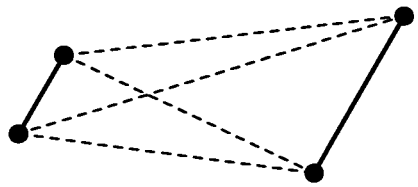

FIGS. 18A through 18C schematically illustrate methods of detecting the shortest length between two strokes. FIG. 18A illustrates an example of two strokes having an intersection. As indicated below, the intersection can be obtained by expressing the two strokes by linear equations and solving the simultaneous equations.

$$y = a_1 x + b_1$$

$$y = a_2 x + b_2$$

Assuming that $(x_p, y_p)$ is the intersection, the following is satisfied.

$$(x_p, y_p) = ((b_2 - b_1)/(a_1 - a_2), a_1 x_p + b_1)$$

Unless the two straight lines are parallel, an intersection can be obtained. However, in the present embodiment, it is determined that there is an intersection only when the intersection $(x_p, y_p)$ is located along the stroke.

FIG. 18B schematically illustrates the process of calculating the length of a perpendicular extending from an end point of one stroke to another stroke. A perpendicular calculating unit 1082 shown in FIG. 17 calculates perpendiculars as shown in FIG. 18B. Thus, the perpendicular calculating unit 1082 calculates the following formula of a perpendicular, which is a straight line that passes through an end point of a stroke and that is orthogonal to the other stroke.

$$y = cx + d$$

If this straight line intersects with the other stroke, it means that the perpendicular can be extended from an end point of one stroke to the other stroke. Similar to the case of FIG. 18A, a perpendicular presence range calculating unit 1083 obtains the point where the perpendicular intersects with the other stroke, and if the obtained point is located along the stroke, the overlapping stroke calculating unit 108 determines that a perpendicular has been properly extended to join the two strokes. The length calculating unit 1084 calculates the lengths of the perpendiculars extending from two end points of a stroke to the other stroke. Each of these lengths corresponds to the length between the end point of one stroke and the intersection of the perpendicular and the other stroke.

Depending on the positional relationship between two strokes, there may be cases where a perpendicular cannot be extended to join the two strokes. In FIG. 18C schematically illustrates a process of calculating lengths between the end points of two strokes. As shown in FIG. 18C, the length calculating unit 1084 calculates lengths between the two end points of one stroke and the two end points of another stroke (i.e., a total of four lengths). The length calculating unit 1084 may calculate these lengths when the perpendicular calculating unit 1082 has determined that a perpendicular cannot be obtained, or may calculate these lengths regardless of whether the a perpendicular can be obtained.

When there is a length shorter than the thickness of the character included among the detected lengths, it means that the strokes overlap each other. Unless the shortest length is not shorter than the thickness of the character, the strokes do not intersect. The shortest length is determined among the detected lengths. A length comparing unit 1085 compares information expressing thickness acquired by the thickness information acquiring unit 103 with the shortest length. If the short length is less than or equal to the thickness, the pair of strokes having the shortest length is extracted. Accordingly, the overlapping stroke calculating unit 108 can detect that the extracted pair of strokes in the character has an overlapping part. The overlapping stroke calculating unit 108 detects the amount of the overlapping part by "overlapping amount=thickness of character−shortest length".

Figure 19:
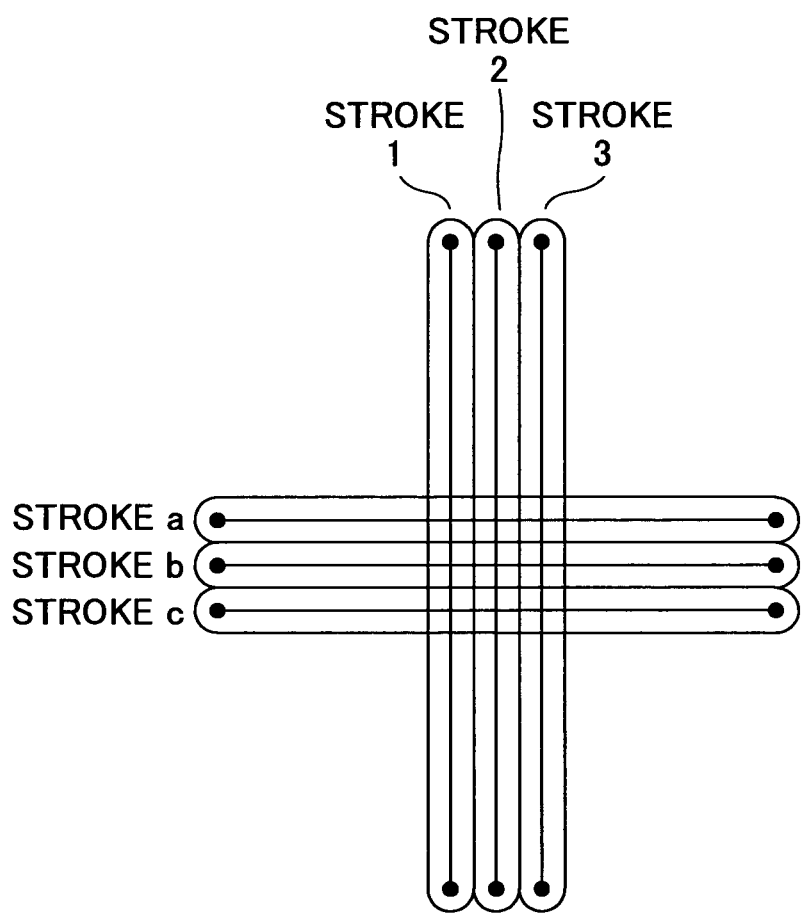
FIG. 19 schematically illustrates intersections in a thick character.

FIG. 19 schematically illustrates intersections in a thick character. In a thick character, the overlapping stroke calculating unit 108 calculates the intersections between stroke 1 and strokes a, b, and c, the intersections between stroke 2 and strokes a, b, and c, and the intersections between stroke 3 and strokes a, b, and c. In this example, plural intersections are calculated, and the overlapping amount can be adjusted for each intersection. Similar to the case of a regular character, overlapping parts can be detected by detecting intersections. The same applies to the method of joining two strokes with a perpendicular extending from one of the strokes, and to the method of calculating lengths between the end points of two strokes.

FIG. 20 is a flowchart for describing in detail the process of calculating overlapping strokes of step S90 in FIG. 11.

First, the font data acquiring unit 102 extracts coordinates of strokes from font data of a single character, and reads the coordinates of two arbitrary strokes (step S401).

A stroke intersection detecting unit 1081 detects whether the two strokes have an intersection (step S402).

When there is no intersection (NO in step S402), the stroke intersection detecting unit 1081 selects one end point among the four end points of the two strokes, for the purpose of detecting the lengths between the end points (step S403). The length calculating unit 1084 detects the length between the selected end point and an end point of the other stroke (that does not have the selected end point) (step S404).

Next, the perpendicular calculating unit 1082 extends a perpendicular from the selected end point to the other stroke (step S405). There may be cases where the perpendicular does not intersect with the other stroke. Therefore, the perpendicular presence range calculating unit 1083 determines whether the perpendicular intersects with the other stroke (step S406).

When the perpendicular intersects with the other stroke (YES in step S406), the length calculating unit 1084 detects the length of the perpendicular extending from the selected end point to the other stroke (step S407). When the perpendicular does not intersect with the other stroke (NO in step S406), the process is performed for a next end point.

When the process of detecting the lengths between end points and/or the lengths of perpendiculars has been completed for the four end points of the two strokes (YES in step S408), the overlapping stroke calculating unit 108 determines which one of the lengths obtained for the four end points is the shortest length (step S409). Accordingly, the overlapping stroke calculating unit 108 obtains the length of the part where two strokes are closest to each other, when the two strokes do not intersect.

When the stroke intersection detecting unit 1081 determines that there is an intersection between the strokes in step S402, the overlapping stroke calculating unit 108 determines that the length between the strokes is zero (step S413).

Next, the length comparing unit 1085 determines whether the length between the strokes is less than or equal to the thickness of the character (step S410). When the length is not less than or equal to the thickness (NO in step S410), the overlapping stroke calculating unit 108 determines that the two strokes do not need to undergo a dividing/shortening process (step S414).

When the length is less than or equal to the thickness (YES in step S410), the overlapping stroke calculating unit 108 determines that the two strokes need to undergo a dividing/shortening process (step S411).

Next, the overlapping stroke calculating unit 108 determines whether the lengths have been examined for all combinations of strokes (step S412). When all of the lengths have been examined, the process ends.

When all of the strokes forming a character are straight lines (e.g., the numeral "1"), the coordinates of the strokes can be easily extracted. However, in the case of a scalable font such as the stroke font, Bezier curves may be rendered to render curved lines in a scalable manner. If the strokes were rendered with curved lines, complex calculations would be necessary to obtain the lengths between the strokes. Therefore, when a character includes curved lines, the curved lines are preferably converted into straight lines before being rendered.

Accordingly, when the font data includes a curved line, a straight line approximation unit 111 converts the curved part into straight lines, and detects the coordinates of the straight strokes. When a curved line is included in the character, the font data includes data used for controlling curved lines (curve control). Therefore, it can be determined as to whether the character includes curved lines based on the font data.

Figures 21A, 21B:
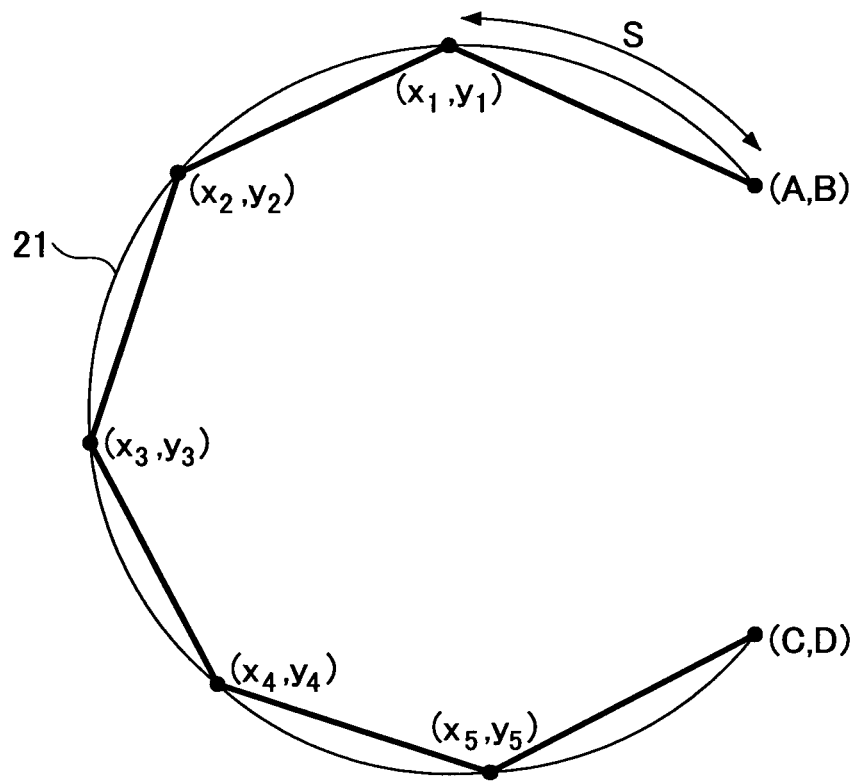
FIGS. 21A and 21B schematically illustrate strokes that are generated from a circular character.

FIG. 21A schematically illustrates strokes that are generated from a circular character. Curve control is performed at several sections between the coordinates of the render-starting point (A, B) and the coordinates of the render-ending point (C, D), thereby obtaining a circular stroke 21. In this case, the straight line approximation unit 111 detects coordinates of the stroke 21 at every predetermined length S. The coordinates of the rendered strokes correspond to values after the scale of the character has been adjusted (for example, if the scale of the character is doubled, the coordinates correspond to doubled values).

The straight line approximation unit 111 accumulates lengths of small intervals, and every time the accumulated lengths amount to a length S, the straight line approximation unit 111 obtains the corresponding coordinates. In FIG. 21A, five sets of coordinates are obtained. Based on these obtained coordinates, the straight line approximation unit 111 determines coordinates of strokes that are rendered based on data such as that shown in FIG. 9-(b). FIG. 21B illustrates an example of coordinates of strokes (font data) that have been converted into straight lines from curved lines.

<Step S100: Dividing/Shortening Strokes>

Referring back to FIG. 10, a stroke dividing/shortening unit 109 divides or shortens one of the strokes included in a pair of strokes satisfying the following conditions. One condition is that there is no distance between the two strokes (length between strokes is zero). The other condition is that the length between the two strokes or the shortest length between end points of the two strokes, is less than or equal to the thickness of the character. Only one of the strokes in the pair of strokes needs to be divided/shortened to eliminate the overlapping part in the character.

The process of determining which one of the strokes in the pair of strokes is to be divided/shortened, is performed based on the following rules.

Rule R1: When one of the strokes is divided/shortened, the corresponding stroke completely disappears. In this case, the other one of the strokes is to be divided/shortened.

Rule R2: When neither of the strokes disappear when divided/shortened, or when both of the strokes disappear when divided/shortened, the stroke that is shortened by a shorter length (the stroke that has a shorter disappearing length) due to dividing/shortening, is selected as the target stroke to be divided/shortened (this is based on the idea that the amount of lost information is smaller for the stroke with a shorter disappearing length). For example, if a stroke is shortened more than necessary, there may be cases where strokes, which are supposed to be in contact with each other, are separated from one another, thus decreasing the quality of the character. The determination of where to locate the end point of a new stroke (obtained as a result of dividing/shortening a stroke) depends on the thickness of the stroke.

FIG. 22 schematically illustrates a process of dividing/shortening a stroke. FIG. 22-(a) illustrates a character rendered with strokes before the dividing/shortening process. The end points of a stroke 51 are (E, F) and (G, H), the end points of a stroke 52 are (G, H) and (J, K), and end points of a stroke 53 are (L, M) and (N, O).

The overlapping stroke calculating unit 108 detects whether the following lengths are less than or equal to the thickness of the character. Specifically, the length between the end point (G, H) of the stroke 51 and the end point (L, M) of the stroke 53, and the length between the end point (G, H) of the stroke 52 and the end point (L, M) of the stroke 53, are targets of the detection (target lengths). Technically, the end point (G, H) of the stroke 51 and the end point (G, H) of the stroke 52 are the same and are thus determined as an overlapping part. However, at this overlapping part, the intersection angle is large, and can thus be disregarded as described below.

As a result of the detection performed on the respective target lengths, it is found that the strokes do not have an intersection, and neither of the strokes disappears when shortened. Therefore, the parallel stroke generating unit 105 determines that rule R2 is applicable. Accordingly, the stroke dividing/shortening unit 109 compares the shortening amount (total length of shortened parts of strokes) when both of the strokes 51 and 52 are shortened, with the shortening amount when only the stroke 53 is shortened.

FIG. 22-(b) illustrates an example where the character is rendered by shortening only the stroke 53. FIG. 22-(c) illustrates an example where the character is rendered by shortening both of the strokes 51 and 52. The overlapping stroke calculating unit 108 selects the stroke having a shorter disappearing length as a result of being divided/shortened, as the target stroke to be shortened.

The stroke dividing/shortening unit 109 calculates the shortening amount when only the stroke 53 is shortened, and the shortening amount when both of the strokes 51 and 52 are shortened, and determines which stroke(s) is to be shortened. When the overlapping amount of the strokes 51 and 53 is the same as the overlapping amount of the strokes 52 and 53, the following applies. Specifically, when the stroke 53 is shortened, the shortening amount corresponds to "1×overlapping amount" (disappearing length b), whereas when the strokes 51 and 52 are shortened, the shortening amount corresponds to "2×overlapping amount" (disappearing length c). Therefore, the disappearing length is shorter when only the stroke 53 is shortened.

The stroke dividing/shortening unit 109 determines to shorten the stroke 53 based on the above calculations. The shortening amount is the same as the overlapping amount. Thus, the stroke dividing/shortening unit 109 shortens the stroke 53 (moves the end point (L, M) of the stroke 53) according to the shortening amount, and identifies the coordinates of the stroke 53 after the shortening process.

Figure 23:
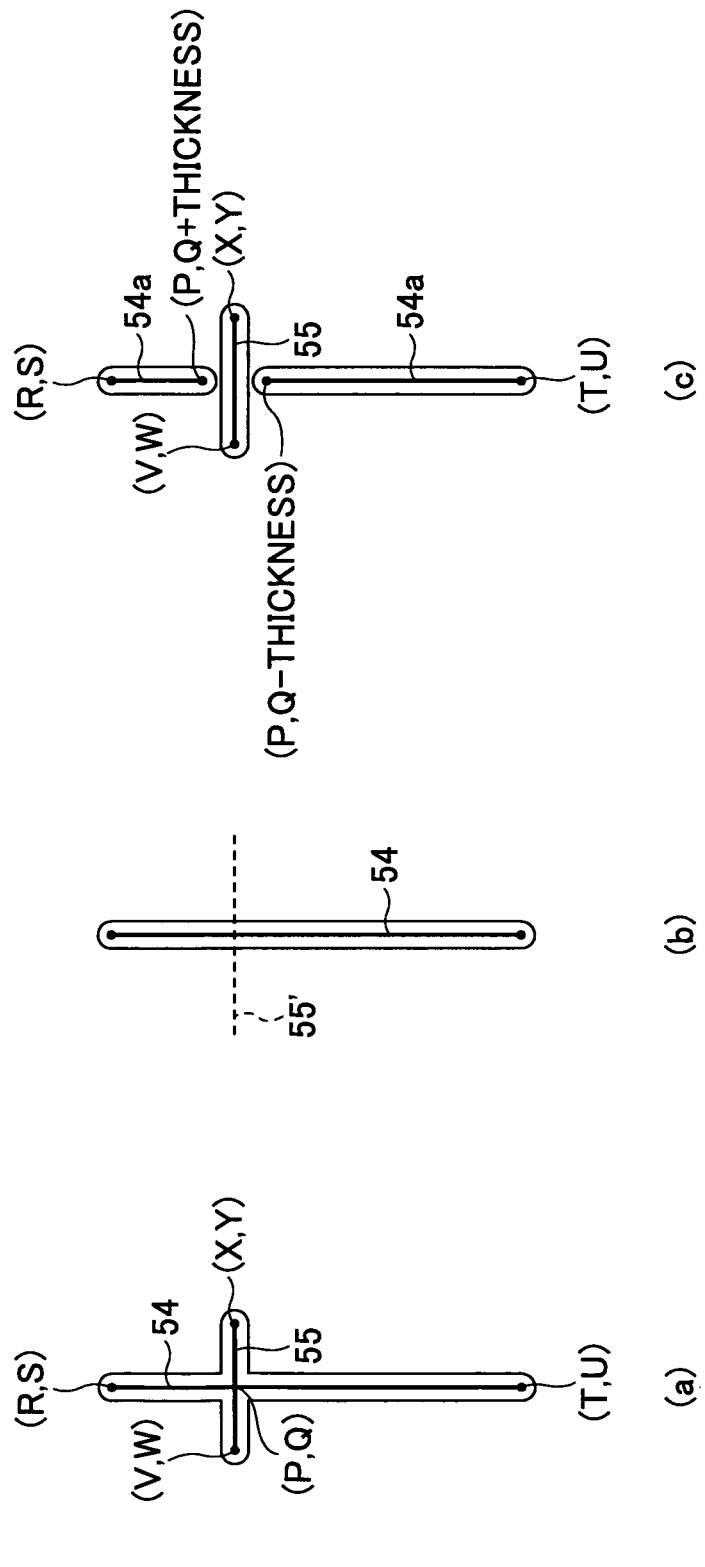
FIG. 23 schematically illustrates another process of dividing/shortening a stroke.

FIG. 23 schematically illustrates another process of dividing/shortening a stroke. FIG. 23-(a) illustrates a character rendered with strokes before the dividing/shortening process. The overlapping stroke calculating unit 108 (more precisely, a stroke intersection detecting unit) detects that a stroke 54 and a stroke 55 intersect each other.

Thus, the stroke dividing/shortening unit 109 divides/shortens either one of the stroke 54 or the stroke 55. When there is an intersection, either one of the strokes is divided.

Assuming that both of the strokes are divided, and the divided strokes are shortened by an amount corresponding to the overlapping amount, the stroke dividing/shortening unit 109 determines whether only one of the strokes completely disappears.

FIG. 23-(b) illustrates an example of a rendered character in which the stroke 55 is divided and the overlapping amount is reduced. FIG. 23-(c) illustrates an example of a rendered character in which the stroke 54 is divided and the overlapping amount is reduced. As shown in FIG. 23-(b), by dividing the stroke 55 so that it does not overlap with the stroke 54, the stroke 55 completely disappears. Therefore, rule R1 is applicable to the character of FIG. 23. Accordingly, the overlapping stroke calculating unit 108 selects the stroke 54 as the target of division.

The stroke dividing/shortening unit 109 can detect that the stroke 55 would completely disappear (after being divided/shortened) because the length between an end point (V, W) of the stroke 55 and an intersection (P, Q) of the strokes 54 and 55 is shorter than the thickness of the character.

When the strokes intersect each other, the stroke dividing/shortening unit 109 divides the stroke 54, by using the intersection as one of the end points of the divided strokes. Accordingly, the stroke dividing/shortening unit 109 generates a stroke 54A having end points (R, S) and (P, Q) and a stroke 54B having end points (P, Q) and (T, U), and calculates the respective overlapping amounts between these strokes and the stroke 55. When the strokes are intersecting each other, the overlapping amount of the end point (P, Q) and the stroke 55 corresponds to half the thickness of the character, and therefore the overlapping amount can be detected without performing particular calculations. The shortening amount corresponds to the thickness of the character, i.e., the gap between the end points that have been moved for the purpose of shortening the strokes.

Thus, the stroke dividing/shortening unit 109 determines the coordinates (R, S), (P, Q+thickness) of the two end points of a stroke 54A obtained by dividing the stroke 54. Similarly, the stroke dividing/shortening unit 109 determines the coordinates (P, Q−thickness), (T, U) of the two end points of the other stroke 54B obtained by dividing the stroke 54. Accordingly, as shown in FIG. 23-(c), a character without the intersection can be rendered.

As described above, a stroke is divided/shortened by a minimum amount for eliminating overlapping parts. Accordingly, deterioration in the character quality of can be minimized.

Figure 24A:
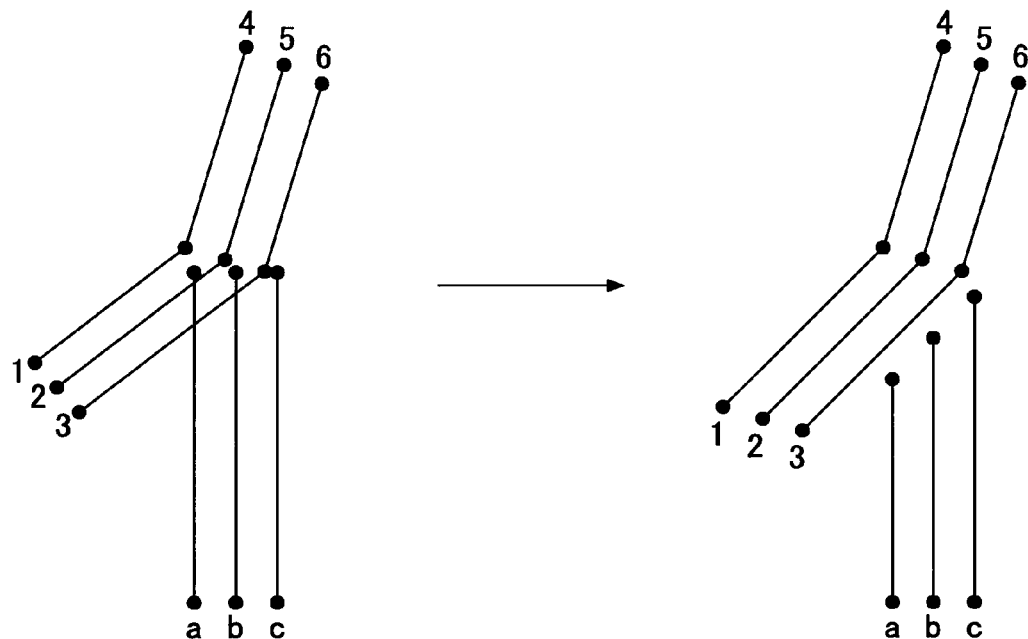
FIGS. 24A and 24B schematically illustrate the shortening process of characters.
Figure 24B:
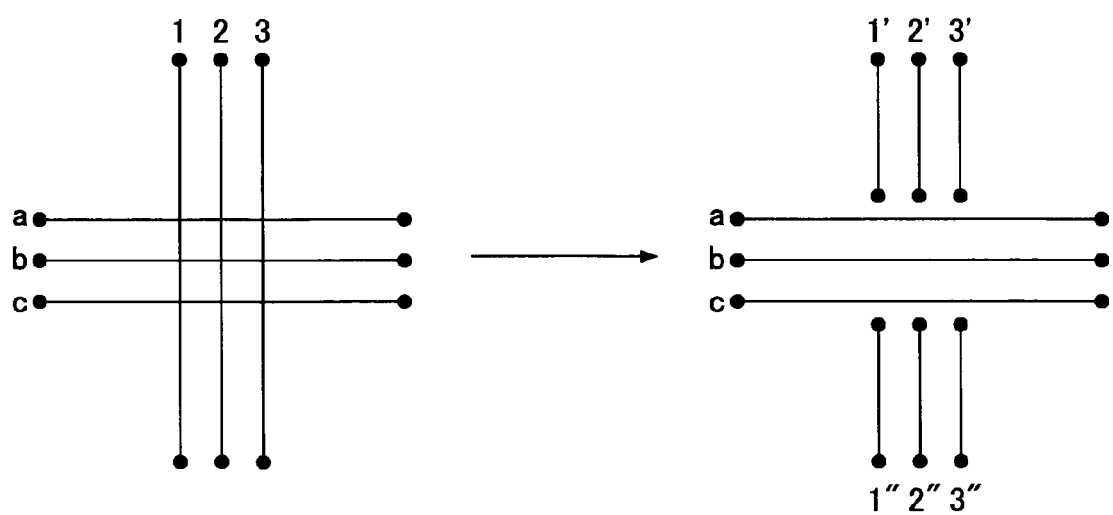

FIGS. 24A and 24B schematically illustrate the shortening process of characters. In one of the characters illustrated in FIG. 24A (including strokes 1 through 6), the overlapping parts and the detached parts have been eliminated as described with reference to FIG. 16. The stroke dividing/shortening unit 109 determines, from among parallel strokes 1 through 6, the parallel stroke that is closest to a parallel stroke "a". The parallel stroke "a" is shortened by an amount corresponding to the overlapping amount of the parallel stroke "a" and the determined parallel stroke. The same process is repeated for strokes "b" and "c". In this manner, the parallel strokes in a thick character can be shortened.

In the same manner, when thick characters are overlapping each other as shown in FIG. 24-(b), the stroke dividing/shortening unit 109 determines that from among parallel strokes "a" through "c" intersecting with a parallel stroke 1, the parallel strokes "a" and "c" are located at the outermost sides. Then, the stroke dividing/shortening unit 109 divides the parallel stroke 1 at an intersection of the parallel stroke 1 and the parallel stroke "a", thereby generating a parallel stroke 1', which is shortened from the intersection by an amount corresponding to the thickness of the character. Furthermore, the stroke dividing/shortening unit 109 divides the parallel stroke 1 at an intersection of the parallel stroke 1 and the parallel stroke "c", thereby generating a parallel stroke 1", which is shortened from the intersection by an amount corresponding to the thickness of the character. The same process is repeated for the strokes 2 and 3, so that one of two thick strokes intersecting each other is divided.

Method of Preventing Overheating Other than Dividing/Shortening Method

Instead of shortening or dividing a stroke, the output laser beam may be temporarily attenuated at an intersection or at an acute bent portion. In this case, there is no need to divide/shorten strokes or determine the new coordinates of strokes. Therefore, the processing load of the overall control device 100 can be reduced.

A power adjustment unit 112 registers information in the font data in advance. The information pertains to overlapping parts, such as the parts where parallel strokes overlap each other when the thermal rewritable medium 20 develops color. The overlapping parts of strokes can be detected by the overlapping stroke calculating unit 108, as in the dividing/shortening method. A part of the stroke is detected as a stroke overlapping part.

When rendering the strokes, the power adjustment unit 112 determines whether there is a stroke overlapping part, and attenuates the laser beam output when rendering the stroke overlapping part. The laser beam output may be attenuated by gradually reducing the laser beam output while rendering the stroke overlapping part, or gradually reducing the laser beam output as the laser radiation unit 160 approaches the center portion of the stroke overlapping part. Accordingly, the laser beam output can be reduced in regions where heat is likely to accumulate. Furthermore, when rendering the stroke overlapping part, the laser beam output can be reduced to a predetermined level that is defined in advance. By doing so, there is no need to control the laser beam output with high precision, thereby reducing the processing load.

Exceptions of Avoiding Overlapping Parts

Figure 25A:
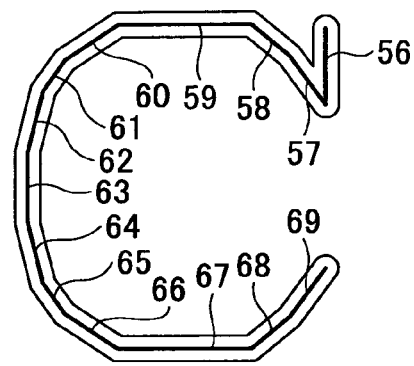
FIGS. 25A through 25D schematically illustrate examples where the strokes are to be divided/shortened and where the strokes are not to be divided/shortened.

In consideration of maintaining the quality of characters, there are cases where the strokes are not divided/shortened even when there are overlapping parts. FIGS. 25A through 25D schematically illustrate an example where the strokes are divided/shortened and an example where strokes are not divided/shortened. FIG. 25A illustrates a character that is rendered without dividing/shortening the strokes. As shown in FIG. 25A, when the font data of a character C only includes straight lines, the character C is rendered according to the font data. When the character C includes curved lines, coordinates of strokes are obtained at every length S by the straight line approximation unit 111, and the character C is rendered with the use of the obtained coordinates.

Figure 25B:
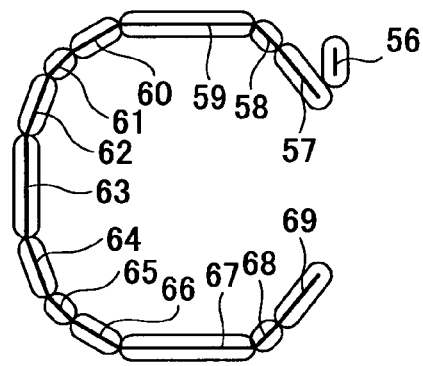

In FIG. 25A, the end points of adjacent strokes among strokes 56 through 69 correspond to each other. Therefore, the overlapping stroke calculating unit 108 detects that the strokes are intersecting each other or the lengths between end points are less than or equal to the thickness of the character. Accordingly, it is determined that rule R2 is applicable, and each of the strokes 56 through 69 is shortened, so that the character shown in FIG. 25B is rendered.

However, if the character is broken into short strokes, a user may have difficulty in seeing the character. In this case, the stroke dividing/shortening unit 109 applies a new rule R3, and renders the character accordingly. Rule R3: When two continuous strokes intersect at a large angle, the strokes are not divided/shortened.

Figure 25C:
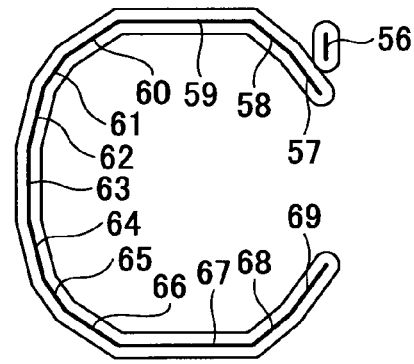
Figure 25D:
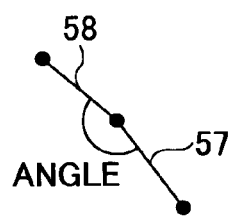

FIG. 25D illustrates the angle at which the strokes intersect. For example, strokes 57 and 58 intersect at a large angle. When the strokes intersect at a large angle, there is a small impact on the inertia of the direction control motor 12 and the direction control mirror 13. Therefore, the overlapping part of laser beams does not become overheated. Accordingly, when there are continuous strokes, the stroke dividing/shortening unit 109 calculates the angle at which the strokes intersect. Only when the intersection angle is less than or equal to a predetermined value (for example, 45 degrees to 90 degrees), the stroke dividing/shortening unit 109 shortens at least one of the strokes.

The angle at which the strokes intersect can be obtained by expressing the two strokes by vectors v1 and v2 (the origin may be anywhere), and dividing the inner product of the vectors by the sizes of the vectors (refer to following formula). The straight line approximation unit 111 calculates the angle at which the strokes intersect.

$$\cos\theta = (v1 \cdot v2)/(|v1||v2|)$$

When rule R3 is applied to the character in FIG. 25A, it is determined that the strokes do not need to be shortened, except for strokes 56 and 57. Between the strokes 56 and 57, the stroke dividing/shortening unit 109 shortens the stroke 56. Accordingly, a character as shown in FIG. 25C is rendered. Based on rule R3, when the intersection angle is small, the overlapping part is eliminated by controlling the impact of inertia of the direction control motor 12 and the driving the direction control mirror 13 that controls the direction of the laser beam. When the intersection angle is large, the strokes having overlapping parts can be rendered. Therefore, the quality of the image is prevented from deteriorating. Comparing this rendering process to writing a character with a pen, the pen is lifted up from the paper before writing the next stroke when writing continuous strokes intersecting at a small angle. Conversely, when writing continuous strokes intersecting at a large angle, the pen continuously writes the next stroke without being lifted up from the paper.

<Step S110: Organizing the Rendering Order>

When the coordinates of end points of strokes have been determined so that the strokes do not overlap, a rendering order organizing unit 110 organizes the order in which the strokes are to be rendered. The reason why the rendering order is organized is to reduce rendering time, improve the appearance of the character, and to render the character without damaging the thermal rewritable medium 20.

Before describing the rendering order, a definition of a stroke set is given. A stroke set is a series of strokes that are continuously rendered, in a manner that strokes are drawn without lifting up the pen (writing utensil). For example, in the character of FIG. 25C, the stroke 56 corresponds to one stroke set and the strokes 57 through 69 correspond to one stroke set.

A thick character would include plural stroke sets. An assembly of plural stroke sets is referred to as a stroke set group. The rendering order organizing unit 110 organizes the rendering order such that stroke sets within each stroke set group are continuously rendered. That is to say, when the laser radiation unit 160 starts to render strokes groups within a particular stroke set group, other stroke set groups are not rendered until rendering of the particular stroke set group is completed.

FIG. 26 is for describing the render order of stroke set groups. By turning a character into a thick character, three stroke sets 1, 2, and 3 are formed. The rendering order organizing unit 110 uses a laser beam to sequentially render the three stroke sets 1, 2, and 3, in the order they are aligned in the direction of the normal line, starting from the outermost stroke set 1 or 3. FIG. 26-(*a*) indicates a rendering order of stroke sets, where the stroke sets 1, 2, and 3 are sequentially rendered starting from the top stroke. FIG. 26-(*b*) indicates a rendering order of stroke sets, where the stroke sets 1, 2, and 3 are sequentially rendered starting from the bottom stroke. The numerals in brackets [ ] indicate the order in which the corresponding stroke set is rendered. The outermost stroke set includes a stroke corresponding to the maximum "k" value, among the parallel strokes generated by the parallel stroke generating unit 105.

The stroke set groups are continuously rendered in consideration of the color developing properties of the thermal rewritable medium 20. The thermal rewritable medium 20 develops color at a temperature Ta. Furthermore, by heating the thermal rewritable medium 20 to a temperature Tb (<Ta) from a low temperature, and then cooling the thermal rewritable medium 20 once again, the color disappears. Accordingly, when the thermal rewritable medium 20 is sufficiently cooled after rendering the outermost stroke set 1, and then the stroke set 2 adjacent to the stroke set 1 is rendered, the following problem may arise. That is, the peripheral portion of the stroke set 1 that has already appeared as a color may receive the heat of the stroke set 2. If the temperature of this heat rises to Ta, the color may disappear from the area of the stroke set 1 that had already appeared.

Thus, by rendering the stroke set 2 after rendering the stroke set 1 without much delay, the color of the stroke set 1 can be prevented from disappearing. For this reason, the strokes are preferably sequentially rendered in the order in which they are aligned.

However, if the length of the stroke set 1 is too short, the heat of the stroke set 2 may be applied before the stroke set 1 has hardly cooled down. Thus, an excessive heat load may be applied to the thermal rewritable medium 20.

Thus, when rendering a stroke set group, the overall control device 100 controls the time from when rendering of the stroke set 1 finishes to when rendering of the stroke set 2 starts. The minimum time required for cooling a stroke set is Tmin. The maximum time for cooling a stroke set is Tmax (a cooling time exceeding Tmax is not preferable). When a render command generating unit 114 described below determines that the rendering of the stroke set 2 starts at a time within Tmin based on a rendering speed (scanning speed of laser beam) and the length of the stroke set 1, the laser radiation unit 160 waits until a time Tmin has elapsed, and then starts to render the stroke set 2. When the render command generating unit 114 determines that the rendering of the stroke set 2 starts at a time exceeding Tmin based on the rendering speed and the length of the stroke set 1, the laser radiation unit 160 starts to render the stroke set 2 before finishing rendering the stroke set 1. In the latter case, the stroke sets may not be continuously rendered; however, the strokes may be rendered separately. When rendering a character of approximately 5 mm², the rendering order does not need to be rearranged in consideration of the limitation of Tmax.

Instead of adjusting the time, the laser beam output may be adjusted. In this case, for example, the power adjustment unit 112 reduces the laser beam output when there is an interval within Tmin between the time from when rendering of the stroke set 1 finishes to when rendering of the stroke set 2 starts. Furthermore, the power adjustment unit 112 increases the laser beam output when there is an interval exceeding Tmax between the time from when rendering of the stroke set 1 finishes to when rendering of the stroke set 2 starts.

For example, a one-dimensional barcode only includes straight lines. Therefore, no bent lines are rendered when rendering such a barcode. In this case, there is no need to group the strokes into stroke sets. When rendering a thick line in a one-dimensional barcode, the strokes are to be sequentially rendered starting with the outermost stroke included in the thick line.

After the strokes have been organized such that stroke set groups can be continuously rendered, the rendering order organizing unit 110 adjusts the rendering order to reduce the rendering time. Specifically, the rendering order is adjusted so as to reduce the total length of movement of the between render-ending points and render-starting points of the stroke sets.

When coordinates of end points of the strokes are determined such that the strokes do not overlap, the render command generating unit 114 generates a render command to render the character. By optimizing the rendering order before rendering the character, the rendering speed can be increased.

Referring back to FIG. 10, the rendering order organizing unit 110 optimizes the rendering order of strokes based on the coordinates of the strokes. Optimizing the rendering order means to minimize the length of movement of the laser beam.

FIG. 27A illustrates an example of the strokes and the rendering result of a character B, in which the strokes have been grouped together. The character B includes strokes 71 through 85. At this stage, it is assumed that the number of strokes has increased by dividing the strokes or converting a curved line into plural straight lines, but the stroke rendering order does not properly correspond to the increased strokes. Specifically, at this stage, the stroke rendering order is the order that is originally included in the font data, or information of the stroke rendering order is not included in the font data. For this reason, the rendering order organizing unit 110 organizes the rendering order of the strokes. In FIG. 27A, the original stroke order of the character B is I, II, III, and IV. The arrows indicate the directions in which the strokes and stroke sets are rendered.

The rendering order organizing unit 110 optimizes the rendering order by the following process.

Step 1: The rendering order organizing unit 110 searches for the end point of a stroke having the same coordinates as an end point of a predetermined stroke (any stroke), which are strung together like beads. The strokes are rearranged in the order that they are strung together, thereby forming a stroke set including the rearranged strokes.

For example, in FIG. 27A, an end point of the stroke 71 corresponds to an end point of the stroke 72. The other end point of the stroke 72 corresponds to an end point of the stroke 73. The other end point of the stroke 73 corresponds to an end point of the stroke 74. The other end point of the stroke 74 corresponds to an end point of the stroke 75. The other end point of the stroke 75 corresponds to an end point of the stroke 76. The other end point of the stroke 76 corresponds to an end point of the stroke 77. Accordingly, the strokes 71 through 77 form a stroke set. Similarly, the strokes 79 through 84 form another stroke set.

Step S2: When a predetermined stroke does not share end points with any other stroke, a single stroke forms a stroke set. For example, in FIG. 27A, the strokes 78 and 85 each form a single stroke set.

Step S3: All of the strokes are made to belong to a stroke set.

Step S4: When the stroke sets have been formed, the rendering order organizing unit 110 determines the rendering order of the stroke sets. Specifically, the rendering order organizing unit 110 sequentially searches for render-starting points/render-ending points of other stroke sets that are closest to a render-ending point of a predetermined stroke set, and rearranges the rendering order of the stroke sets accordingly. When the original rendering order is included in the font data, this original rendering order is "rearranged" as mentioned above. The original rendering order may be initialized before determining the new rendering order.

For example, when the rendering starts with the stroke set I, the stroke set II is rendered next (the stroke set IV is also close to the render-ending point of the stroke set I, but in this case, the stroke set II is selected). An end point of the stroke set III is close to the other end point of the stroke set II. Therefore, the rendering order of stroke sets is rearranged into an order of the stroke set I, the stroke set II, the stroke set III, and the stroke set IV.

Step S5: When the render-ending point of a target stroke set is close to the render-ending point of another stroke set located ahead of the target stroke set, the order and directions of the strokes in the other stroke set is reversed.

The strokes in the same stroke set are to be rendered in a consistent direction. The rendering direction in each stroke set is already defined based on the original rendering order. In FIG. 27A, the directions are indicated by arrows. However, as a result of rearranging the rendering order, the rendering direction based on the original rendering order may not be appropriate. In this case, the rendering direction of the strokes in each stroke set is optimized.

For example, in FIG. 27A, the render-starting point of the stroke set IV and the render-ending point of the stroke set II are the two closest points to the render-ending point of the stroke set I. Among these two closest points, the end point of a stroke in the stroke set IV is a render-starting point, and therefore the direction of the stroke 85 does not need to be reversed. However, the end point (among the two closest points) of the stroke in stroke set II is a render-ending point, and therefore the direction of the stroke 78 needs to be reversed.

Next, the stroke set III has an end point that is closest to the render-ending point of the stroke set II that has been reversed. The corresponding end point of the stroke set III is a render-ending point (in FIG. 27A), and therefore, the rendering order organizing unit 110 rearranges the order and the directions of the strokes in the stroke set III. FIG. 27B illustrates an example of rendering directions that have been changed as described above.

Step S6: Renew the rendering order of the stroke sets and the rendering directions of the strokes within each stroke set. By performing the above process, the rendering order of the stroke sets and the rendering directions of the strokes within each stroke set in the font data are changed. Therefore, the rendering order organizing unit 110 updates the font data with the new rendering order and new rendering directions.

That is to say, when organizing the rendering order, the rendering order organizing unit 110 defines the stroke sets that are to be continuously rendered. Then, in order to eliminate any needless operations of the direction control mirror 13, a stroke set close to a particular stroke set is determined to be the next rendering target, and the rendering directions are determined based on the rendering order. Therefore, the rendering time can be reduced (the length of movement of the direction control mirror 13 is minimized).

In the case of a thick character, the rendering order of stroke set groups is determined in the same manner as in the case of a regular character. This is because stroke sets in the same stroke set group will correspond to the same rendering order. Furthermore, the stroke sets in the same stroke set group are rendered in the same direction.

Further Optimization of Rendering Order

Instead of performing the process of determining the rendering order of stroke sets and changing the rendering order and directions of strokes in the same stroke set, the following process may be performed. Specifically, the rendering order of stroke sets may be determined by using the lengths between end points as indices.

Figures 28A, 28B, 28C, 28D, 28E:
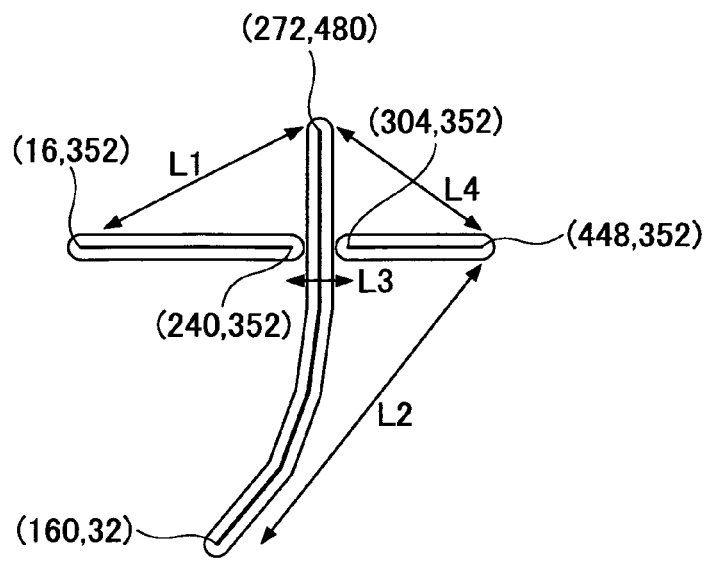
FIGS. 28A through 28E schematically illustrate a process of determining the rendering order of stroke sets.

FIGS. 28A through 28E schematically illustrate the process of determining the rendering order of stroke sets. FIG. 28A illustrates a Japanese katakana character "na" (ナ). As a result of eliminating overlapping parts, the first stroke is divided, and therefore the character is formed by three strokes. As a matter of description, the "i" th stroke is expressed as Si. Assuming that "n" is the number of strokes, "i" satisfies (0≤i≤n−1).

When the number of strokes is "n", the number of variations of rendering orders is expressed as "n!". However, each stroke may be rendered from the render-starting point or the render-ending point. Thus, the number of arrangements of strokes for each of the variations of rendering orders is expressed as $2^{\wedge}(n-1)$, where "^" indicates the power.

Accordingly, when the number of strokes included in a character is "n", the number of variations of rendering orders is "n!×2^(n−1)", in consideration of render-starting points and render-ending points. The number of strokes is n=3 in the character "na" (ナ), and therefore there are 24 variations of rendering orders.

FIG. 28B through 28E indicate three examples of rendering orders. The character "na" (ナ) has three sets of coordinates after overlapping parts have been eliminated, as indicated in FIG. 28B. The rendering order is optimized based on these coordinates. FIG. 28C illustrates the coordinates before rearranging the rendering order. FIG. 28D illustrates the coordinates after rearranging the rendering order. FIG. 28E illustrates the coordinates after rearranging the rendering order, in which the render-starting point and the render-ending point of one of the strokes have been reversed. In FIG. 28C through 28E, in the bracket [ ] at the front of each line, "+" indicates that the render-starting point and the render-ending point of the corresponding stroke has not been reversed, and "−" indicates that the render-starting point and the render-ending point of the corresponding stroke has been reversed.

The rendering order organizing unit 110 obtains the sum of lengths between stroke sets, for each arrangement of data. That is to say, the total length that the render target position moves without rendering a stroke is obtained.

In FIG. 28C, a stroke is rendered from (160, 32) to (272, 480), then a stroke is rendered from (16, 352) to (240, 352), and then a stroke is rendered from (304, 352) to (448, 352). Accordingly, the total length that the render target position moves without rendering a stroke is obtained by the following formula.

$$\text{Total length}=L1+L3=\sqrt{\{(272-16)^2+(480-352)\}^2}+\sqrt{\{(240-304)^2+(352-352)^2\}}=350.2$$

In FIG. 28D, a stroke is rendered from (16, 352) to (240, 352), then a stroke is rendered from (304, 352) to (448, 352), and then a stroke is rendered from (160, 32) to (272, 480). Accordingly, the total length that the render target position moves without rendering a stroke is obtained by the following formula.

$$\text{Total length}=L3+L2=\sqrt{\{(240-304)^2+(352-352)^2\}}+\sqrt{\{(448-160)^2+(352-32)^2\}}=494.5$$

In FIG. 28E, a stroke is rendered from (16, 352) to (240, 352), then a stroke is rendered from (304, 352) to (448, 352), and then a stroke is rendered from (272, 480) to (160, 32). Accordingly, the total length that the render target position moves without rendering a stroke is obtained by the following formula.

$$\text{Total length}=L3+L4=\sqrt{\{(240-304)^2+(352-352)^2\}}+\sqrt{\{(448-272)^2+(352-480)^2\}}=281.6$$

The rendering order organizing unit 110 selects the rendering order having the shortest total length (that the render target position moves without rendering a stroke). In the example of FIGS. 28A through 28E, the rendering order indicated in FIG. 28E has the shortest total length, among 24 variations of rendering orders including those that are not illustrated in the figures.

In FIGS. 28A through 28E, the rendering order of only one character is optimized. When continuously rendering two or more characters, the render target position moves from the last rendering position of a previous character to the first rendering position of the next character, without actually rendering a stroke. In this case, the process described with reference to FIGS. 28A through 28E is not only performed on each character, but may also be performed on the entire character string on one page of the thermal rewritable medium 20. By doing so, the processing time may increase, but the time taken for rendering may be reduced.

Finally, a font data generating unit 113 stores, in the hard disk 35 or the memory 32, the font data in which the rendering order of the character has been optimized.

<Step S130: Generation of Render Command>

Figure 29:
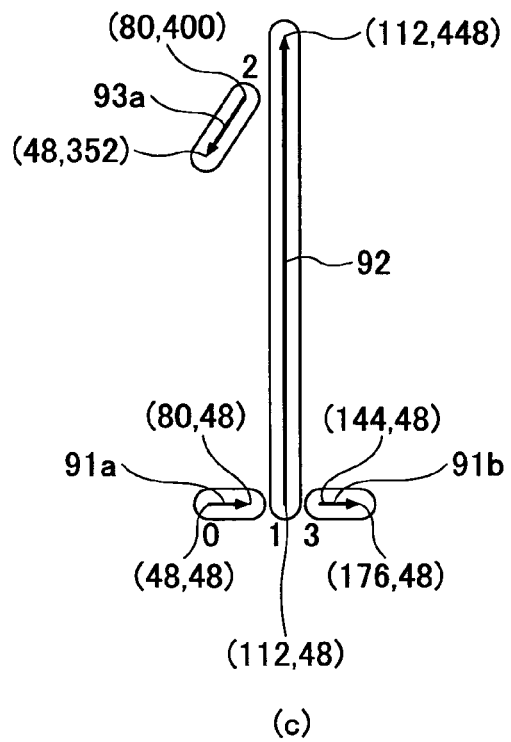
FIG. 29 illustrates an example of rendering a character from which overlapping parts have been eliminated, and a render command of the character.

Referring back to FIG. 10, a description is given of a render command. FIG. 29 illustrates an example of rendering a character from which overlapping parts have been eliminated, and a render command of the character. The character "1" originally includes three strokes, as illustrated in FIG. 9. However, in FIG. 29, the stroke 91 is divided at an intersection (112, 48) into strokes 91A and 91B, and a stroke 93 is shortened from a turnback point (112, 448), thus forming a new stroke 93A. After eliminating the overlapping parts, four strokes are included in the character.

FIG. 29-(*a*) is the same as FIG. 9-(*b*), and FIG. 29-(*b*) illustrates the coordinates of strokes that are targets for generating a render command. The font data that is generated by the font data generating unit 113 corresponds to FIG. 29-(*a*). FIG. 29-(*c*) illustrates an example of a character rendered based on FIG. 29-(*b*). It is assumed that the rendering order has already been optimized.

Once the coordinates of the strokes and the rendering order have been determined as described above, a render command can be generated by associating "m" and "d" (described with reference to FIG. 9) with the coordinates. FIG. 29-(*d*) illustrates an example of a render command. As shown in FIG. 29-(*d*), "m" and "d" are the same control codes as those of FIG. 9, "z" is character attribute information, "t" is the thickness of the character, and "w" is the time waited before the laser radiation unit 160 starts to render a stroke (a control code for stabilizing the rendering process by waiting for the moving direction control mirror 13 to completely stop). A fixed value that is appropriate for the laser radiation unit 160 may be determined for "w" in advance. For example, the value may be in units of milliseconds or microseconds, or in any other time unit that is unique to the laser radiation unit 160. As for the character attribute information "z", a predetermined value (for example, the number of strokes) is input in the case of a thick character. The thickness of the character "t" may be a value input by the user.

According to FIG. 29-(*b*), the laser radiation unit 160 first moves to coordinates (48, 48) without rendering a stroke, and then waits for a predetermined length of time "w 50". Accordingly, the render command reads "m 48 48" and "w 50".

Next, the laser radiation unit 160 moves from coordinates (48, 48) to coordinates (80, 48) while rendering a stroke, and then moves to coordinates (112, 48) without rendering a stroke, and then waits for a predetermined length of time "w 50". Therefore, the render command reads "d 80 48", "m 112 48", and "w 50".

Next, the laser radiation unit 160 moves from coordinates (112, 48) to coordinates (112, 448) while rendering a stroke, and then moves to coordinates (80, 400) without rendering a stroke. Therefore, the render command reads "d 112 448", "m 80 400", and "w 50".

Next, the laser radiation unit 160 moves from coordinates (80, 400) to coordinates (48, 352) while rendering a stroke, and then moves to coordinates (144, 48) without rendering a stroke. Therefore, the render command reads "d 48 352", "m 144 48", and "w 50".

Next, the laser radiation unit 160 moves from coordinates (144, 48) to coordinates (176, 48) while rendering a stroke, and then the rendering process ends. Therefore, the render command ends at "d 176 48".

According to such a render command, a character without any overlapping parts as shown in FIG. 29-(*c*) can be rendered within minimum time.

Figure 30:
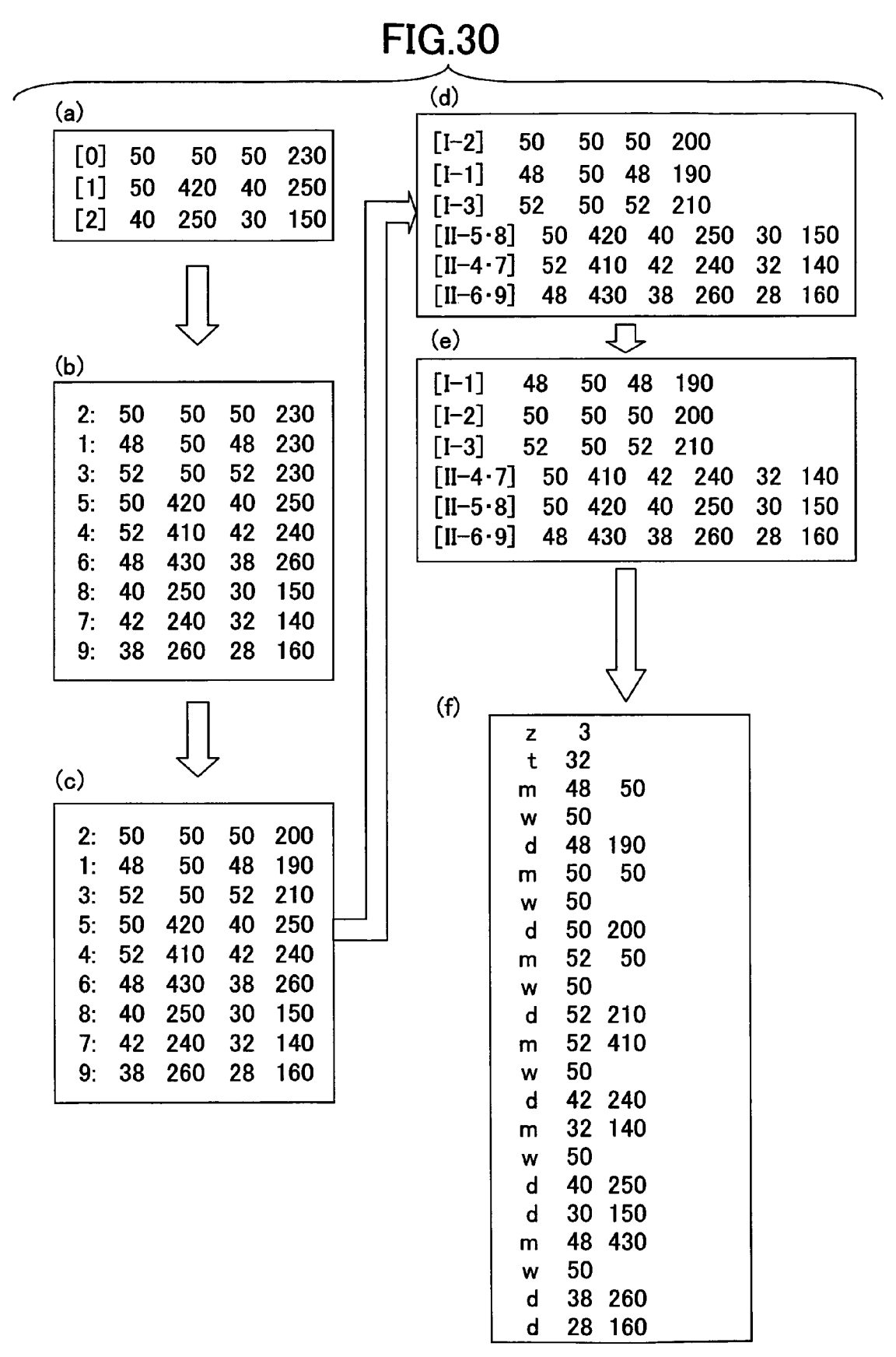
Figure 31:
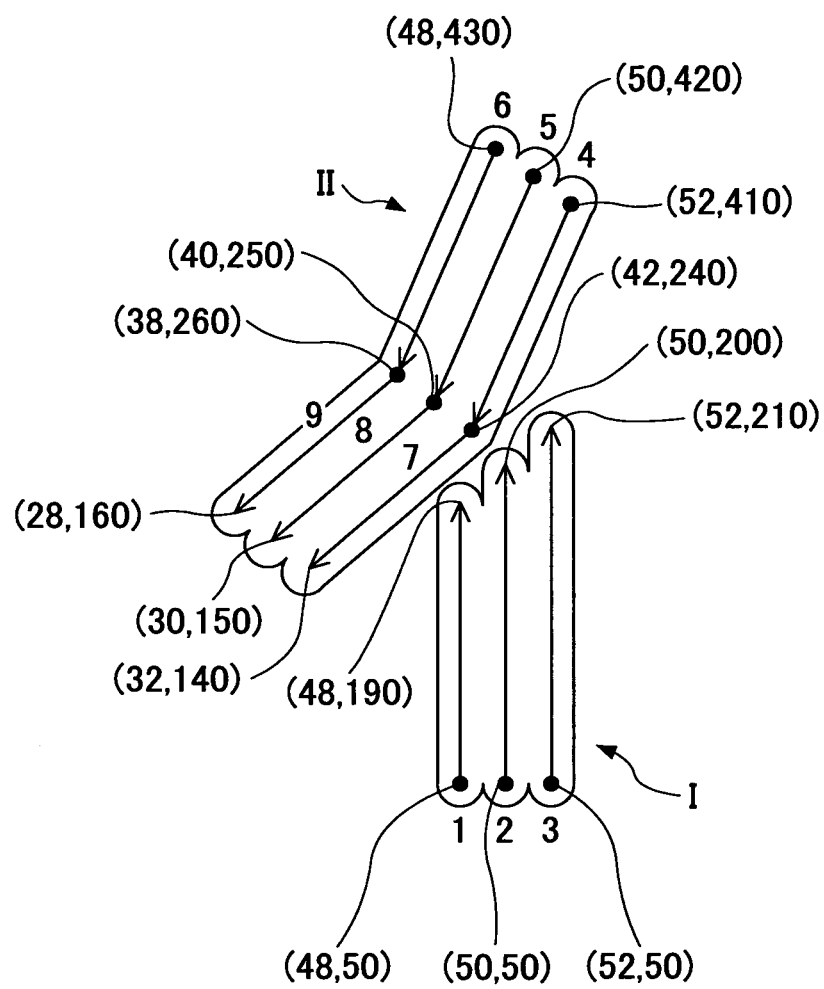
FIG. 31 illustrates an example of a rendered thick character.

FIG. 30 schematically illustrates the process of generating a render command for a thick character. FIG. 31 illustrates a character rendered based on the render command of FIG. 30. The character that is a rendering target is a Japanese katakana character "i" (イ). The coordinates of the strokes extracted from the font data are as indicated in FIG. 30-(*a*).

The character attribute information specifies a thick character. Therefore, the parallel stroke generating unit 105 has generated three parallel strokes based on each original stroke. In FIG. 31, the original strokes are a stroke 2, a stroke 5, and a stroke 8. Furthermore, the strokes and stroke sets forming lines of the thick character are respectively included in a stroke set group. In this example, two stroke set groups I and II are generated for the character "i" (イ).

This character has a bent portion, and therefore there is an overlapping part in parallel strokes 6 and 9, and there is a detached part in parallel strokes 4 and 7. The parallel stroke length adjusting unit 106 eliminates the overlapping part from parallel strokes 6 and 9 and the detached part from parallel strokes 4 and 7, and determines new coordinates for the parallel strokes 6, 9, 4, and 7. As shown in FIG. 30-(*b*), the new coordinates are (38, 260) for the parallel strokes 6 and 9, and (42, 240) for the parallel strokes 4 and 7. The original strokes 2, 5, and 8 are actually removed. When a line includes three strokes, a new parallel stroke is rendered at the same position as the original stroke. However, in this case, by not generating the new parallel stroke at the same position as the original stroke, the step of removing the original stroke may be omitted.

Next, the overlapping stroke calculating unit 108 detects the overlapping parts between the parallel stroke 1 and the strokes 4 through 9, the overlapping parts between the parallel stroke 2 and the strokes 4 through 9, and the overlapping parts between the parallel stroke 3 and the strokes 4 through 9. The stroke dividing/shortening unit 109 shortens the parallel strokes 1 through 3. As shown in FIG. 30-(*c*), the coordinates of the render-ending points of the parallel strokes 1 through 3 that have been shortened are (48, 190), (50, 200), and (52, 210), respectively.

Next, the rendering order organizing unit 110 detects strokes that are intersecting at a large angle, and groups them together into a stroke set. The parallel strokes 4 and 7 form a stroke set, the original strokes 5 and 8 form a stroke set, and the parallel strokes 6 and 9 form a stroke set. As shown in FIG. 30-(*d*), the rendering order organizing unit 110 integrates coordinates for each of the stroke sets.

Next, the rendering order organizing unit 110 organizes the rendering order. In FIG. 31, the directions indicated by the arrows correspond to the shortest rendering time.

Next, the rendering order organizing unit 110 continuously renders stroke sets within a stroke set group. As shown in FIG. 30-(*e*), the rendering order is organized in the order of the strokes 1, 2, and 3, the strokes 4 and 7, the strokes 5 and 8, and the strokes 6 and 9. FIG. 30-(*e*) shows the final font data. The font data generating unit 113 stores this font data in the hard disk 35 or the memory 32.

The render command generating unit 114 generates a render command based on the font data in FIG. 30-(*e*). The render command generating unit 114 combines control codes "m" and "d" with coordinates in the rendering order to generate a render command. FIG. 30-(*f*) illustrates an example of a render command for a thick character of "i" (イ).

<Step S140: Rendering with a Laser Beam>

According to the render command, the overall control device 100 renders a character.

I) The overall control device 100 waits for "50" unit time at the coordinates (48, 48), the overall control device 100 renders a stroke with a laser to coordinates (80, 48).

II) Then, the overall control device 100 moves the laser radiation position from coordinates (80, 48) to coordinates (112, 48) by driving the direction control mirror 13 without radiating a laser beam, waits for "50" unit time, and then renders a stroke with a laser beam to coordinates (112, 448).

III) Then, the overall control device 100 moves the laser radiation position to coordinates (80, 400) by driving the direction control mirror 13 without radiating a laser beam, waits for "50" unit time at coordinates (80, 400), and then renders a stroke to coordinates (48, 352).

IV) Then, the overall control device 100 moves the laser radiation position to coordinates (144, 48) by driving the direction control mirror 13 without radiating a laser beam, waits for "50" unit time at coordinates (144, 48), and then renders a stroke to coordinates (176, 48).

Accordingly, the process of FIG. 11 ends.

Application Example of Method of Rendering Thick Character

Figure 32:
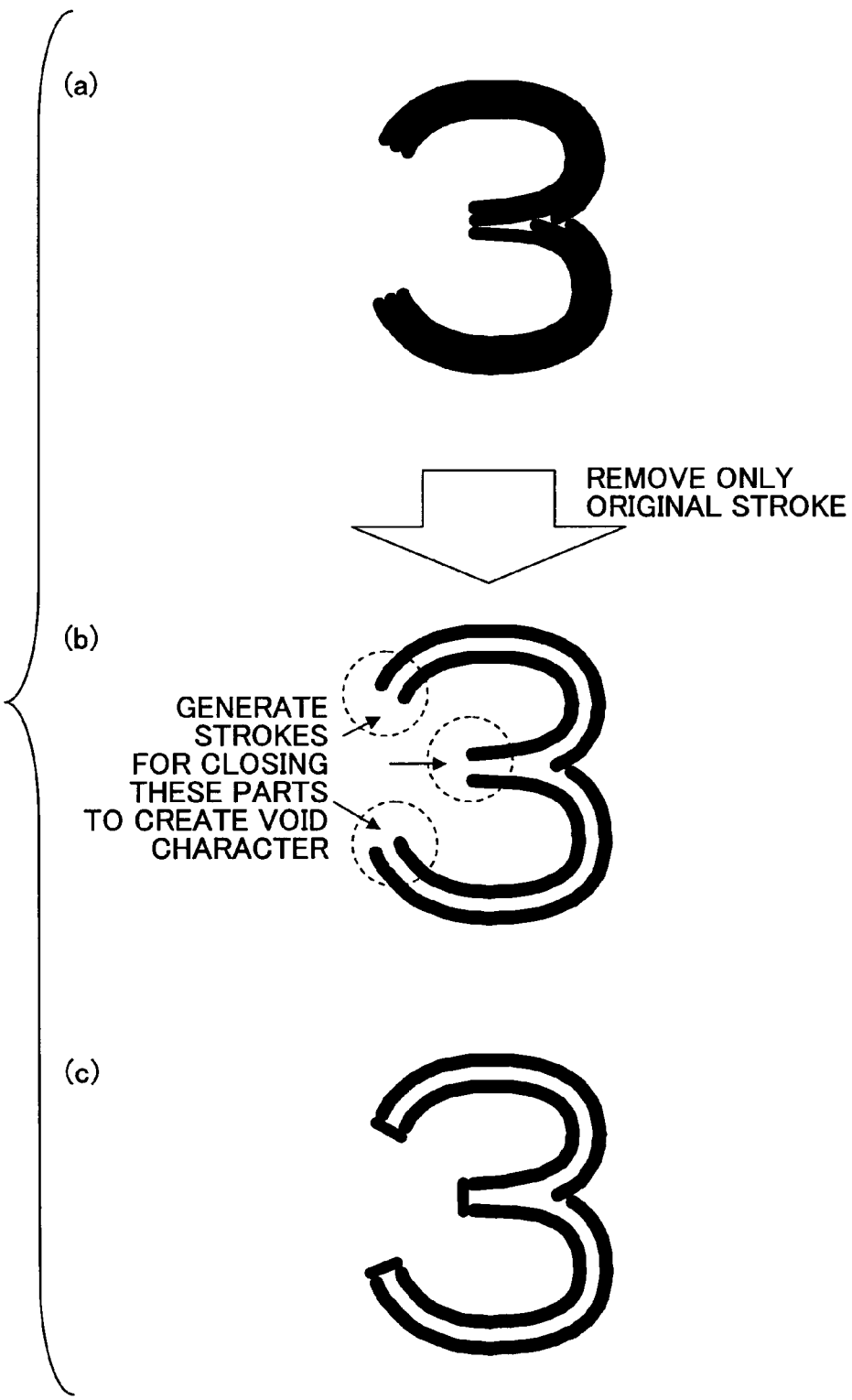
FIG. 32 illustrates examples of a filled-in thick character and void thick characters.

A thick character whose inside is not filled in, i.e., an outline character (void character), can be rendered by removing the parallel strokes generated by the parallel stroke generating unit 105, except for the two outermost parallel strokes. FIG. 32 illustrates examples of a filled-in thick character, and void thick characters. In FIG. 32-(*a*), the character "3" is a thick character formed with three parallel strokes.

A thick character whose inside is not filled in, i.e., an outline character (void character), can be rendered by deleting the middle parallel stroke from the character "3" in FIG. 32-(*a*), and retaining only the strokes on the outside. As a result of eliminating overlapping parts from the bent portion having small angles at the center part of "3", void parts (parts that are not filled in) may be formed (see FIG. 32-(*a*)). In such a case, by deleting the middle stroke, the appearance of the character may be improved (see FIG. 32-(*b*)).

Furthermore, as shown in FIG. 32-(*b*), the end parts (parts circled with dashed lines) of parallel strokes are not connected to other parallel strokes. An outline character, which is formed with only outlines of the character, can be created by adding new strokes that are in perpendicular directions with respect to the parallel strokes. For example, among end parts of parallel strokes that are not connected to other strokes, the parallel stroke generating unit 105 detects an end part that is located within a certain length from a particular end part (the certain length being substantially equal to the thickness of the character). Then, the parallel stroke generating unit 105 determines to locate coordinates of the new stroke at positions that do not overlap with the detected end part and the particular end part. Accordingly, the parallel stroke generating unit 105 generates a new stroke that is perpendicular to existing parallel strokes, positioned at end parts of the existing parallel strokes.

As described above, the laser radiation device 200 according to the present embodiment generates strokes to form a thick character, and then eliminates overlapping parts or detached parts in consideration of the thickness of the laser beam. Therefore, the laser radiation device 200 can render thick characters having good appearances without overheating the thermal rewritable medium 20.

In the present embodiment, characters are rendered with laser beams. However, the characters may be rendered by applying means such as hot air, cold air, electron beams, or radioactive rays, onto a medium that reacts to such means. Furthermore, in the present embodiment, the characters are rendered in a non-contact manner with the laser beams. However, the characters may be rendered by bringing a probe (stylus) in direct contact with the thermal rewritable medium 20.

Second Embodiment

In the first embodiment, the laser radiation device renders characters as a single unit; however, the laser radiation device may be implemented as a system.

Figure 33:
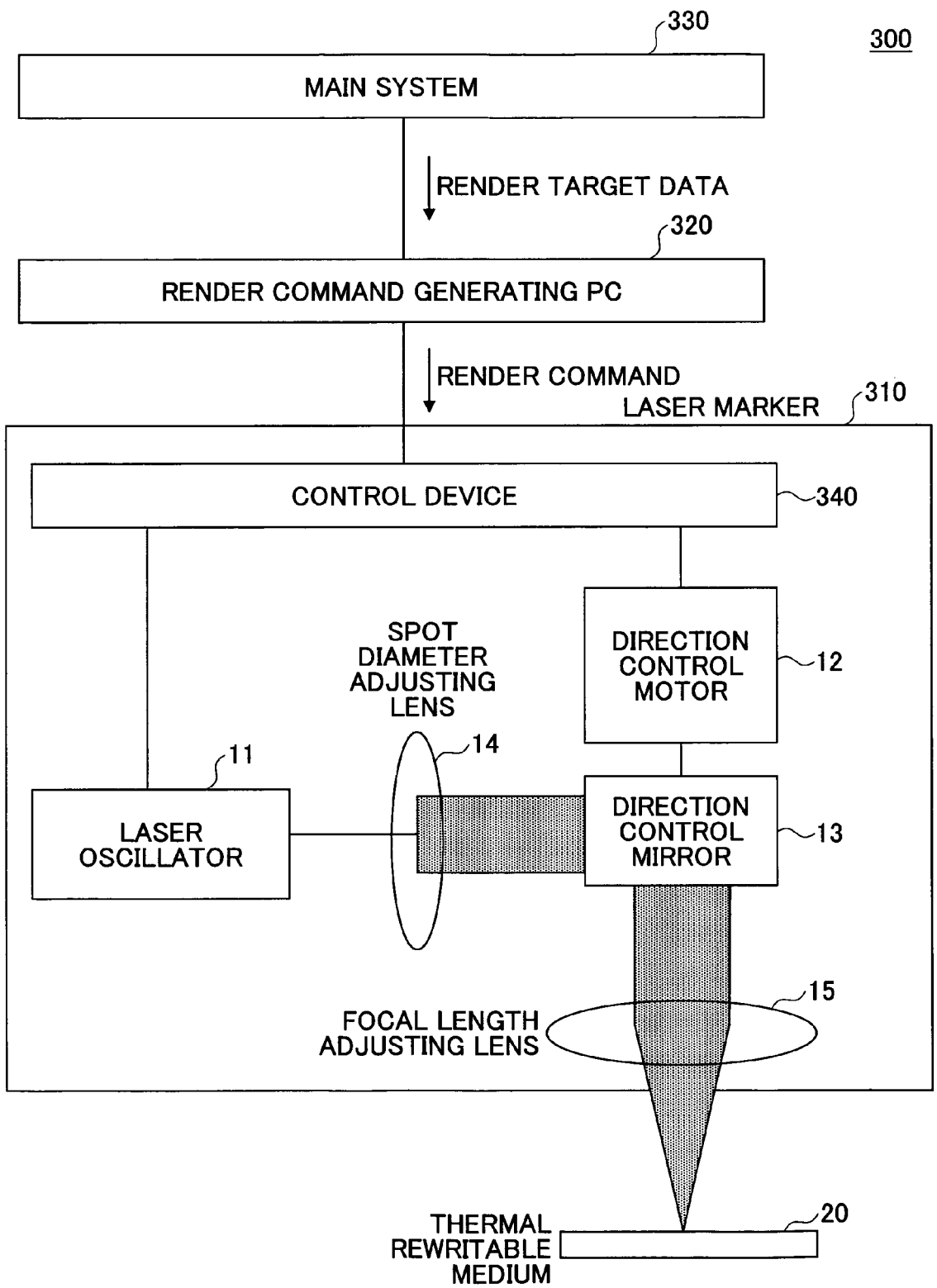
FIG. 33 illustrates an example of a hardware configuration of a laser radiation system according to a second embodiment of the present invention.

FIG. 33 illustrates an example of a hardware configuration of a laser radiation system 300 according to a second embodiment of the present invention. In FIG. 33, elements corresponding to those in FIG. 5 are denoted by the same reference numerals and are not further described. The overall control device 100 shown in FIG. 5 corresponds to a control device 340 and a render command generating PC 320 in FIG. 33. A main system 330 and the render command generating PC 320 are connected by a network or a dedicated line.

For example, the main system 330 is for managing commodities that are carried by containers, and sends an instruction to the render command generating PC 320 to report the characters that are to be printed onto the thermal rewritable medium 20. The instructions include render target data for managing the commodities, such as commodity names and date information. The render command generating PC 320 receives render target data and generates a render command. The method of generating a render command is the same as that of the first embodiment. The render command generating PC 320 sends the generated render command to the control device 340.

Figure 34:
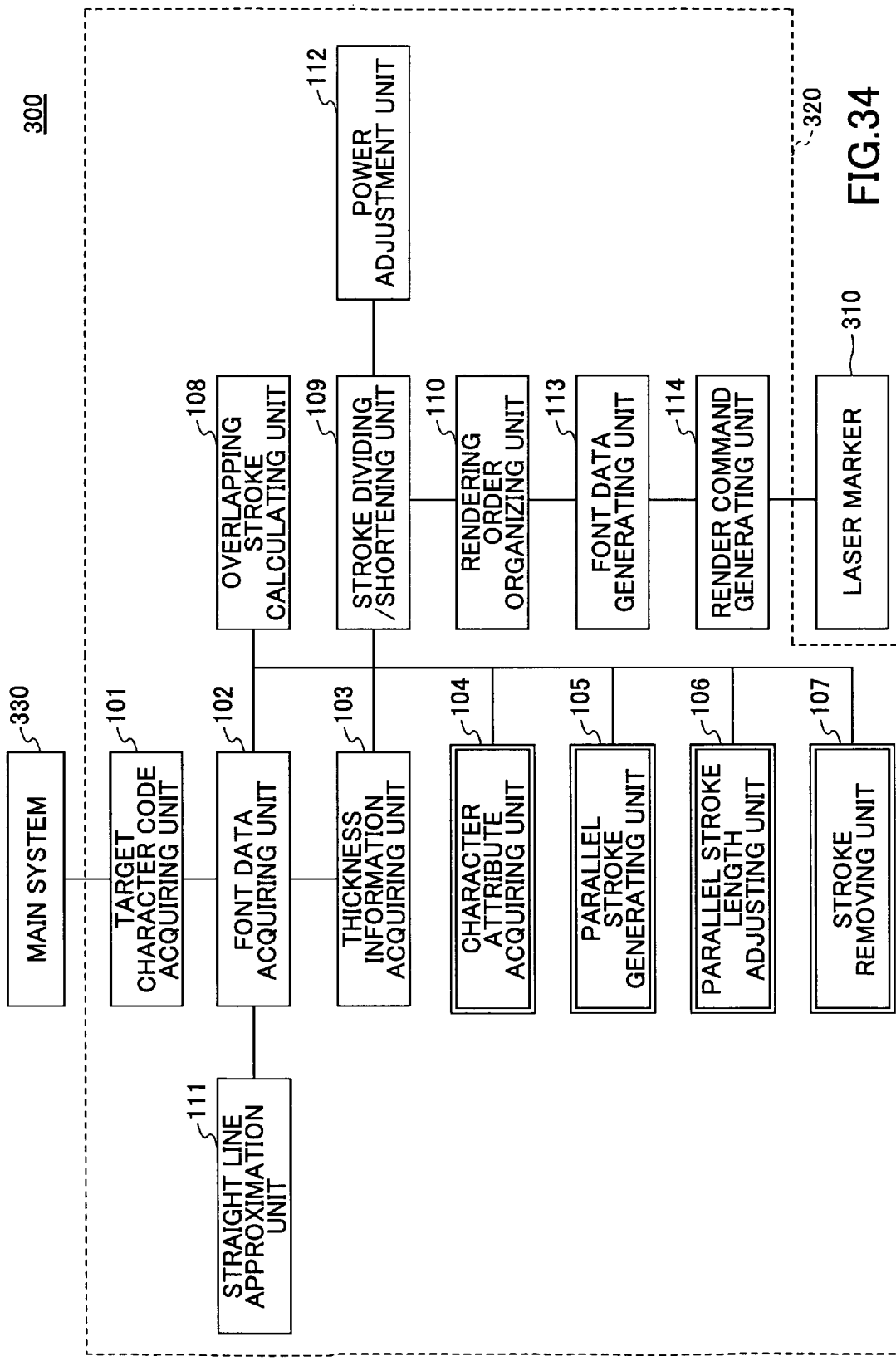
FIG. 34 is a functional block diagram of the laser radiation system according to the second embodiment.

FIG. 34 is a functional block diagram of the laser radiation system 300 according to the present embodiment. In FIG. 34, elements corresponding to those in FIG. 10 are denoted by the same reference numerals and are not further described. In FIG. 34, the render command generating PC 320 provides the various functions illustrated in FIG. 10. That is to say, the functions for generating the render command are implemented by the render command generating PC 320 and the render command is sent to a laser marker 310. The laser marker 310 interprets the render command, and drives the direction control mirror 13 and turns the laser beam ON/OFF to render a character on the thermal rewritable medium 20.

Figure 35:
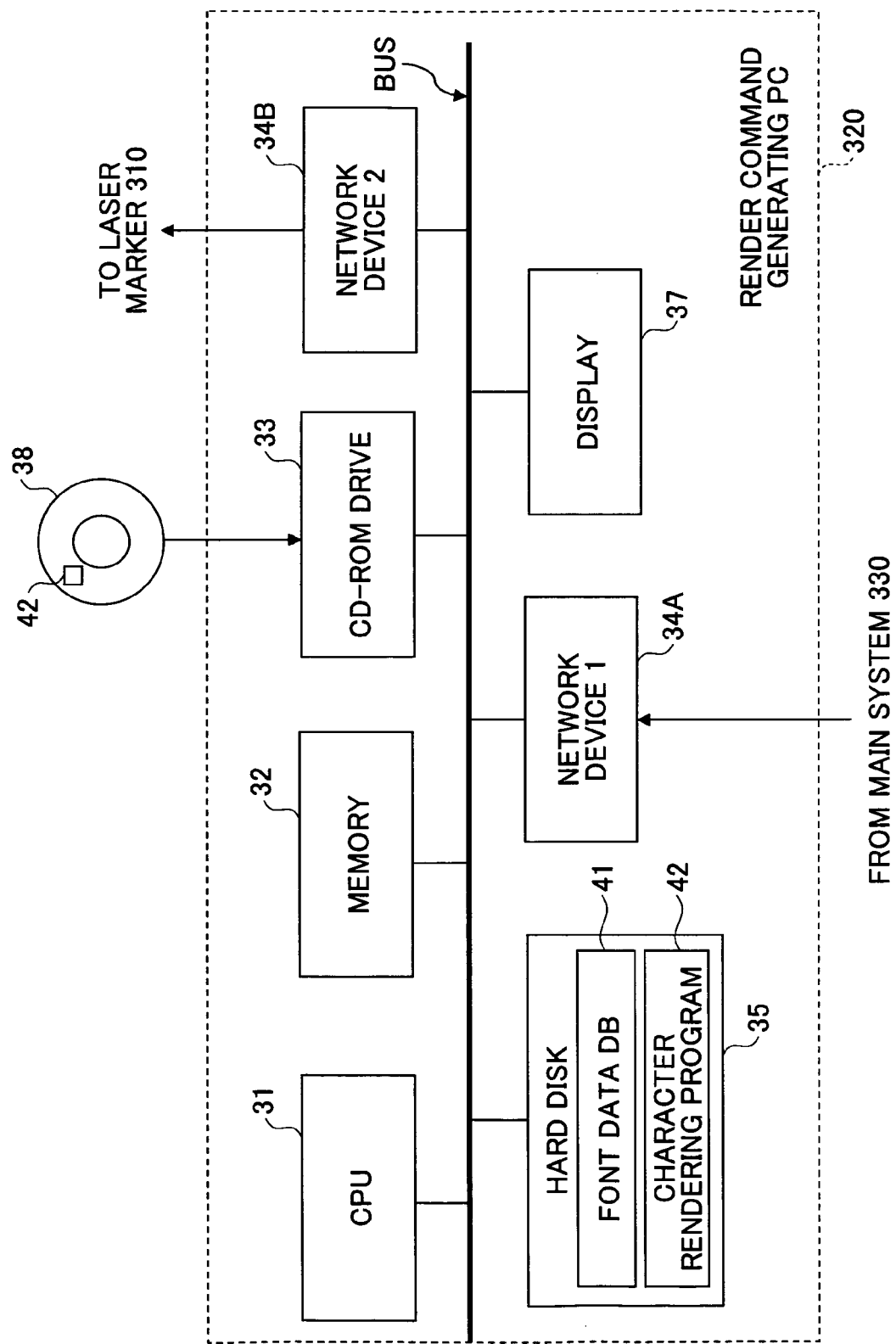
FIG. 35 illustrates a hardware configuration of a render command generating PC.

FIG. 35 illustrates a hardware configuration of the render command generating PC 320. In FIG. 35, elements corresponding to those in FIG. 6 are denoted by the same reference numerals and are not further described. The data (for example, the character code and character attributes such as thickness, size, and font of the character to be rendered) that is used as the basis of the render target is stored into the hard disk 35 via a network device 1 (34A) from the main system 330. Furthermore, font data used for rendering the character is read out from the CD-ROM drive 33 in advance and stored in the hard disk 35.

The CPU 31 reads, from the recording medium (CD-ROM) 38, the character rendering program 42 for implementing the above-described process functions and processes, together with required data. Then, the CPU 31 sends processing results to the laser marker 310 via a network device 2 (34B). According to need, the CPU 31 saves the processing results in the hard disk 35 or outputs the processing results to the display 37.

According to the present embodiment, the render command generating PC 320 and the laser marker 310 are separately provided. Therefore, plural render command generating PCs 320 may be connected to a single laser marker 310, and it is possible to move or replace only the command generating PC 320. Accordingly, flexibility of the system can be enhanced.

Third Embodiment

In the first and second embodiments, the render command is generated after converting curved lines into straight lines in each character. However, when the font data is for rendering curved lines (for example, in the case of a scalable font displayed by Bezier curves), the coordinates are unknown until a raster process is performed and the shape of the character is formed. After the coordinates are determined, straight line approximation is performed on the curved lines of the character. Therefore, a large processing load would be required.

Accordingly, in a third embodiment according to the present invention, regardless of whether or not a render command is generated, a preparation process is performed. The following describes the preparation process for converting curved lines of a character into straight lines, performed by the laser radiation device 200 or the laser radiation system 300.

Figure 36:
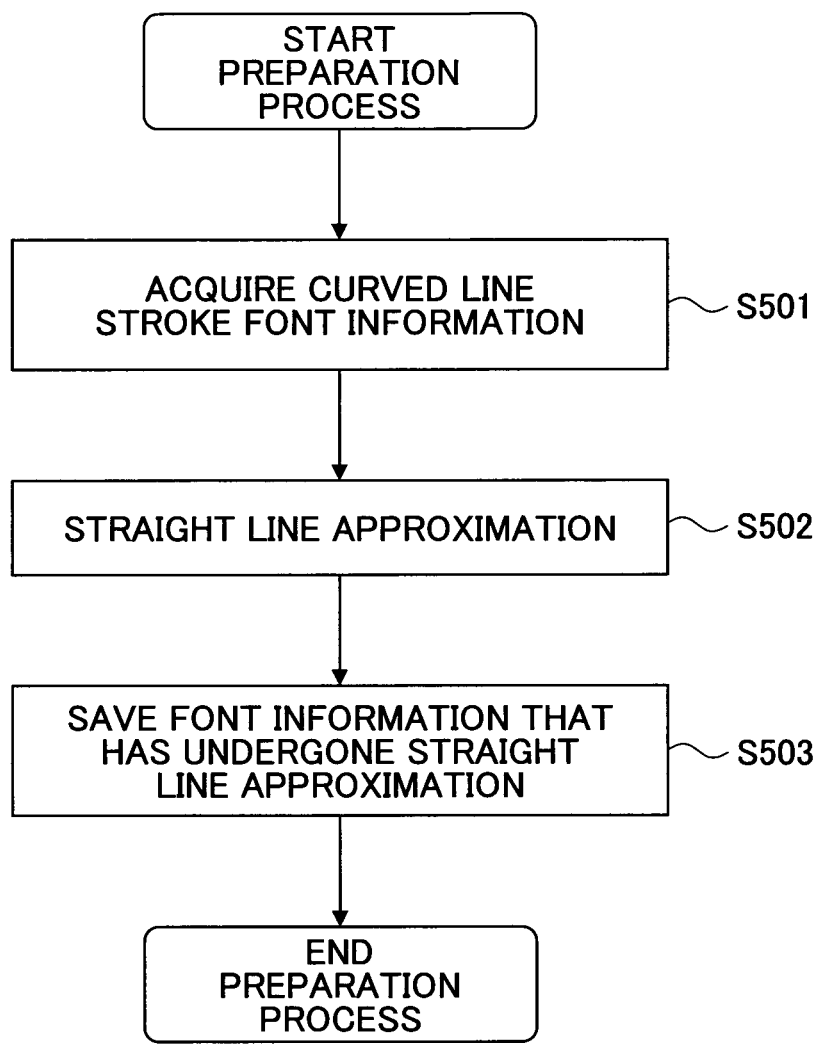
FIG. 36 is a flowchart of a preparation process according to a third embodiment of the present invention.

FIG. 36 is a flowchart of the preparation process. The preparation process is for converting curved lines into straight lines, and is thus executed by the straight line approximation unit 111 shown in FIG. 10.

The straight line approximation unit 111 acquires curved line stroke font information (step S501). The curved line stroke font information is stored in the hard disk 35. The curved line stroke font information is font data of a character having curved lines. A character having curved lines is given identification information in advance, indicating that curved lines are included in the character.

The straight line approximation unit 111 converts the curved lines included in the curved line stroke font information into straight lines (step S502). The method of converting curved lines into straight lines (straight line conversion method) is the method described with reference to FIGS. 21A and 21B. The number of straight strokes into which a curved stroke is divided varies depending on the size of the character. Therefore, the straight line conversion method is preferably performed for each size (of the characters) at a time (for example, 4 mm², 7 mm², 10 mm², etc.).

The straight line approximation unit 111 stores the font data that has undergone the preparation process in the hard disk 35 (step S503). The straight line approximation unit 111 repeatedly performs the above-described process for all of the sets of curved line stroke font information.

The straight line approximation is completed according to the process described with reference to FIG. 36. Thereafter, the respective units execute the process from step S30 onward in FIG. 11. By completing, in advance, the process of converting curved lines of characters into straight lines, which incurs a large processing load, the time taken to generate a render command and to complete the rendering process can be reduced.

Fourth Embodiment

Other than performing the preparation process according to the third embodiment, optimized font data may be generated and stored in advance by the same process as that of the first embodiment. Specifically, in the optimized font data, overlapping parts are eliminated and the rendering order is optimized. By preparing such optimized font data in advance, a render command can be easily generated from the optimized font data. Accordingly, the processing load during the rendering process can be reduced, and the time taken to complete the rendering process can also be reduced.

Figure 37A:
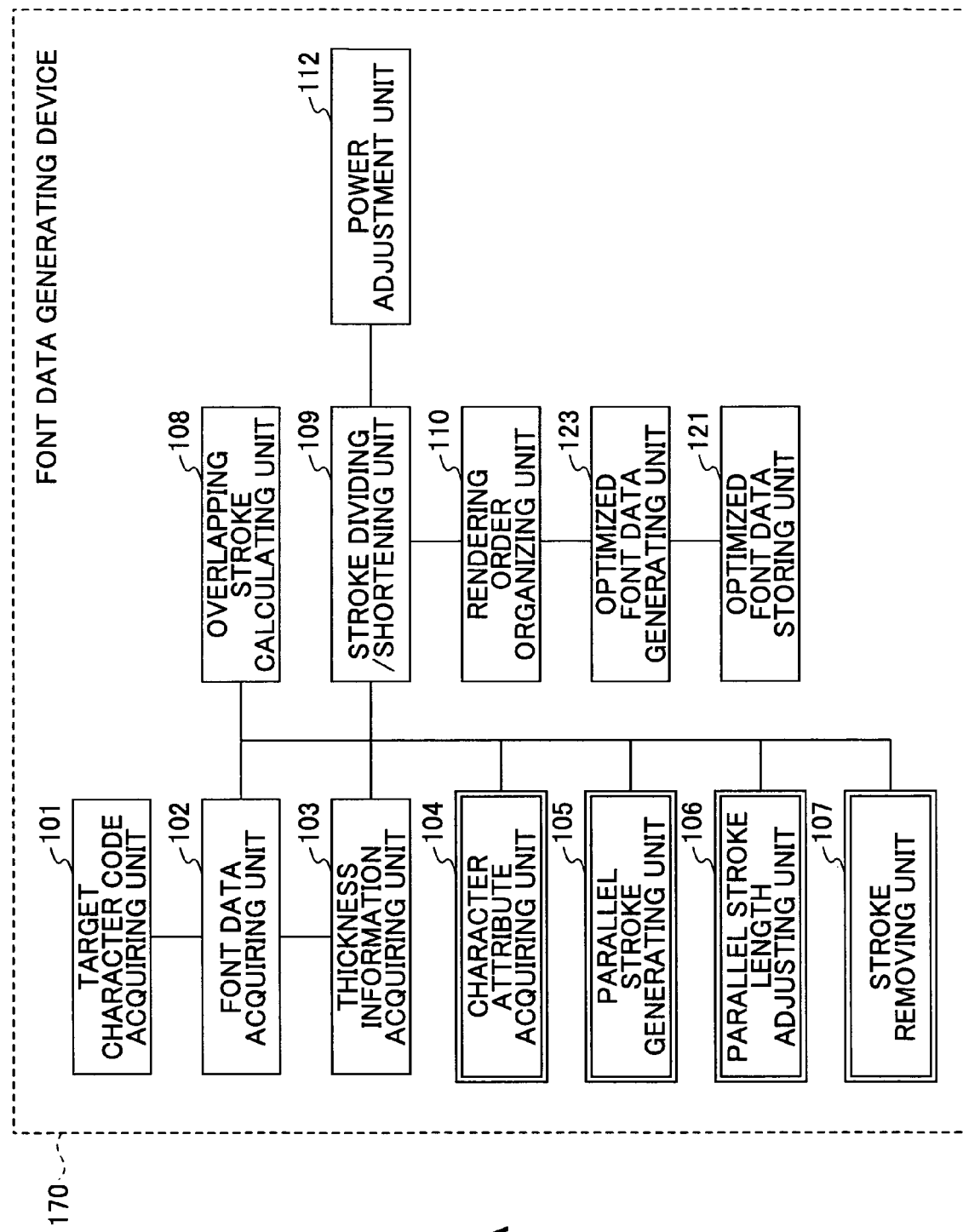
FIGS. 37A and 37B are functional block diagrams of a font data generating device for generating the optimized font data according to a fourth embodiment of the present invention.
Figure 37B:
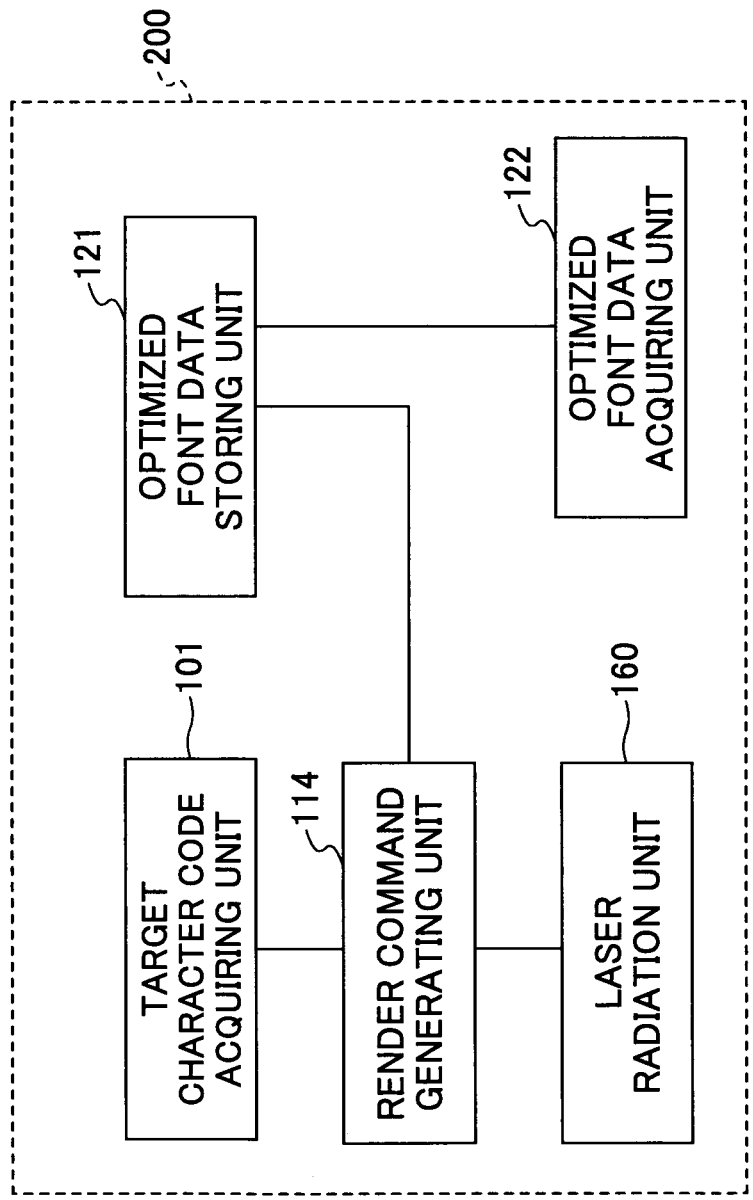

FIG. 37A is a functional block diagram of a font data generating device 170 for generating the optimized font data according to a fourth embodiment of the present invention. FIG. 37B is a functional block diagram of the laser radiation device 200 according to the fourth embodiment. In FIG. 37A, elements corresponding to those in FIG. 10 are denoted by the same reference numerals and are not further described.

FIGS. 37A and 37B are different from FIG. 10 in the following respect. As shown in FIG. 37A, the font data generating device 170 includes an optimized font data generating unit 123 and an optimized font data storing unit 121. As shown in FIG. 37B, the laser radiation device 200 includes the optimized font data storing unit 121. The entity of the font data generating device 170 is a computer, similar to the overall control device 100. As it can be clearly seen by comparing FIG. 37A with FIG. 10, the process of generating optimized font data according to the fourth embodiment is the same as that of the first embodiment.

The optimized font data generating unit 123 stores the optimized font data, in which overlapping parts are eliminated, into the optimized font data storing unit 121, similar to the font data generating unit 113.

In the present embodiment, the optimized font data storing unit 121 is implemented by the hard disk 35. The optimized font data storing unit 121 may be distributed in a storage medium or through a network. In the optimized font data storing unit 121, the optimized font data is stored in association with a character code. An optimized font data acquiring unit 122 reads, from the optimized font data storing unit 121, the optimized font data that is associated with the character code.

The optimized font data is, for example, as illustrated in FIG. 29-(*b*) or FIG. 30-(*e*). The optimized font data may have a different format from that of FIG. 29-(*b*) or FIG. 30-(*e*), as long as a render command can be directly generated from the font data (without requiring complex computing processes).

The optimized font data differs according to the thickness of the lines. Therefore, the optimized font data generating unit 123 generates the optimized font data for each level of thickness (of the lines), and stores the optimized font data in the hard disk 35. The thicknesses of the lines may be grouped into several ranges, such as thickness t1 through t2, thickness t2 through t3 . . . and optimized font data may be generated for each range. Accordingly, the data capacity of the hard disk 35 can be reduced. In another example, the optimized font data storing unit 121 or the optimized font data may be registered in a server, and may be downloaded to the hard disk 35 when rendering characters.

Furthermore, the stroke font data is in scalable fonts, and therefore the optimized font data differs according to the character size. Furthermore, the optimized font data differs depending on whether the thickness of the character is thick or regular. Thus, the optimized font data is preferably prepared for each character size, each thickness, and each character attribute.

When the optimized font data has been generated, the render command generating unit 114 reads the optimized font data for each character, and generates the render command as illustrated in FIG. 29-(*d*) or FIG. 30-(*f*). The render command generating unit 114 reads, from the hard disk 35 or the laser radiation unit 160, the control code "w" for waiting for the moving direction control mirror 13 to completely stop, to stabilize the rendering process. Then, the render command generating unit 114 generates a render command with the acquired character thickness "t" and the control code "w".

Operating Process

Figure 38A:
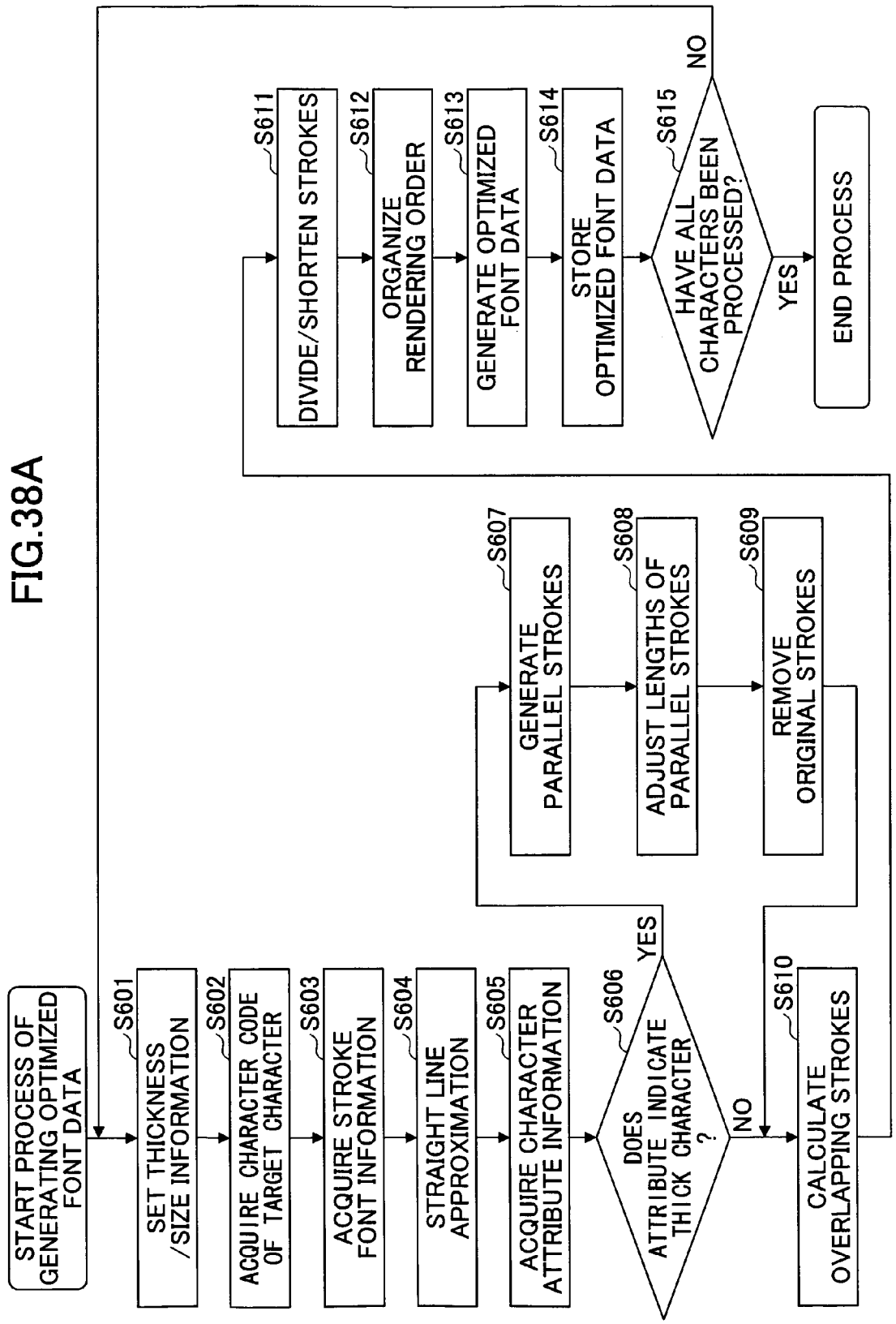
FIGS. 38A and 38B are flowcharts of a process for generating optimized font data.
Figure 38B:
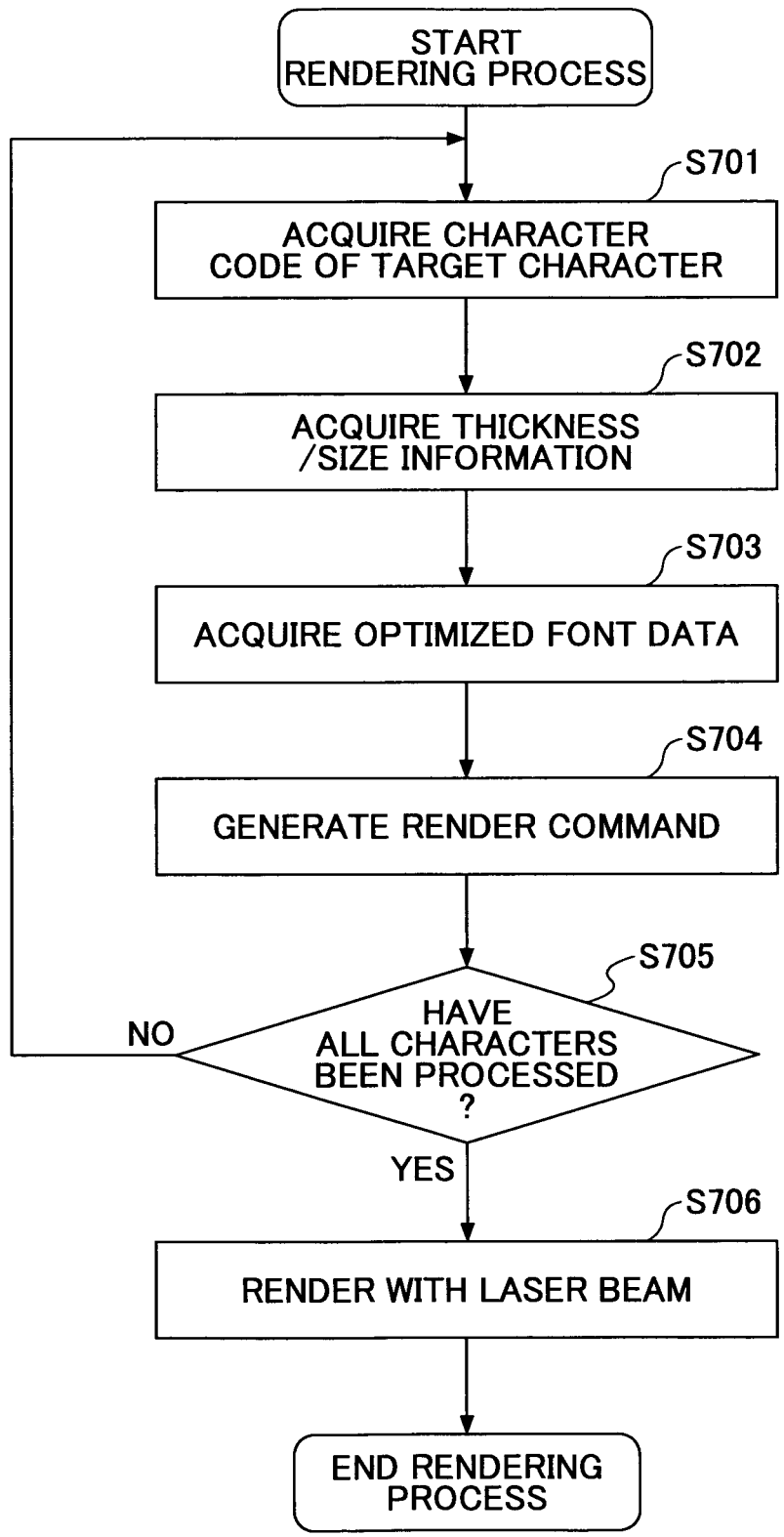

FIG. 38A is a flowchart of a process for generating optimized font data, and FIG. 38B is a flowchart of a process for rendering characters with the use of the optimized font data.

The method of generating optimized font data is the same method as that described in the first embodiment. Specifically, the laser radiation device sets information indicating the character thickness and information indicating the character size (step S601). The target character code acquiring unit 101 acquires the character code of the target character (step S602). A user inputs the information indicating the thickness and the size into the input device 36. The character codes may be sequentially read from the character code table.

The font data acquiring unit 102 reads the font data associated with the character codes (step S603). The straight line approximation unit 111 performs a straight line conversion method if the font data of the character includes curved lines (step S604).

Next, the thickness information acquiring unit 103 acquires character attribute information (step S605).

Then, the character attribute acquiring unit 104 determines whether the attribute is a thick character or not (step S606). When the attribute is a thick character (YES in step S606), the parallel stroke generating unit 105 generates parallel strokes (step S607), the parallel stroke length adjusting unit 106 adjusts the lengths of the parallel strokes (step S608), and the stroke removing unit 107 removes the original stroke (step S609).

Next, the overlapping stroke calculating unit 108 detects overlapping strokes (step S610). Then, the stroke dividing/shortening unit 109 divides or shortens the strokes (step S611).

Then, the rendering order organizing unit 110 organizes the rendering order (step S612). Based on the rendering order, the optimized font data generating unit 123 generates optimized font data (step S613), and stores the optimized font data in the optimized font data storing unit 121 (step S614). When all of the characters have been processed, the process ends (step S615).

Next, a description is given of the process of rendering characters. The target character code acquiring unit 101 acquires the character code of a character that is a rendering target (step S701). Furthermore, the optimized font data acquiring unit 122 acquires information regarding the thickness and size of the character (step S702).

The optimized font data acquiring unit 122 refers to the optimized font data storing unit 121 based on the character code, thickness, and size, and reads the optimized font data (step S703). The render command generating unit 114 generates a render command as illustrated in FIG. 29-(*d*) or FIG. 30-(*f*), based on the optimized font data (step S704).

Then, it is determined whether render commands have been generated for all of the characters that are rendering targets (step S705). When all of the characters that are rendering targets have been processed, the laser radiation unit 160 renders the character on the thermal rewritable medium 20 (step S706).

The laser radiation device 200 according to the present embodiment stores, in advance, the optimized font data in which overlapping parts have been eliminated and the rendering order has been optimized. Accordingly, when rendering characters, the processing load and the rendering time can be reduced.

According to an embodiment of the present invention, thick lines can be rendered with high image quality and without damaging the medium, even when the diameter of the laser beam is large with respect to the size of the diagram or character to be rendered.

The present invention is not limited to the specific embodiments described herein, and variations and modifications may be made without departing from the scope of the present invention.

The present application is based on Japanese Priority Application No. 2009-118907 filed on May 15, 2009 with the Japan Patent Office, the entire contents of which are hereby incorporated by reference.

The invention claimed is:

1. An information processing apparatus for generating render information of a line image that is rendered onto a medium that develops color in response to receiving energy, the line image being rendered by intermittently transferring the energy to the medium while moving an energy transfer position, the information processing apparatus comprising:

a shape information storage unit configured to store shape information of one or more strokes forming the line image, wherein the shape information is included in the render information;

a shape information acquiring unit configured to acquire, from the shape information storage unit, the shape information of the one or more strokes forming the line image that is a rendering target;

a thickness information acquiring unit configured to acquire thickness information of the line image;

a stroke generating unit configured to generate a predetermined number of parallel strokes that are each substantially parallel to an original stroke among the one or more strokes forming the line image, and to specify intervals between the parallel strokes, wherein the predetermined number corresponds to the thickness information and the intervals are specified based on the thickness information;

a stroke length adjusting unit configured to adjust at least one of a length of a first parallel stroke that is parallel to a first original stroke and a length of a second parallel stroke that is parallel to a second original stroke that is connected to the first original stroke; and a render information generating unit configured to register, in the render information of the line image that is the rendering target, the shape information of the parallel stroke whose length has been adjusted.

2. The information processing apparatus according to claim 1, further comprising:

an overlapping line detecting unit configured to detect, from among the one or more strokes forming the line image, two overlapping strokes having an overlapping part based on the thickness information and the shape information;

an acute angle line detecting unit configured to detect, from among the one or more strokes forming the line image, two connected strokes having an overlapping part, calculate an intersection angle at which the two connected strokes intersect, and detect whether the intersection angle is less than or equal to a predetermined value; and a shape information adjusting unit configured to shorten or divide at least one of the two overlapping strokes, or shorten or divide at least one of the two connected strokes that intersect at the intersection angle that is less than or equal to the predetermined value, such that the overlapping part is eliminated.

3. The information processing apparatus according to claim 1, further comprising:

an overlapping line detecting unit configured to detect, from among the one or more strokes forming the line image, two overlapping strokes having an overlapping part based on the thickness information and the shape information;

an acute angle line detecting unit configured to detect, from among the one or more strokes forming the line image, two connected strokes having an overlapping part, calculate an intersection angle at which the two connected strokes intersect, and detect whether the intersection angle is less than or equal to a predetermined value; and an output reducing unit configured to reduce output of the energy when rendering the overlapping part of the two overlapping strokes or when rendering the overlapping part of the two connected strokes that intersect at the intersection angle that is less than or equal to the predetermined value.

4. The information processing apparatus according to claim 1, wherein the stroke generating unit arranges the same number of parallel strokes on either side of the original stroke in a direction parallel to the original stroke, and arranges the same number of parallel strokes on either side of the original stroke in a direction perpendicular to the original stroke.

5. The information processing apparatus according to claim 1, further comprising:

a stroke removing unit configured to remove the shape information of the original stroke from the render information after generating the parallel strokes.

6. The information processing apparatus according to claim 5, wherein
the stroke removing unit removes the shape information of the original stroke from the render information only when the number of parallel strokes is an even number.

7. The information processing apparatus according to claim 5, wherein
the stroke removing unit removes the shape information of the parallel strokes from the render information, except for the shape information of the parallel strokes that are furthest away from the original stroke on either side of the original stroke.

8. The information processing apparatus according to claim 1, further comprising:
a rendering order organizing unit configured to organize a rendering order of plural strokes forming the line image, wherein
the rendering order organizing unit determines the rendering order such that the parallel strokes that are generated based on the same original stroke are continuously rendered, during which the parallel strokes generated based on another original stroke are not rendered.

9. The information processing apparatus according to claim 1, further comprising:
a rendering order organizing unit configured to organize a rendering order of plural strokes forming the line image, wherein
when an end point of the first parallel stroke and an end point of the second parallel stroke are connected, the rendering order organizing unit groups together the first parallel stroke and the second parallel stroke to form a stroke set, and
the rendering order organizing unit determines the rendering order such that the parallel strokes in a group of the stroke sets including the parallel strokes that are generated based on the first and second original strokes are continuously rendered, during which the parallel strokes generated based on strokes other than the first and second original strokes are not rendered.

10. The information processing apparatus according to claim 8, further comprising:
a render command generating unit configured to generate a render command based on the render information, wherein
when a rendering time of a previous stroke in the line image is less than or equal to a predetermined value, the render command generating unit inserts a waiting time after the previous stroke has been rendered and before starting to render a subsequent stroke in the line image.

11. The information processing apparatus according to claim 9, further comprising:
an output reducing unit configured to reduce output of the energy, wherein
when a rendering time of a previous stroke set in the line image is less than or equal to a predetermined value, the output reducing unit reduces the output of the energy when rendering a subsequent stroke set in the line image.

12. The information processing apparatus according to claim 1, further comprising:
a straight line approximation unit configured to generate shape information of a straight line by approximating a curved line by plural straight lines, when the shape information of the one or more strokes forming the line image includes the curved line.

13. The information processing apparatus according to claim 1, wherein
the stroke length adjusting unit adjusts at least one of the first parallel stroke and the second parallel stroke in such a manner that an end point of the first parallel stroke corresponds to an end point of the second parallel stroke.

14. A laser radiation device comprising:
the information processing apparatus according to claim 1;
a laser oscillator configured to radiate a laser beam;
a direction control mirror configured to change a direction in which the laser beam is radiated;
a direction control motor configured to drive the direction control mirror;
a spot diameter adjusting lens configured to adjust a spot diameter of the laser beam; and
a focal length adjusting lens configured to converge the laser beam and adjust a focal length of the laser beam.

15. A render information generating method for generating render information of a line image that is rendered onto a medium that develops color in response to receiving energy, the line image being rendered by intermittently transferring the energy to the medium while moving an energy transfer position, the render information generating method comprising:
acquiring shape information of the line image that is a rendering target, from a shape information storage unit storing the shape information of one or more strokes forming the line image, wherein the shape information is included in the render information;
acquiring thickness information of the line image;
generating a predetermined number of parallel strokes that are each substantially parallel to an original stroke among the one or more strokes forming the line image, and specifying intervals between the parallel strokes, wherein the predetermined number corresponds to the thickness information and the intervals are specified based on the thickness information;
adjusting at least one of a length of a first parallel stroke that is parallel to a first original stroke and a length of a second parallel stroke that is parallel to a second original stroke that is connected to the first original stroke; and
registering, in the render information of the line image that is the rendering target, the shape information of the parallel stroke whose length has been adjusted.

16. A non-transitory computer readable recording medium storing a program for generating render information of a line image that is rendered onto a medium that develops color in response to receiving energy, the line image being rendered by intermittently transferring the energy to the medium while moving an energy transfer position, the program causing a computer to function as:
a shape information acquiring unit configured to acquire shape information of the line image that is a rendering target, from a shape information storage unit storing the shape information of one or more strokes forming the line image, wherein the shape information is included in the render information;
a thickness information acquiring unit configured to acquire thickness information of the line image;
a stroke generating unit configured to generate a predetermined number of parallel strokes that are each substantially parallel to an original stroke among the one or more strokes forming the line image, and to specify intervals between the parallel strokes, wherein the predetermined number corresponds to the thickness information and the intervals are specified based on the thickness information;

a stroke length adjusting unit configured to adjust at least one of a length of a first parallel stroke that is parallel to a first original stroke and a length of a second parallel stroke that is parallel to a second original stroke that is connected to the first original stroke; and a render information generating unit configured to register, in the render information of the line image that is the rendering target, the shape information of the parallel stroke whose length has been adjusted.

\* \* \* \* \*